(12) United States Patent
Chou et al.

(10) Patent No.: US 12,538,152 B2
(45) Date of Patent: Jan. 27, 2026

(54) MEASUREMENT DATA COLLECTION TO SUPPORT RADIO ACCESS NETWORK INTELLIGENCE

(71) Applicant: Intel Corporation, Santa Clara, CA (US)

(72) Inventors: Joey Chou, Scottsdale, AZ (US); Yizhi Yao, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 154 days.

(21) Appl. No.: 18/360,688

(22) Filed: Jul. 27, 2023

(65) Prior Publication Data

US 2023/0370879 A1    Nov. 16, 2023

Related U.S. Application Data

(60) Provisional application No. 63/394,503, filed on Aug. 2, 2022.

(51) Int. Cl.
| | | |
|---|---|---|
| *H04W 24/02* | (2009.01) | |
| *H04W 24/08* | (2009.01) | |
| *H04W 24/10* | (2009.01) | |
| *H04W 84/02* | (2009.01) | |
| *H04W 88/18* | (2009.01) | |
| *H04W 92/02* | (2009.01) | |

(52) U.S. Cl.
CPC ........... *H04W 24/08* (2013.01); *H04W 24/02* (2013.01); *H04W 24/10* (2013.01); *H04W 84/02* (2013.01); *H04W 88/18* (2013.01); *H04W 92/02* (2013.01)

(58) Field of Classification Search
CPC . H04B 17/0082–409; H04L 43/02–55; H04W 24/02–10; H04W 28/02–26; H04W 36/0005–385; H04W 84/005–22; H04W 88/005–188; H04W 92/02–24
See application file for complete search history.

(56) References Cited

U.S. PATENT DOCUMENTS

| | | | |
|---|---|---|---|
| 2019/0150017 A1* | 5/2019 | Yao | .............. H04W 24/10 |
| 2023/0024320 A1* | 1/2023 | Gautam | .............. H04W 24/10 |

OTHER PUBLICATIONS

3GPP, "Technical Specification Group Radio Access Network; Evolved Universal Terrestrial Radio Access (E-UTRA) and NR; Study on enhancement for Data Collection for NR and EN-DC (Release 17)," 3GPP TR 37.817 V17.0.0 (Apr. 2022), 5G, 23 pages.
CMCC, "New WI: Artificial Intelligence (AI)/Machine Learning (ML) for NG-RAN," 3GPP TSG RAN Meeting #94e, RP-213602, revision of RP-212719, Agenda Item: 8.6.3, Electronic Meeting, Dec. 6-17, 2021, 4 pages.

(Continued)

*Primary Examiner* — Timothy J Weidner
(74) *Attorney, Agent, or Firm* — Schwegman Lundberg & Woessner, P.A.

(57) ABSTRACT

The present disclosure provides mechanisms to support collection of measurements data to support radio access network (RAN) intelligence. The present disclosure contains concepts, use cases, requirements, and solutions for collecting the measurement data to support artificial intelligence (AI) and/or machine learning (ML) enabled RAN, wherein the AI/ML functions reside in the RAN, a network function(s), management function(s), and/or in an Operation, Administration, and Maintenance function(s).

20 Claims, 14 Drawing Sheets

(56) References Cited

OTHER PUBLICATIONS

3GPP, "Technical Specification Group Services and System Aspects; Management and orchestration; Study on measurement data collection to support RAN intelligence (Release 18)," 3GPP TS 28.838 V0.1.0 (Jul. 2022), 5G, 8 pages.
3GPP, "Technical Specification Group Services and System Aspects; Management and orchestration; Architecture framework (Release 17)," 3GPP TS 28.533 V17.2.0 (Mar. 2022), 5G, 40 pages.
3GPP, "Technical Specification Group Services and System Aspects; Management and orchestration; Performance assurance (Release 17)," 3GPP TS 28.550 V17.1.0 (Jun. 2022), 5G, 85 pages.
3GPP, "Technical Specification Group Services and System Aspects; Management and orchestration; 5G Network Resource Model (NRM); Stage 2 and stage 3 (Release 18 )," 3GPP TS 28.541 V18.0.0 (Jun. 2022),. 5G, 528 pages.
3GPP, "Technical Specification Group Services and System Aspects; Management and orchestration; Generic management services; (Release 17)," 3GPP TS 28.532 V17.1.1 (Jun. 2022), 5G, 236 pages.
3GPP, "Technical Specification Group Services and System Aspects; Telecommunication management; Generic Network Resource Model (NRM) Integration Reference Point (IRP); Information Service (IS) (Release 17)," 3GPP TS 28.622 V17.2.0 (Jun. 2022), 5G, 86 pages.
3GPP, "Technical Specification Group Radio Access Network; NR; Radio Resource Control (RRC) protocol specification (Release 17)," 3GPP TS 38.331 V17.1.0 (Jun. 2022), 5G, 1273 pages.

\* cited by examiner

MEASUREMENT DATA COLLECTION TO SUPPORT RADIO ACCESS NETWORK INTELLIGENCE

CROSS REFERENCE TO RELATED APPLICATIONS

The present application claims priority to U.S. Provisional App. No. 63/394,503 filed Aug. 2, 2022, the contents of which is hereby incorporated by reference in its entirety.

FIELD

The present disclosure is generally related to wireless communication, cellular networks, cloud computing, edge computing, data centers, network topologies, and communication system implementations, and artificial intelligence (AI) and machine learning (ML) technologies, and in particular, to mechanisms to support collection of measurements data to support radio access network (RAN) intelligence.

BACKGROUND

Fifth generation (5G) networks are becoming increasingly complex, as new technologies, such as network densification, network slicing, and other advanced techniques, such as beamforming, mmWave, multi-radio dual connectivity (MR-DC), and the like are introduced to extend the capacity while reduce the latency in mobile communication to meet the requirements of demanding applications. However, the existing network automation features, such as self-organization network (SON), still need some levels of human intervention. Currently, Artificial intelligence (AI) and machine learning (ML) technologies are being studied to embed intelligence in the RAN.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings, in which.

DETAILED DESCRIPTION

1. AI/ML for RAN Intelligence Aspects

Figure 13:
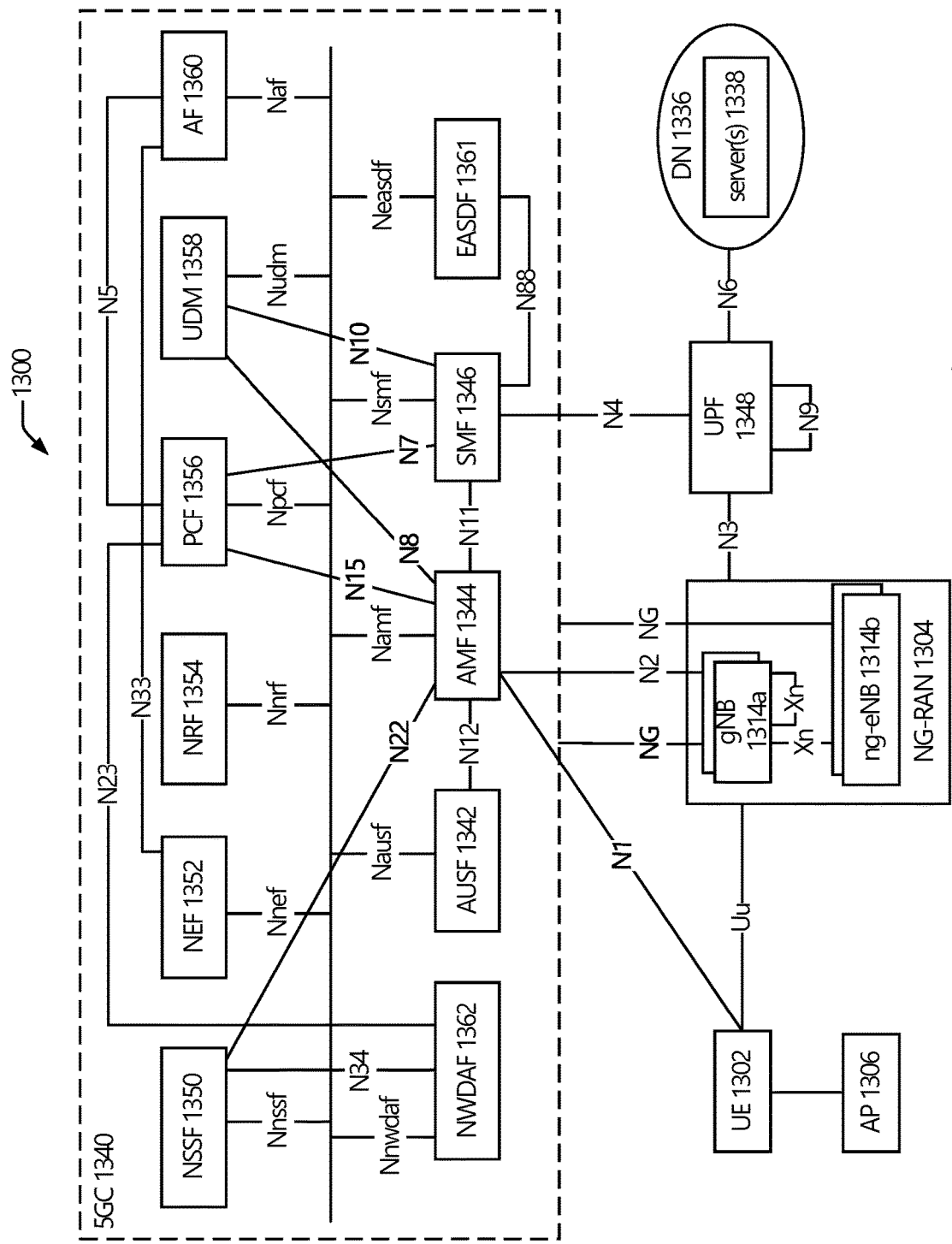
FIG. 13 depicts an example network architecture.

AI/ML technologies are being increasingly adopted by the wider industries and proved to be successful, and are being used in 5G systems (5GS), including 5G core (5GC) (e.g., Network Data Analytics Function (NWDAF) 1362 in FIG. 13), next generation radio access networks (NG-RANs) 1304 (e.g., RAN intelligence functions; see e.g., [TS38300] and [TS38401]), and management system (e.g., management data analytics service (MDAS); see e.g., third generation partnership project (3GPP) technical specification (TS) 28.104 v18.0.1 (2023 Jun. 22), [TS28533], [TS28535], [TS28536], and [TS28550]). Although AI/ML techniques in general are quite mature nowadays, some of the relevant aspects of the technology are still evolving while new complementary techniques are frequently emerging.

According to 3GPP TR 37.817 v17.0.0 (2022 Apr. 6) ("[TR37817]"), a model inference function in the RAN node and a model training function resides in an Operation(s), Administration, and Maintenance functions/system (OAM). [TR37817] identifies input and output data to be collected by the OAM to support AI/ML model training and evaluation for network energy saving (NES), load balancing optimization (LBO), and mobility optimization (or mobility robustness optimization (MRO)). The input data to be collected by the OAM include input data from a local RAN node, input data from neighbor RAN nodes, and input data from UEs. The input data from the local node includes, for example, UE mobility/trajectory prediction, current/predicted Energy efficiency, and predicted own resource status information. The input data from neighboring RAN nodes includes, for example, current/predicted energy efficiency and resource status, predicted neighbor resource status information, UE's successful handover (HO) information, and UE's history information from neighbor. The input data from individual UEs includes, for example, UE location/mobility information (e.g., positioning/location coordinates, serving cell ID, moving velocity, and/or the like), UE radio measurement reports (e.g., UE measurements of RSRP, RSRQ, SINR, and/or the like), and UE mobility history information. The output data includes, for example, predicted energy efficiency and state, selection of target cell for mobility load balancing, UE trajectory prediction (e.g., latitude, longitude, altitude, cell ID of UE over a future period), predicted HO target node, and candidate cells in CHO.

The performance management (PM) job, MDT/trace data, and QoE mechanisms as they currently exist are not capable of collecting input data associated with prediction, history, radio measurement reports, and resource status from UEs 1302, the local node, and neighboring nodes, and output data from RAN3 defined model inference functions. The present disclosure provides mechanisms for the collection of measurement data for the use cases of NES, load balancing/LBO, and mobility optimization/MRO as discussed in in [TR37817] and/or 3GPP TR 28.838 v18.0.0 (2023 Jan. 6) ("[TR28838]") for supporting AI/ML functions in OAM, examples of which are described infra.

1.1. Management Services (MnS) Aspects

Figure 1:
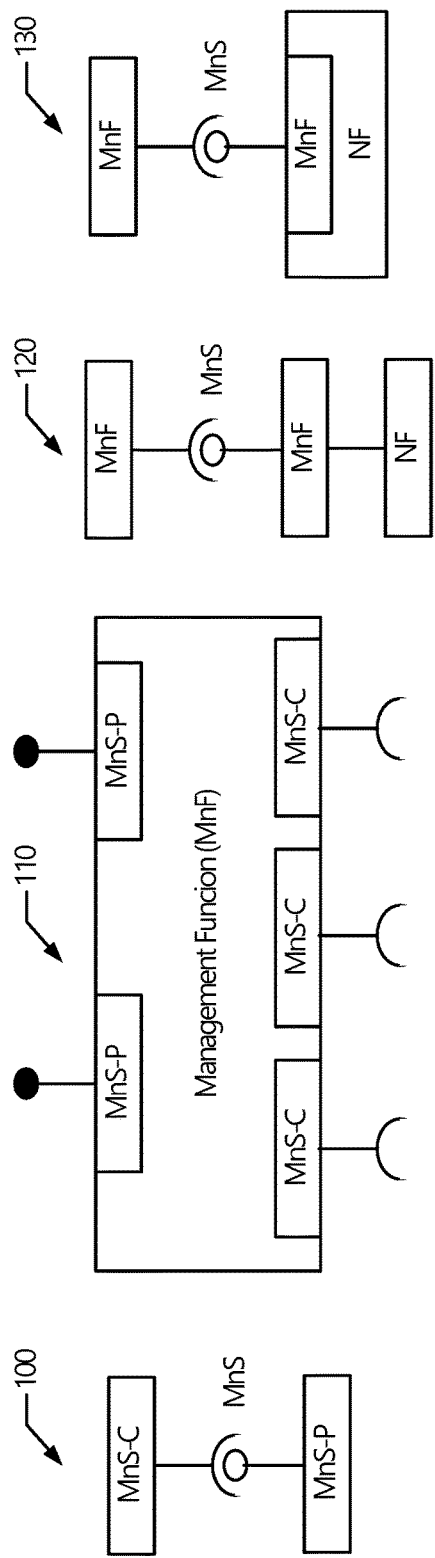
FIG. 1 depicts an example of management services (MnS)

FIG. 1 depicts an example of management services (MnS) deployment 100. MnS is a Service Based Management Architecture (SBMA). An MnS is a set of offered management capabilities (e.g., capabilities for management and orchestration (MANO) of network and services). The entity producing an MnS is referred to as an MnS producer (MnS-P) and the entity consuming an MnS is referred to as an MnS consumer (MnS-C). An MnS provided by an MnS-P can be consumed by any entity with appropriate authorization and authentication. As shown by FIG. 1, the MnS-P offers its services via a standardized service interface composed of individually specified MnS components (e.g., MnS-C).

A MnS is specified using different independent components. A concrete MnS includes at least two of these components. Three different component types are defined, including MnS component type A, MnS component type B, and MnS component type C. The MnS component type A is a group of management operations and/or notifications that is agnostic with regard to the entities managed. The operations and notifications as such are hence not involving any information related to the managed network. These operations and notifications are called generic or network agnostic. For example, operations for creating, reading, updating and deleting managed object instances, where the managed object instance to be manipulated is specified only in the signature of the operation, are generic.

MnS component type B refers to management information represented by information models representing the managed entities. A MnS component type B is also called Network Resource Model (NRM). Examples of MnS component type B include network resource models (see e.g., [TS28622]) and network resource models (see e.g., [TS28541]). MnS component type C is performance information of the managed entity and fault information of the managed entity. Examples of management service component type C include alarm information (see e.g., 3GPP TS 28.532 v17.3.0 (2023 Jan. 6) ("[TS28532]") and TS 28.545 v17.0.0 (2021 Jun. 24)) and performance data (see e.g., [TS28552], [TS28554], and [TS32425]).

An MnS-P is described by a set of metadata called MnS-P profile. The profile holds information about the supported MnS components and their version numbers. This may include also information about support of optional features. For example, a read operation on a complete subtree of managed object instances may support applying filters on the scoped set of objects as optional feature. In this case, the MnS profile should include the information if filtering is supported.

FIG. 1 also depicts an example management function (MnF) deployment 110. The MnF is a logical entity playing the roles of MnS-C and/or MnS-P. An MnF with the role of management service exposure governance is referred to as an "Exposure governance management function" or "exposure governance MnF". An MnS produced by an MnF 110 may have multiple consumers. The MnF 110 may consume multiple MnS from one or multiple MnS-Ps. In the MnF deployment 110, the MnF plays both roles (e.g., MnS-P and MnS-C). An MnF can be deployed as a separate entity or embedded in a network function (NF) to provide MnS(s). For example, MnF deployment scenario 120 shows an example where the MnF is deployed as a separate entity to provide MnS(s) and MnF deployment scenario 130 in which an MnF is embedded in an NF to provide MnS(s). In these examples, the MnFs may interact by consuming MnS produced by other MnFs.

Figure 2:
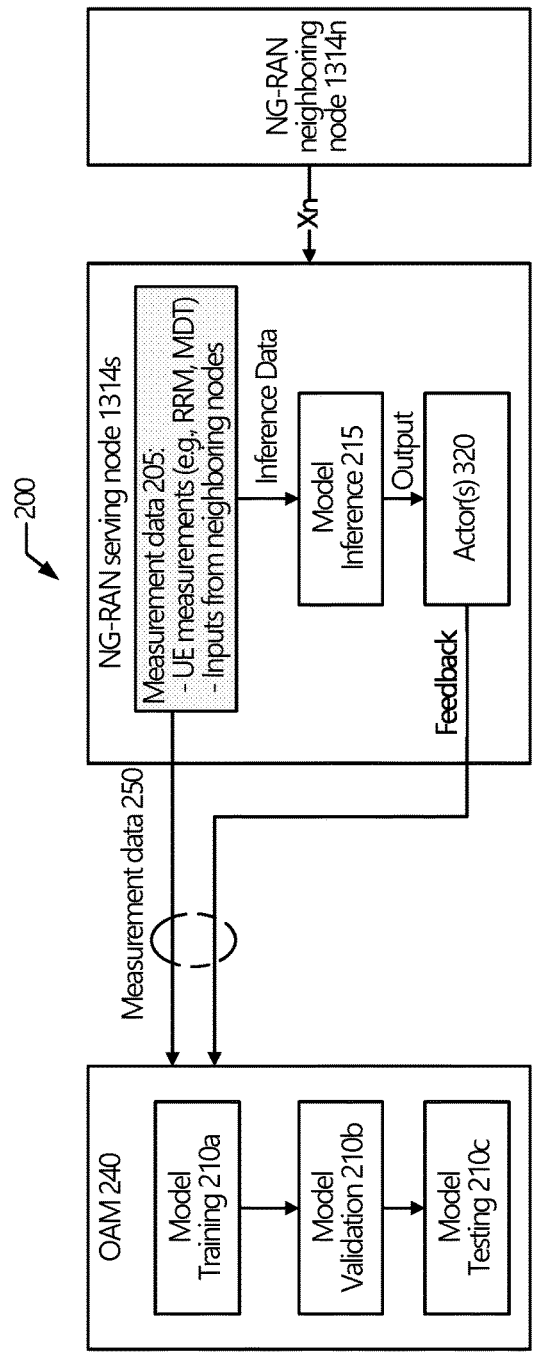
FIGS. 2 and 3 depict aspects of an example management framework for measurement data collection.
Figure 3:
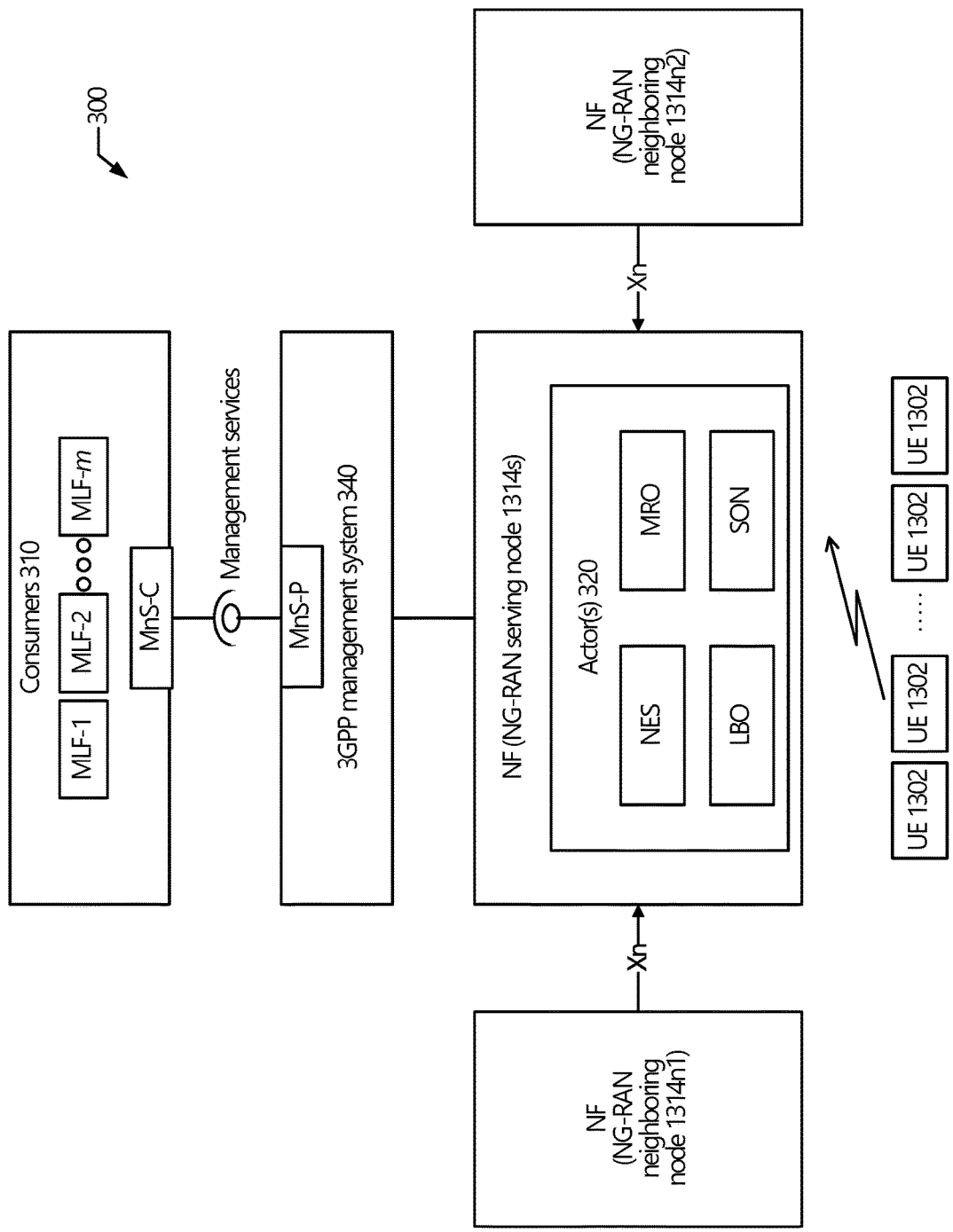

FIGS. 2 and 3 depict aspects of example management frameworks for measurement data collection to support RAN intelligence. FIG. 2 shows an example RAN intelligence framework 200 including data collection mechanisms for collecting measurement data 250 that will be used as input(s) to AI/ML functions 210 residing in OAM 240. The AI/ML functions 210 include model training function 210a, model validation function 210b, and model testing function 210c, each of which may be the same or similar as the model training function 1610 of FIG. 16 and/or MLTF 1725 of FIG. 17. In this example, the measurement data 250 includes the UE measurements (e.g., MDT measurements, RRM measurements, and/or the like), input information from the NG-RAN neighboring node(s) 1314n (also referred to herein as "neighboring node 1314n" or "node 1314n"), and feedback from actor(s) 320 implemented by an NG-RAN serving node 1314s (also referred to herein as "serving node 1314s" or "node 1314s"), and the feedback may be the same or similar as the feedback discussed infra w.r.t FIG. 16. Additional or alternative other measurements may be part of the measurement data 250, such as any of the measurements/metrics discussed herein. The node 1314s also implements a model inference function 215, which may be the same or similar as the model inference function 1615 of FIG. 16 and/or the inference function 1745 of FIG. 17

For example, individual UEs 1302 collect and report measurement(s) indicated by respective measurement configurations to node 1314n. As examples, the UE measurements include measurements related to RSRP, RSRQ, SINR, and/or other measurements of a serving cell and/or neighboring cells, such as any of those discussed herein. Each node 1314n sends its UE measurements and/or its input data to node 1314s over the Xn interface, which are stored or otherwise maintained as measurement data 205. The node 1314s also stores UE measurements and/or input data it collects as measurement data 205. The node 1314s sends the measurement data 205 to the OAM 240 for AI/ML model training 210a, validation 210b, and testing 210c for an AI/ML model to generate inferences for actor(s) 320 (e.g., NES, load balancing/LBO, mobility optimization/MRO, and/or other SON functions).

FIG. 3 shows an example management framework 300 for measurement data collection to support RAN intelligence. Consumers 310 can invoke MnS to request the 3GPP management system 340 to collect measurement data from various NFs of NG-RAN serving node 1314s and neighboring nodes 1314n1, 1314n2. In some examples, the consumers 310 include one or more applications and/or services such as, for example, one or more machine learning functions (MLFs) (e.g., MLF-1 to MLF-m, where m is a number). In some examples, individual MLFs may correspond to respective ones of the model training function 210a, model validation function 210b, and model testing function 210c. Additionally or alternatively, the consumers 310 include various MnS-Cs and/or MnF consumers.

The NG-RAN serving node 1314s contains actors 320 associated with AI-enabled intelligent RAN use cases. As examples, the actor(s) 320 include an NES function, MRO function, LBO function, and/or additional or alternative SON function(s). The actor(s) 320 generate actions directed to the NG-RAN nodes 1314s, 1314n and feedback, which is used to monitor the performance of the AI/ML model(s) (see e.g., FIG. 2, FIG. 16 discussed infra, and/or [TR37817] § 4.2). The NG-RAN serving node 1314s may collect the measurement reports from the UEs 1302 to which it is connected.

1.2. Example Use Cases
1.2.1. Mobility Optimization

Mobility management is a scheme to guarantee the service-continuity during the UE mobility by minimizing the call drops, radio link failures (RLFs), unnecessary HOs, and ping-ponging. An objective of mobility optimization is to dynamically improve UE HO performance with aims to improve end-user experience and increase network capacity. The mobility optimization use case in [TR37817] utilizes the AI/ML techniques with model training residing in OAM 240 and model inference 215 residing in the NG-RAN node 1314 to enhance the SON function in the following aspects: reduction of the probability of unintended events; UE location, mobility, and performance prediction; and/or traffic steering.

Clause 5.3.2.2 in [TR37817] describes a solution of AI/ML model training in OAM 240 and AI/ML model inference 215 in an NG-RAN node 1314, where the OAM 240 collects input data from the serving RAN node 1314s and neighboring RAN nodes 1314n to train the mobility optimization model, and then deploy the model to the serving RAN node 1314s to perform the inference function that will recommend actions to enable gNB 1314a to perform the mobility optimization/HO procedure to hand over UE(s) 1302 from serving NG-RAN node 1314s to a target NG-RAN node 1314.

To support the model training residing in the OAM 240, the OAM 240 and/or the 3GPP MnS-P should be able to collect the various input data (see e.g., clause 5.3.2.4 in [TR37817]). For example, some or all of the following input data can be collected from individual UEs 1302: UE location information (e.g., coordinates (e.g., GPS/GNSS, 3GPP location services, or the like), serving cell IDs, moving velocity, and/or the like) interpreted by gNB implementation when available; radio measurements related to serving cell and neighboring cells associated with the UE location information (e.g., UE measurement report information such as RSRP, RSRQ, SINR, and/or any other suitable measurements, such as any of those discussed herein); and/or UE mobility history information. Additionally or alternatively, some or all of the following input data can be collected from individual neighboring RAN nodes 1314n: UE's 1302 history information from neighbor; position, QoS parameters, and performance information of historical HO-ed UE 1302 (e.g., loss rate, delay, and the like); current/predicted resource status; UE HOs in the past that were successful and unsuccessful, including too-early, too-late, or HO to wrong (sub-optimal) cell, based on existing SON/RLF report mechanism; feedback from the target node (e.g., resource status information updates from target NG-RAN, and/or performance information from target NG-RAN). Additionally or alternatively, some or all of the following input data can be collected from the serving node 1314s: UE trajectory prediction; current/predicted resource status; current/predicted UE traffic; and/or feedback (e.g., QoS parameters such as throughput, packet delay of the handed-over UE, and/or the like).

1.2.2. Network Energy Saving (NES)

It has been a global concern that the energy consumption of information and communication technology (ICT) equipment is impacting the environment and contributing to the global warming. Energy efficiency for mobile networks an important issue since 5G networks will consume more energy due to the vast number of mmWave small cells and/or other services. The NES use case in [TR37817] utilizes the AI/ML techniques with model training residing in the OAM 240 and model inference 215 residing in the RAN node 1314, where the OAM 240 collects input data from RAN nodes 1314 to enable the NEW model training, and then deploys the model to the RAN node 1314 to perform the inference function that will determine the energy saving (ES) actions based on the input data received from the serving node.

To support the model training residing in the OAM 240, the OAM 240 and/or the 3GPP MnS-P should be able to collect the various input data (see e.g., clause 5.1.2.4 in [TR37817]). For example, some or all of the following input data can be collected from the serving node 1314s: UE mobility/trajectory prediction; current/predicted energy efficiency; current/predicted resource status; feedback. Additionally or alternatively, some or all of the following input data can be collected from individual UEs 1302: UE location information (e.g., coordinates (GPS/GNSS, 3GPP locations services, and/or the like), serving cell IDs, moving velocity, and the like) interpreted by gNB implementation when available; and/or UE measurement report(s) (e.g., UE RSRP, RSRQ, SINR, and/or any other measurements, such as any of those discussed herein), including cell level and beam level UE measurements. Additionally or alternatively, some or all of the following input data can be collected from individual neighboring NG-RAN nodes 1314n: current/predicted energy efficiency; current/predicted resource status; current energy state (e.g., active, high, low, inactive); and/or resource status feedback.

To optimize the performance of AI/ML-based NES model, some or all of the following feedback can be considered to be collected from individual NG-RAN nodes 1314: resource status of neighboring NG-RAN nodes 1314n; energy efficiency; UE performance affected by ES action(s) (e.g., handed-over UEs 1302 and/or the like), including bitrate, packet loss, latency; and/or system key performance indicators (KPIs) (e.g., throughput, delay, RLF of current and neighboring NG-RAN nodes 1314n, and/or the like).

1.2.3. Load Balancing

With the rapid traffic growth, multiple frequency bands were utilized in the commercial network. It is quite challenging to steer the traffic in a balanced distribution so that the network performance could be assured. Load balancing had been proposed to address the issue. The objective of load balancing is to distribute load evenly among cells and among areas of cells, or to transfer part of the traffic from congested cells or from congested areas of cells, or to offload users from one cell, cell area, carrier or RAT to improve network performance. This can be done by means of optimization of HO parameters and HO actions. AI/ML capabilities, for example, traffic load prediction, prediction of selected UE and/or target cell for HO, could be introduced to improve the load balance performance, in terms of the quality user experience and system capacity. It also enables the network automation which would help to reduce human intervention in the network management and optimization tasks. To support the AI/ML based load balancing in RAN, the related AI/ML Model can be trained, validated and tested in OAM 240 while AI/ML model inference 215 could be done in the gNB. In case of CU-DU split architecture, AI/ML Model Training can be located in the OAM 240 and AI/ML model inference 215 can be located in the gNB-CU.

To facilitate the AI/ML Model Training, validation and testing in OAM 240, 3GPP management service producer should be able to collect the input data, output data as well as the feedback of AI/ML based load balancing. (see e.g., clause 5.2.2. in [TR37817]). In some examples, the output data can be used as the label for supervised learning, used for unsupervised learning, and/or used as rewards or environment states for reinforcement learning. The feedback of AI/ML based load balancing data could be used to re-tune the AI/ML model and optimize the AI/ML model for load balancing.

To support the model training residing in the OAM 240, the OAM 240 and/or the 3GPP MnS-P should be able to collect the various input data (see e.g., clause 5.1.2.4 in [TR37817]). For example, some or all of the following input data can be collected from the serving node 1314s: current and predicted resource status; UE trajectory prediction; current and predicted UE traffic; predicted resource status information of neighboring NG-RAN node(s) 1314n; inter-gNB conditional HOs; and/or intra-gNB conditional HOs. Additionally or alternatively, some or all of the following input data can be collected from individual neighboring NG-RAN nodes 1314n: current and predicted resource status; and/or UE performance measurement at traffic offloaded neighboring cell. Additionally or alternatively, some or all of the following input data can be collected from individual UEs 1302: UE location information (e.g., coordinates (GPS/GNSS, 3GPP locations services, and/or the like), serving cell ID, moving velocity, and the like) interpreted by gNB implementation when available; UE mobility history information; and/or UE measurement report(s) (e.g., UE measurement report(s) (e.g., UE RSRP, RSRQ, SINR, and/or any other measurements, such as any of those discussed herein), including cell level and beam level UE measurements.

To support the model training residing in the OAM 240, the OAM 240 and/or the 3GPP MnS-P should be able to collect various output data. In some examples, the output data serves as the supervised learning label data. For example, some or all of the following input data can be collected from the serving node 1314s selection of target cell for load balancing; and/or the predicted UE(s) selected to be handed over to target NG-RAN node 1314 (e.g., will be used by RAN node 1314 internally).

To optimize the performance of AI/ML-based load balancing, some or all of the following feedback can be considered to be collected from individual NG-RAN nodes 1314: UE performance information from target NG-RAN 1304; resource status information updates from target NG-RAN 1304; and/or system KPIs (e.g., throughput, delay, RLF of current and neighbor cells, and/or the like).

1.3. Example Solutions

In order to address the aforementioned use cases, in some implementations, the 3GPP MnS-P has the capability allowing authorized consumers to collect the serving node input data required for model training. Additionally or alternatively, the 3GPP MnS-P has the capability allowing authorized consumers to collect the UE input data required for model training. Additionally or alternatively, the 3GPP MnS-P has the capability allowing authorized consumers to collect the neighboring node input data required for model training. In any of these implementations, the input data may be the input data used for mobility optimization model training, NES model training, and/or load balancing model training.

1.3.1. Measurement Data Collected from NG-RAN Neighboring Nodes

Figure 4:
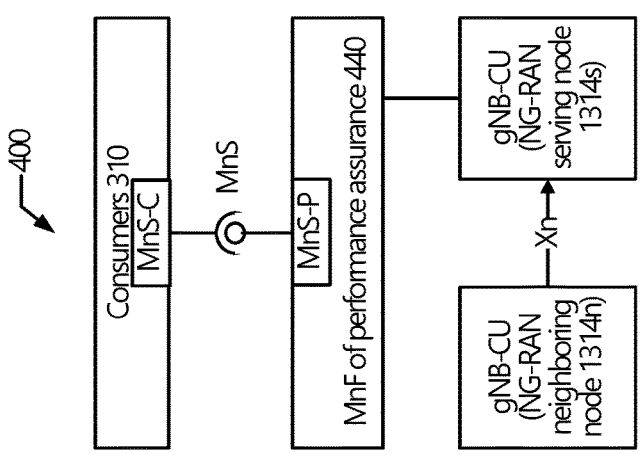
FIG. 4 depicts an example management data collected from NG-RAN neighboring nodes.

RAN intelligence use cases defined in [TR37817] require input data and feedback from the neighboring nodes 1314n. FIG. 4 shows an example MnF deployment 400 where an MnF of performance assurance (MnF-PA) 440 can be used by consumers 310 to collect the measurement data 205 from one or more NG-RAN neighboring nodes 1314n (see e.g., [TS28533] § 4.5).

1.3.1.1. Measurement Collection Via Performance Job Control

Figure 5:
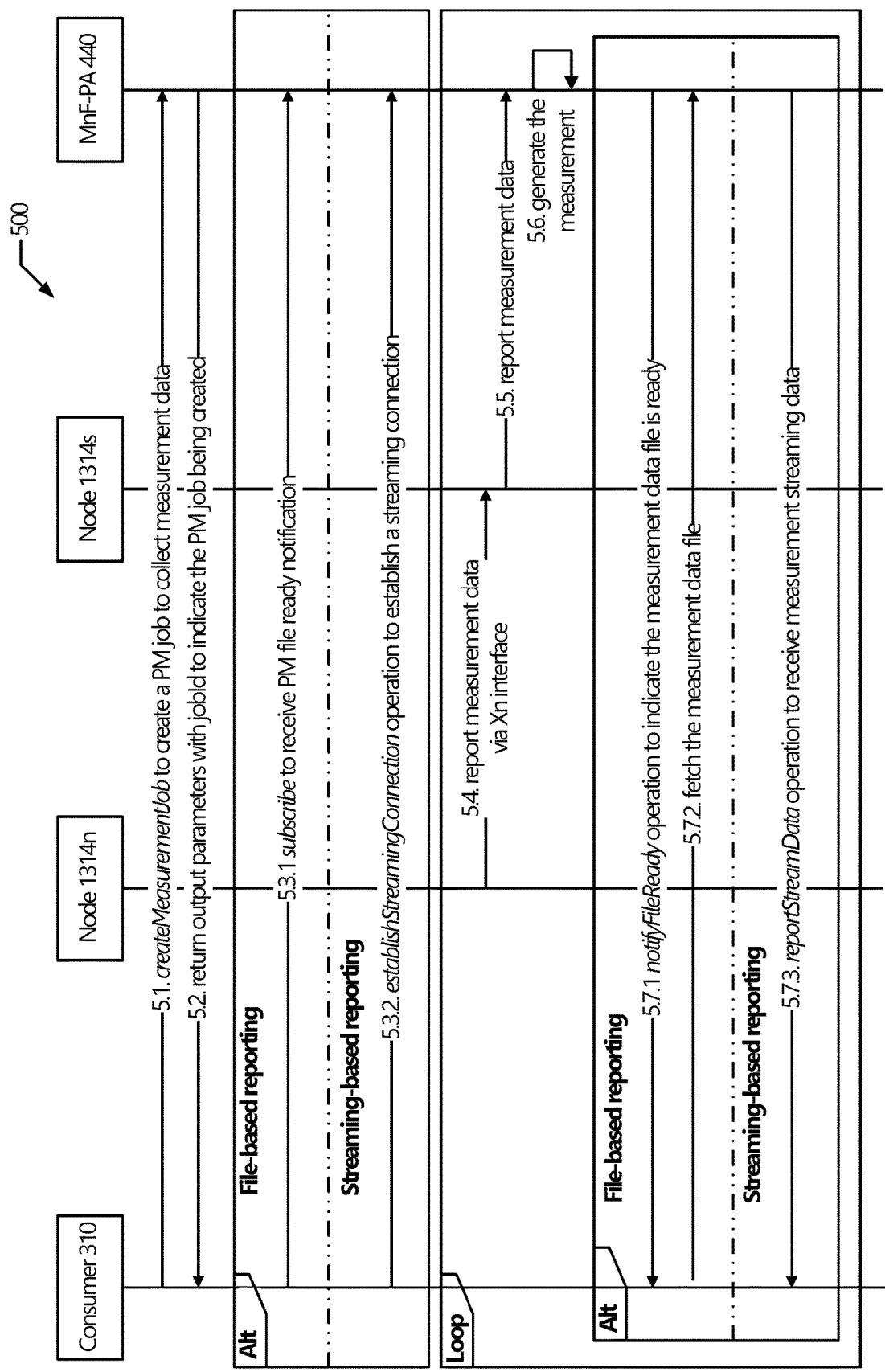
FIG. 5 depicts an example procedure for management data collection from NG-RAN neighboring nodes via performance job control.

FIG. 5 depicts an example procedure 500 for management data collection from NG-RAN neighboring nodes via performance job control. Procedure 500 allows a consumer 310 to utilize the MnS produced by MnF-PA 440 to collect measurement data from neighboring nodes 1314n via performance job control. Procedure 500 may operates as follows.

Step 5.1: the consumer 310 invokes the createMeasurementJob operation (see e.g., [TS28550] and section 1.3.4 infra) provided by the MnF-PA 440 to create a measurement job for collecting measurement data. As examples, the createMeasurementJob operation includes, but is not limited to, the following attributes: iOCInstanceList (e.g., the domain name(s) and/or other identifier(s)/network address(es) of NRCellRelation MOI (see e.g., [TS28541] and section 1.3.4 infra)); measurementCategoryList (e.g., the measurement type(s) (see e.g., [TS28550] and section 1.3.4 infra) that include new measurements for RAN3 defined data, such as current/predicted resource status, historical successful, and unsuccessful UE HOs from neighboring nodes (see e.g., clause 5.3.2.4 in [TR38817])); and reportingMethod (e.g., file or streaming based reporting). Step 5.2: the MnF-PA 440 returns the output parameter with jobId to indicate the measurement job been created.

Step 5.3: if the measurement job is based on performance file reporting service, then performance data file reporting is performed (step 5.3.1). Step 5.3.1: the consumer 310 invokes the subscribe operation (see e.g., clause 12.6.1.1.1 in [TS28532]) to subscribe to receive notifications when the measurement data is ready for collection (e.g., notifyFileReady discussed in [TS28532] and [TS28550], IOCs for 5G NFs discussed in [TS28541], and/or Performance measurements for 5G NFs discussed in [TS28552]). Otherwise, the performance data streaming service is performed (step 5.3.2). Step 5.3.2: the consumer 310 invokes the establishStreamingConnection operation (see e.g., [TS28550]) to establish a streaming connection for sending the streaming data.

Step 5.4: the neighboring gNB-CU NF 1314n reports the measurement data to the serving gNB-CU NF 1314s via the Xn interface. Step 5.5: the serving gNB-CU NF 1314s reports the measurement data to the MnF-PA 440. Step 5.6: the MnF-PA 440 playing the producer role (e.g., MnS-P) collects the measurements, according to the performance job. In some examples, at step 5.6, the MnF-PA 440 generates a measurement set, which may be a measurement report or other data structure to be reported to the consumer 310 for file-based reporting, and/or includes a collection of measurement data to be streamed to the consumer 310 for stream-based reporting.

Step 5.7: if the measurement job is based on performance file reporting service, then performance data file reporting is performed (step 5.7.1). Step 5.7.1: the MnF-PA 440 sends a notifyFileReady notification (see e.g., clause 11.6.1.1 in [TS28532]) to the consumer 310 to indicate the performance data file is ready. Step 5.7.2: the consumer 310 fetches the measurement data from the MnF-PA 440. Otherwise, the performance data streaming service is performed (step 5.7.3). Step 5.7.3: the MnF-PA 440 invokes the reportStreamData operation to send the streaming measurement data to the consumer 310.

1.3.1.2. Measurement Collection Via Configurable Measurement Control

Figure 6:
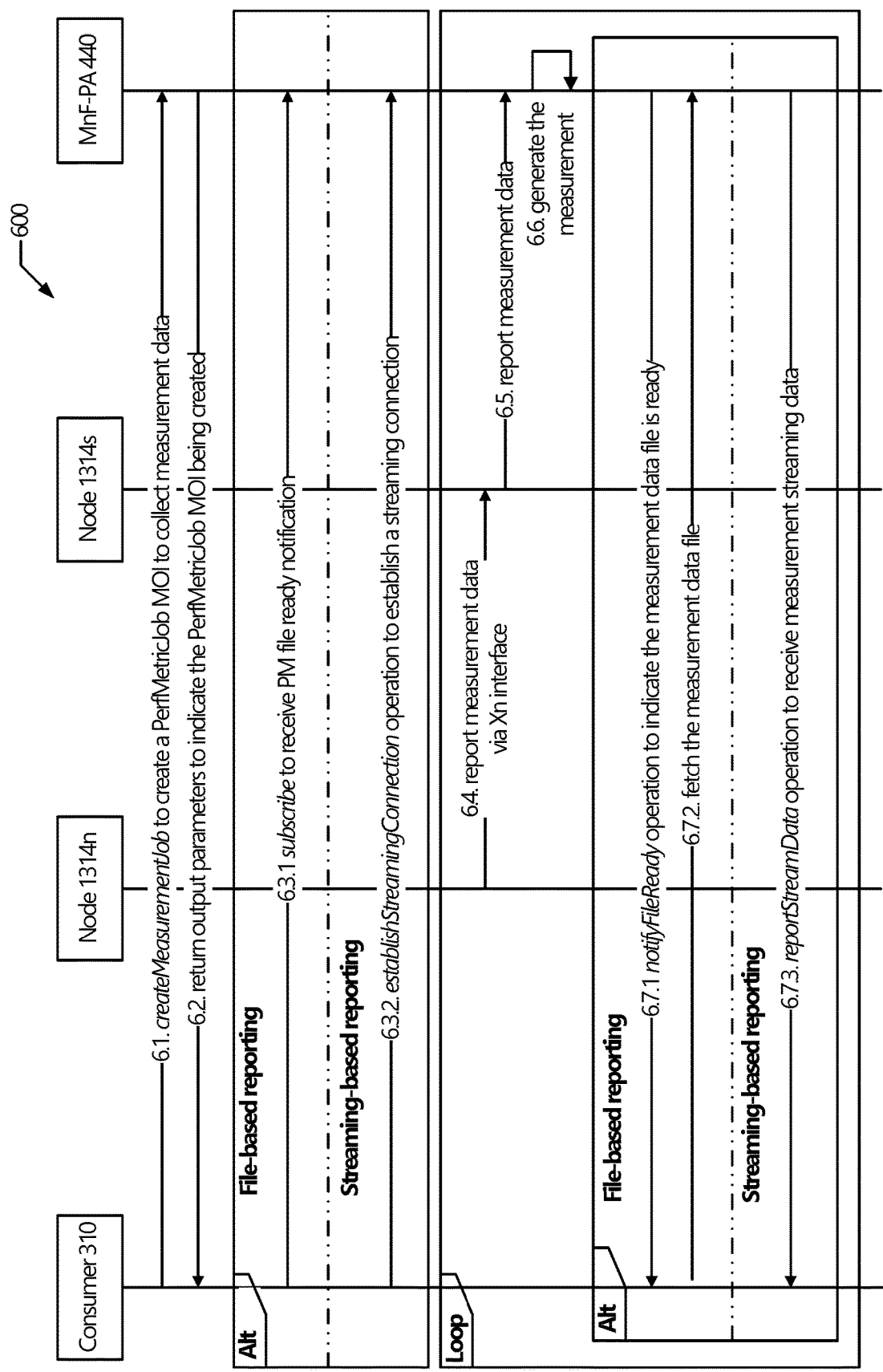
FIG. 6 depicts an example procedure for management data collection from NG-RAN neighboring nodes via configurable measurement control.

FIG. 6 depicts an example procedure 600 for management data collection from NG-RAN neighboring nodes via configurable measurement control. Procedure 600 allows a consumer 310 to utilize the MnS produced by MnF-PA 440 to collect measurement data via configuration measurement control. Procedure 600 may operates as follows.

Step 6.1: the consumer 310 invokes the createMOI operation (see e.g., [TS28532]) for a performance metric production job (PerfMetricJob) IOC (see e.g., [TS28622] § 4.3.31) to request the MnF-PA 440 to create a measurement job for collecting measurement data from the neighboring node. As examples, the PerfMetricJob IOC/operation includes, but not limited to, the following attributes: objectInstances (e.g., the domain name(s) and/or other identifier(s)/network address(es) of NRCellRelation MOI(s) indicating the NR cell CU of the neighboring node); performanceMetrics (the list of performance metrics); and/or reportingCtrl (e.g., file or streaming based reporting). Step 6.2: the MnF-PA 440 returns the output parameter with the status of PerfMetricJob MOI creation.

Step 6.3: if the measurement job is based on performance file reporting service, then performance data file reporting is performed (step 6.3.1). Step 6.3.1: the consumer 310 invokes the subscribe operation to subscribe to receive notifications when the measurement data is ready for collection (e.g., notifyFileReady discussed in [TS28532] and [TS28550], IOCs for 5G NFs discussed in [TS28541], and/or Performance measurements for 5G NFs discussed in [TS28552]). Otherwise, the performance data streaming service is performed (step 6.3.2). Step 6.3.2: the consumer 310 invokes the establishStreamingConnection operation (see e.g., [TS28550]) to establish a streaming connection for sending the streaming data.

Step 6.4: the neighboring gNB-CU NF 1314*n* reports the measurement data to the serving gNB-CU NF 1314*s* via the Xn interface. Step 6.5: the serving gNB-CU NF 1314*s* reports the measurement data to the MnF-PA 440. Step 6.6: the MnF-PA 440 generates the measurement for the object instance of NRCellRelation MOI(s) referring to the neighboring gNB-CU NF 1314*n*. In some examples, at step 6.6, the MnF-PA 440 generates a measurement set, which may be a measurement report or other data structure to be reported to the consumer 310 for file-based reporting, and/or includes a collection of measurement data to be streamed to the consumer 310 for stream-based reporting.

Step 6.7: the if the measurement job is based on performance file reporting service, then performance data file reporting is performed (step 6.7.1). Step 6.7.1: the MnF-PA 440 sends a notifyFileReady notification to the consumer 310 to indicate the performance data file is ready. Step 6.7.2: the consumer 310 fetches the measurement data from the MnF-PA 440. Otherwise, the performance data streaming service is performed (step 6.7.3). Step 6.7.3: the consumer 310 collects the measurement data and invokes the reportStreamData operation to send the 5GC NF streaming data to the consumer 310.

1.3.2. Measurement Data Collected from NG-RAN Serving Node

In some implementations, the existing performance assurance MnS can be reused to collect the measurement data, including feedbacks from actors, from the NG-RAN serving node. The actors are distributed SON functions that are modelled as DMROFunction, DLBOFunction, and DESManagementFunction IOCs (see e.g., [TS28541]).

1.3.2.1. Measurement Collection Via Performance Job Control

Figure 7:
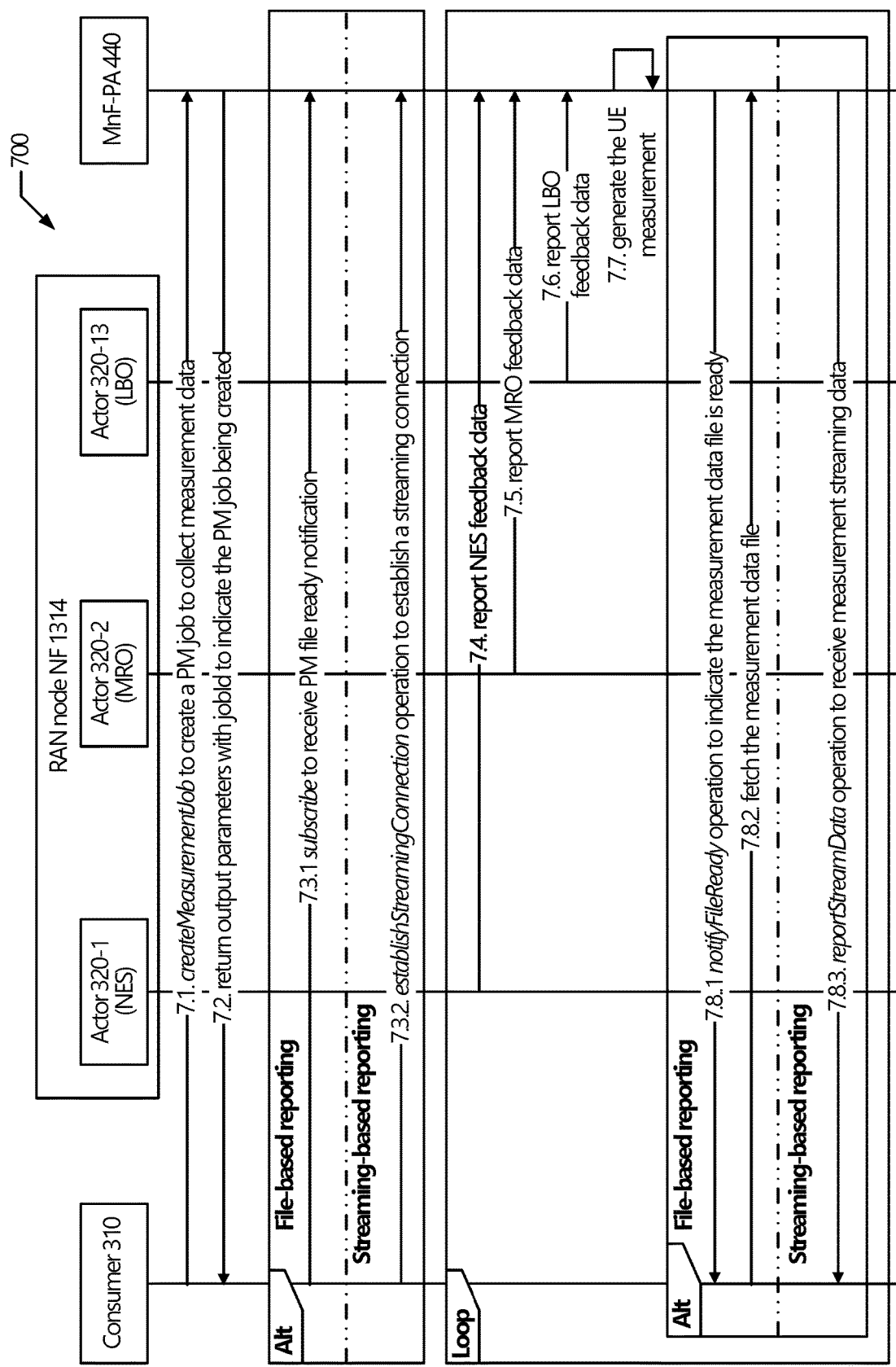
FIG. 7 depicts an example procedure for management data collection from an NG-RAN serving node via performance job control.

FIG. 7 depicts an example procedure 700 for management data collection from an NG-RAN serving node via performance job control. Procedure 700 allows a consumer 310 to utilize the MnS produced by MnF-PA 440 to collect measurement data (e.g., feedback from the actor(s) 320) via performance job control. Procedure 700 may operate as follows.

Step 7.1: a consumer 310 invokes the createMeasurementJob operation provided by the MnF-PA 440 to create a measurement job for the collection of measurement data to create a measurement job for collecting the feedback data from the actors. As examples, the createMeasurementJob operation includes, but is not limited to, the following attributes: iOCInstanceList (e.g., the domain name(s) and/or other identifier(s)/network address(es) of DMROFunction, DLBOFunction, and DESManagementFunction MOI); measurementCategoryList (the measurement type(s) that include new measurements for RAN3 defined data, such as UE trajectory prediction, current/predicted UE traffic from serving nodes (see e.g., clause 5.3.2.4 in [TR38817]), and/or the like); and/or reportingMethod (e.g., file or streaming based reporting). Step 7.2: the MnF-PA 440 returns the output parameter with jobId to indicate the measurement job been created.

Step 7.3: if the measurement job is based on performance file reporting service, then performance data file reporting is performed (step 7.3.1). Step 7.3.1: the consumer 310 invokes the subscribe operation to subscribe to receive notifications when the measurement data is ready for collection (e.g., notifyFileReady discussed in [TS28532] and [TS28550], IOCs for 5G NFs discussed in [TS28541], and/or Performance measurements for 5G NFs discussed in [TS28552]). Otherwise, the performance data streaming service is performed (step 7.3.2). Step 7.3.2: the consumer 310 invokes the establishStreamingConnection operation (see e.g., [TS28550]) to establish a streaming connection for sending the streaming data.

Step 7.4: the actor of NES 320-1 reports measurement data (e.g., NES feedback data) to the performance assurance MnS-P for NF (e.g., the MnF-PA 440). Step 7.5: the actor of MRO 320-2 reports measurement data (e.g., MRO feedback data) to the performance assurance MnS-P for NF (e.g., the MnF-PA 440). Step 7.6: the actor of LRO 320-3 reports measurement data (e.g., LBO feedback data) to the performance assurance MnS-P for NF (e.g., the MnF-PA 440). Step 7.7: the MnF-PA 440 generates the measurement for the object instance of NRCellRelation MOI(s) referring to the neighboring gNB-CU NF 1314*n*. In some examples, at step 7.7, the MnF-PA 440 generates a measurement set (e.g., the measurement for the object instance of NRCellRelation MOI(s)), which may be a measurement report or other data structure to be reported to the consumer 310 for file-based reporting, and/or includes a collection of measurement data to be streamed to the consumer 310 for stream-based reporting.

Step 7.8: if the measurement job is based on performance file reporting service, then performance data file reporting is performed (step 7.8.1). Step 7.8.1: the MnF-PA 440 sends a notifyFileReady notification to the consumer 310 to indicate the performance data file is ready. Step 7.8.2: the consumer 310 fetches the measurement data from the MnF-PA 440. Otherwise, the performance data streaming service is performed (step 7.8.3). Step 7.8.3: the consumer 310 collects the measurement data and invokes the reportStreamData operation to send the 5GC NF streaming data to the consumer 310.

1.3.2.2. Measurement Collection Via Configurable Measurement Control

Figure 8:
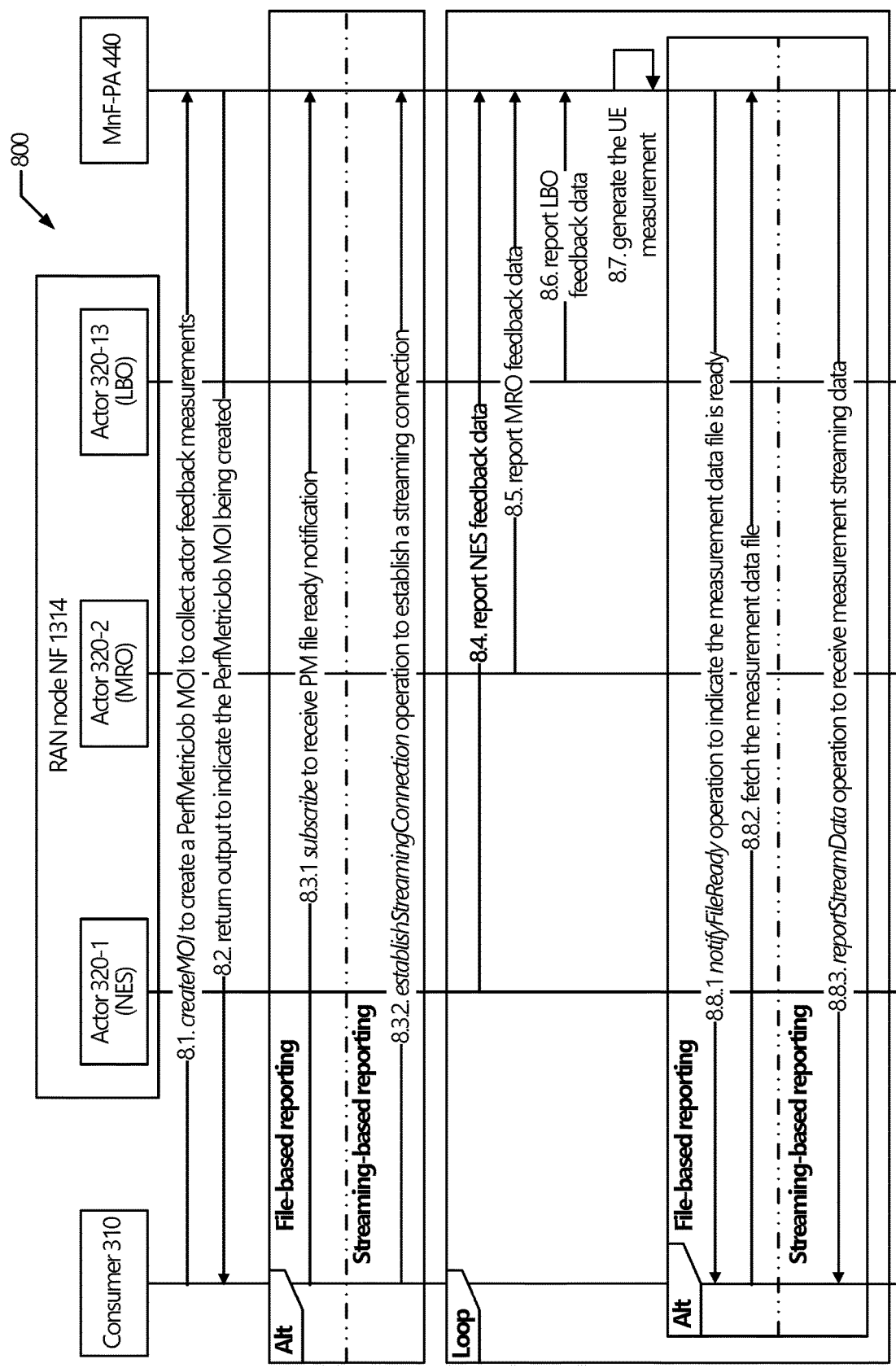
FIG. 8 depicts an example procedure for management data collection from an NG-RAN serving node via configurable measurement control.

FIG. 8 depicts an example procedure 800 for management data collection from an NG-RAN serving node via configurable measurement control. Procedure 800 allows a consumer 310 to utilize the MnS produced by MnF-PA 440 to collect measurement data (e.g., feedback from the actor(s) 320) via configuration measurement control. Procedure 800 may operate as follows.

Step 8.1: a consumer 310 invokes the createMOI operation for PerfMetricJob IOC to request the MnF-PA 440 to create a measurement job for collecting measurement data from the actors. As examples, the PerfMetricJob IOC includes, but is not limited to, the following attributes: objectInstances (e.g., the domain name(s) and/or other identifier(s)/network address(es) of DMROFunction, DLBO-Function, and DESManagementFunction MOIs); performanceMetrics (the list of performance metrics); and/or reportingCtrl (e.g., file or streaming based reporting). Step 8.2: the MnF-PA 440 returns the output parameter with the status of PerfMetricJob MOI creation.

Step 8.3: if the measurement job is based on performance file reporting service, then performance data file reporting is performed (step 8.3.1). Step 8.3.1: the consumer 310 invokes the subscribe operation to subscribe to receive notifications when the measurement data is ready for collection (e.g., notifyFileReady discussed in [TS28532] and [TS28550], IOCs for 5G NFs discussed in [TS28541], and/or Performance measurements for 5G NFs discussed in [TS28552]). Otherwise, the performance data streaming service is performed (step 8.3.2). Step 8.3.2: the consumer 310 invokes the establishStreamingConnection operation (see e.g., [TS28550]) to establish a streaming connection for sending the streaming data.

Step 8.4: the actor of NES 320-1 reports measurement data (e.g., NES feedback data) to the performance assurance MnS-P for NF (e.g., the MnF-PA 440). Step 8.5: the actor of MRO 320-2 reports measurement data (e.g., MRO feedback data) to the performance assurance MnS-P for NF (e.g., the MnF-PA 440). Step 8.6: the actor of LRO 320-3 reports measurement data (e.g., LBO feedback data) to the performance assurance MnS-P for NF (e.g., the MnF-PA 440). Step 8.7: the MnF-PA 440 generates the measurement (see e.g., step 7.7 of FIG. 7).

Step 8.8: if the measurement job is based on performance file reporting service, then performance data file reporting is performed (step 8.8.1). Step 8.8.1: the MnF-PA 440 sends a notifyFileReady notification to the consumer 310 to indicate the performance data file is ready. Step 8.8.2: the consumer 310 fetches the measurement data from the MnF-PA 440. Otherwise, the performance data streaming service is performed (step 8.8.3). Step 8.8.3: the MnF-PA 440 invokes the reportStreamData operation to send the streaming measurement data to the consumer 310.

Figure 9:
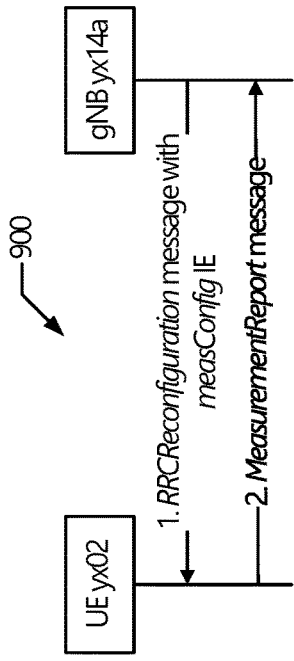
FIG. 9 depicts an example UE measurement report configuration procedure.

1.3.3. Measurement Data Collected from UEs 1.3.3.1. Measurement Report Configuration FIG. 9 depicts an example UE measurement report configuration procedure 900. In procedure 900, a gNB 1314a may configure the RRC_CONNECTED UE 1302 to report NR measurements, inter-RAT measurements of E-UTRA frequencies, inter-RAT measurements of UTRA-FDD frequencies, and NR sidelink measurements of layer 2 (L2) UE-to-Network (U2N) Relay UEs 1302 (see e.g., clause 5.5.1 in [TS38331]) that are used to support HO, carrier aggregation, and/or dual connectivity. In particular, the gNB 1314a sends an RRCReconfiguration message with measConfig information element (IE) to the UE 1302, and the UE 1302 determines the type of measurements to be collected from the measurement configuration. The UE 1302 response/returns the collected measurements in a measurement report (MeasurementReport) message. In this way, the gNB 1314a already receives a UE measurement report (e.g., including RSRP, RSRQ, SINR, and/or other configured measurements) that can be used as input data for the model training without requiring any additional triggers.

Figure 10:
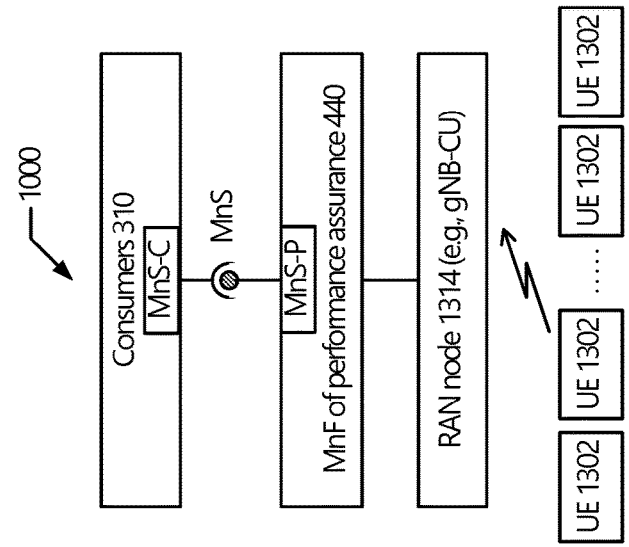
FIG. 10 depicts an example performance assurance MnF deployment scenario for UE measurement data collection.

FIG. 10 shows an example performance assurance MnF deployment scenario 1000. FIG. 10 shows that MnF-PA 440 management can be used to collect the UE measurements. A measurement can be created when one or more UE measurement reports are received (e.g., by the gNB-CU). The measurement should refer to NRCellCU IOC with sub-counter for each UE measurements. The sub-counter index should be based on C-RNTI that is associated with the RRC Connection.

1.3.3.2. Measurement Collection Via Performance Job Control

Figure 11:
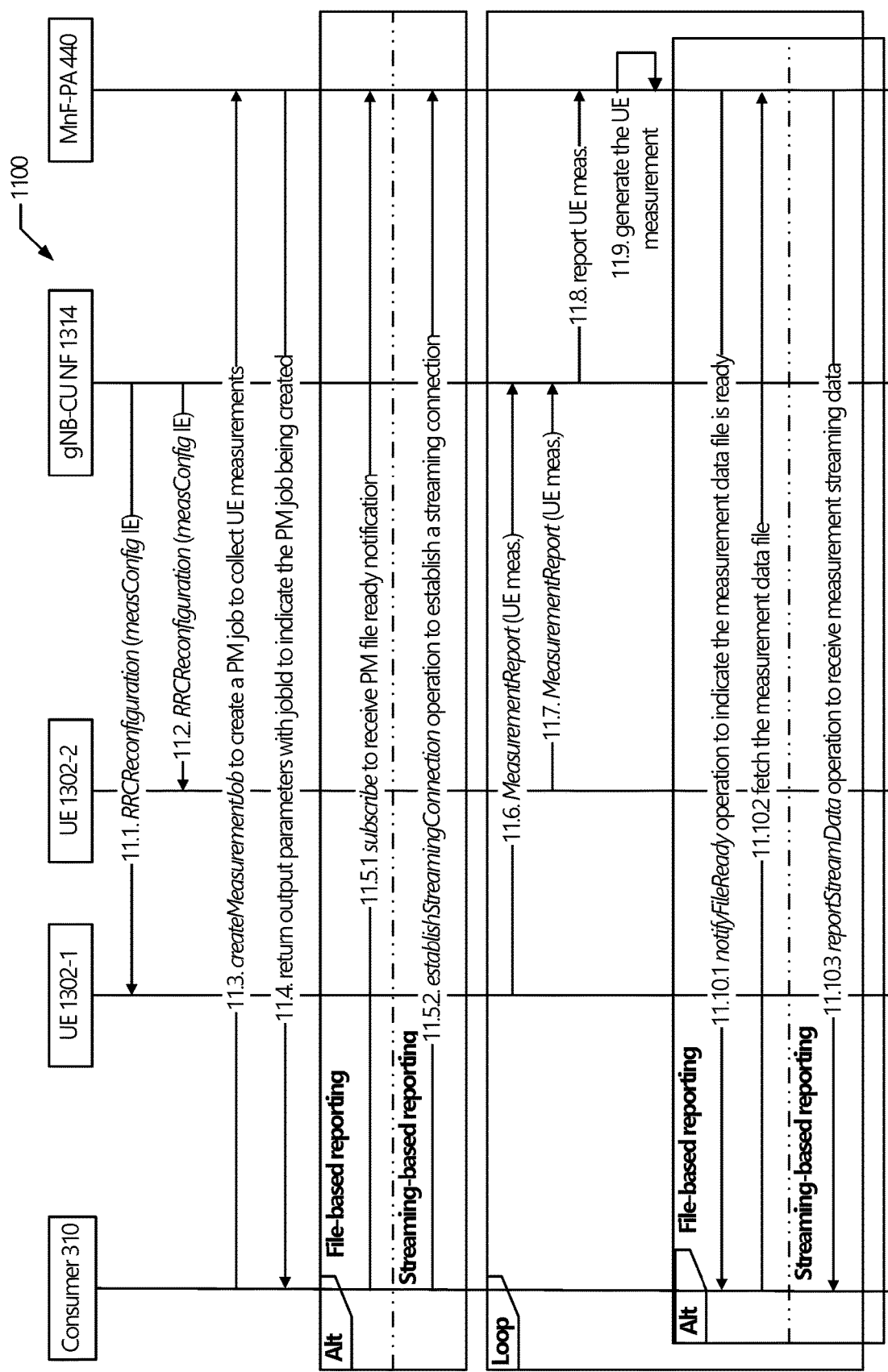
FIG. 11 depicts an example procedure for management data collection from UEs via performance job control.

FIG. 11 depicts an example procedure 1100 for management data collection from UEs via performance job control. Procedure 1100 allows a consumer 310 to utilize the MnS produced by MnF-PA 440 to collect UE measurement data via performance job control. Procedure 1100 may operate as follows.

Step 11.1: the gNB-CU NF 1314 sends an RRCReconfiguration message with measConfig IE to request/configure the UE 1302-1 to collect and report UE measurements. Step 11.2: the gNB-CU NF 1314 sends an RRCReconfiguration message with measConfig IE to request/configure the UE 1302-2 to collect and report UE measurements.

Step 11.3: a consumer 310 invokes the createMeasurementJob operation provided by the MnF-PA 440 to create a measurement job for collecting UE measurements. As examples, the createMeasurementJob operation includes, but is not limited to, the following, attributes: iOCInstanceList (e.g., the domain name(s) (DN(s)) and/or other identifier(s)/network address(es) of NRCellCU MOI); measurementCategoryList (e.g., the measurement type(s) that include new measurements for RAN3 defined data, such as UE location information, UE mobility history information from UEs 1302 (see e.g., clause 5.3.2.4 in [TR38817])); and/or reportingMethod (e.g., file or streaming based reporting). Step 11.4: the MnF-PA 440 returns the output parameter with jobId to indicate the measurement job been created.

Step 11.5: if the measurement job is based on performance file reporting service, then performance data file reporting is performed (step 11.5.1). Step 11.5.1: the consumer 310 invokes the subscribe operation to subscribe to receive notifications when the measurement data is ready for collection (e.g., notifyFileReady discussed in [TS28532] and [TS28550], IOCs for 5G NFs discussed in [TS28541], and/or Performance measurements for 5G NFs discussed in [TS28552]). Otherwise, the performance data streaming service is performed (step 11.5.2). Step 11.5.2: the consumer 310 invokes the establishStreamingConnection operation (see e.g., [TS28550]) to establish a streaming connection for sending the streaming data.

Step 11.6: the UE 1302-1 sends an RRC message including a MeasurementReport to report UE measurements collected/measured by the UE 1302-1 (e.g., based on the configuration at step 11.1). Step 11.7: the UE 1302-2 sends an RRC message including a MeasurementReport to report UE measurements collected/measured by the UE 1302-2 (e.g., based on the configuration at step 11.2). Step 11.8: the gNB-CU NF reports the UE measurements to the MnF-PA 440. Step 11.9: the MnF-PA 440 generates the measurement with sub-counter identified by C-RNTI for each UE measurements. In some examples, at step 11.9, the MnF-PA 440 generates a measurement set, which may be a measurement report or other data structure to be reported to the consumer 310 for file-based reporting, and/or includes a collection of measurement data to be streamed to the consumer 310 for stream-based reporting.

Step 11.10: if the measurement job is based on performance file reporting service, then performance data file reporting is performed (step 11.10.1). Step 11.10.1: the MnF-PA 440 sends a notifyFileReady notification (see e.g., clause 11.6.1.1 in [TS28532]) to the consumer 310 to indicate the performance data file is ready. Step 11.10.2: the consumer 310 fetches the measurement data from the MnF-PA 440. Otherwise, the performance data streaming service is performed (step 11.10.3). Step 11.10.3: the consumer 310 collects the measurement data and invokes the reportStreamData operation to send the 5GC NF streaming data to the consumer 310.

1.3.3.3. Measurement Collection Via Configurable Measurement Control

Figure 12:
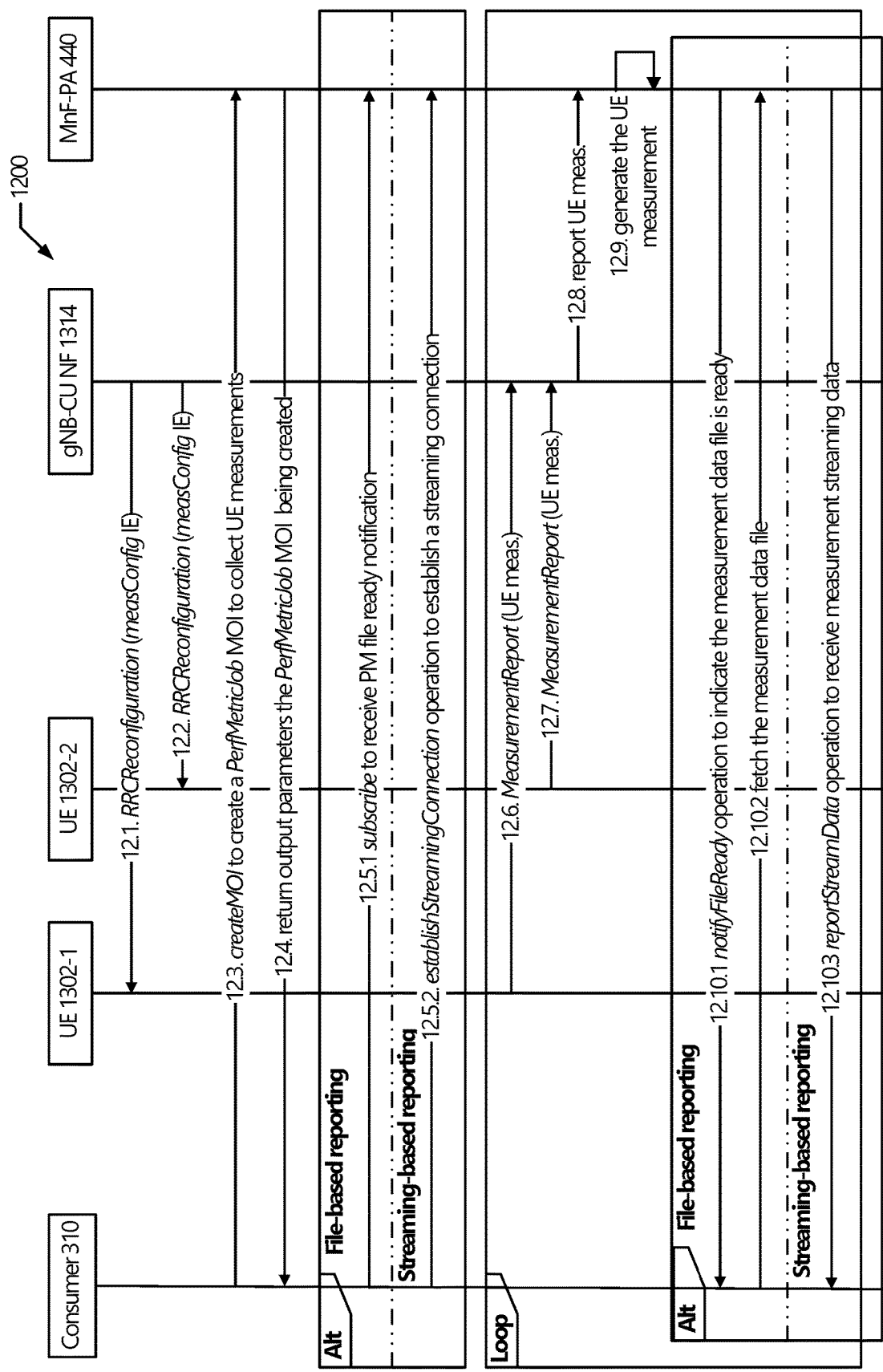
FIG. 12 depicts an example procedure for management data collection from UEs via configurable measurement control.

FIG. 12 depicts an example procedure 1200 for management data collection from UEs via configurable measurement control. Procedure 1200 allows a consumer 310 to utilize the MnS produced by MnF-PA 440 to collect UE measurement data via configuration measurement control. Procedure 1200 may operate as follows.

Step 12.1: the gNB-CU NF 1314 sends an RRCReconfiguration message with measConfig IE to request/configure the UE 1302-1 to collect and report UE measurements. Step 12.2: the gNB-CU NF 1314 sends an RRCReconfiguration message with measConfig IE to request/configure the UE 1302-2 to collect and report UE measurements.

Step 12.3: a consumer 310 invokes the createMOI operation for PerfMetricJob IOC to request the MnF-PA 440 to create a measurement job for collecting UE measurements. As examples, the PerfMetricJob IOC includes, but is not limited to, the following attributes: objectInstances (e.g., the DN(s) and/or other identifier(s)/network address(es) of NRCellCU MOI(s)); performanceMetrics (e.g., the list of performance metrics); and/or reportingMethod (e.g., file or streaming based measurements). Step 12.4.: the MnF-PA 440 returns the output parameter with the status of PerfMetricJob MOI creation.

Step 12.5: if the measurement job is based on performance file reporting service, then the file reporting service is performed (step 12.5.1). Step 12.5.1: the consumer 310 invokes the subscribe operation to subscribe to receive notifications when the measurement data is ready for collection (e.g., notifyFileReady discussed in [TS28532] and [TS28550], IOCs for 5G NFs discussed in [TS28541], and/or Performance measurements for 5G NFs discussed in [TS28552]). Otherwise, the performance data streaming service is performed (step 12.5.2). Step 12.5.2: the consumer 310 invokes the establishStreamingConnection operation (see e.g., [TS28550]) to establish a streaming connection for sending the streaming data.

Step 12.6: the UE 1302-1 sends an RRC message including a MeasurementReport to report UE measurements collected/measured by the UE 1302-1 (e.g., based on the configuration at step 12.1). Step 12.7: the UE 1302-2 sends an RRC message including a MeasurementReport to report UE measurements collected/measured by the UE 1302-2 (e.g., based on the configuration at step 12.2). Step 12.8: the gNB-CU NF reports the UE measurements to the MnF-PA 440. Step 12.9: the MnF-PA 440 generates the measurement with sub-counter identified by C-RNTI for each UE measurements. In some examples, at step 12.9, the MnF-PA 440 generates a measurement set, which may be a measurement report or other data structure to be reported to the consumer 310 for file-based reporting, and/or includes a collection of measurement data to be streamed to the consumer 310 for stream-based reporting.

Step 12.10: if the measurement job is based on performance file reporting service, then the file reporting service is performed (step 12.10.1). Step 12.10.1: the MnF-PA 440 sends a notifyFileReady notification (see e.g., clause 11.6.1.1 in [TS 28532]) to the consumer 310 to indicate the performance data file is ready. Step 12.10.2: the consumer 310 fetches the measurement data from the MnF-PA 440. Otherwise, the data streaming service is performed (step 12.10.3). Step 12.10.3: the MnF-PA 440 invokes the reportStreamData operation to send the streaming measurement data to the consumer 310.

1.3.4. Operations and Notifications 1.3.4.1. createMeasurementJob Operation

The createMeasurementJob operation supports the authorized consumer 310 to request the procedure of measurement job control related MnS or KPI job control related MnS to create a measurement job. A measurement job can collect the value of one or multiple measurement types which are the performance measurements and assurance data defined in [TS28552] and/or collect the value of one or multiple KPIs defined in [TS28554]. When a measurement type or KPI is collected by one measurement job for a given instance (e.g., an NF instance or a subnetwork instance), another measurement job creation request that wants to collect the same measurement type or KPI for the same instance with different granularity period may be rejected. This behavior may be consistent for a given implementation by a specific MnS-P.

There are two different methods for the performance data to be reported, including performance data file method and a performance data streaming method. The performance data file method involves performance data being accumulated for a certain time (or amount of time) before it is reported; and the data is delivered as a file or other suitable data structure. The performance data streaming method involves a performance data streaming producer, when the performance data is/are ready, sends the performance data to the consumer 310 (e.g., stream target). The volume of the performance data reported by streaming is expected to be small, and the granularity period of the performance data stream needs to be configurable and is expected to be short.

TABLE 1.3.4.1-1

| Parameter Name | Qualifier | Comment |
|---|---|---|
| iOCName | M | Information Type: The IOC name defined of the NRMs (see e.g., [TS28541]), or the class name defined locally in the performance data related specifications (e.g., [TS28552], [TS28554]).<br>It specifies one object class name. The consumer requests to collect one or more measurement type(s) of the instances of this class. |
| iOCInstanceList | M | Information Type: List of DN<br>It specifies the list of DNs of object instances whose measurements or KPIs of the corresponding type(s) are to be collected (e.g., the domain name(s) (DN(S)) or other identifier(s) of NRCellRelation MOI (see e.g., [TS28541]).<br>An empty list means that for all instances (including the object instances existing at the time of measurement job creation, and the instances added later) known by the management service producer the measurements or KPIs will be collected.<br>If the MnS-C represents a tenant, the object instances to be collected measurements should satisfy the conditions listed in Clause 4.4 of [TS28550]. |
| measurementCategoryList | M | Information Type: List of measurement type names (see e.g., [TS28552]) or KPI names (see e.g., [TS28554]).<br>It specifies the measurement type(s) or KPI(s) to be measured.<br>If the measurement job is for the collection of performance measurement(s), the elements of the measurementCategoryList shall be one of the following forms:<br>The form "family.measurementName.subcounter" can be used in order to retrieve a specified subcounter of a measurement type.<br>The form "family.measurementName" can be used in order to retrieve a specific measurement type. In case the measurement type includes subcounters, all subcounters will be retrieved.<br>The form "family" can be used in order to retrieve all measurement types in this family.<br>If the measurement job is for the collection of KPI(s), the elements of the measurementCategoryList shall be the KPI name defined in [TS285542]. |
| reportingMethod | M | Information Type: The reporting method of the collected performance data.<br>It specifies the method for the collected performance data to be reported. One of the following methods can be selected:<br>by performance data file<br>by performance data streaming (optional). |
| granularityPeriod | M | Information Type: The period between generation of two successive measurements.<br>The management service producer will produce the value of the measurements or KPIs at the end of each granularityPeriod.<br>For performance measurements collection:<br>If the reportingMethod is performance data file reporting:<br>The value of granularityPeriod can be 5 minutes, 15 minutes, 30 minutes, 1 hour, 12 hours or 24 hours or other values.<br>If the reportingMethod is performance data streaming:<br>The value of granularityPeriod is an integer value in seconds.<br>For KPIs collection:<br>The value of granularityPeriod can be 5 minutes, 15 minutes, 30 minutes, 1 hour, 12 hours or 24 hours or other values.<br>The granularityPeriod defines the measurement or KPI data production rate. The supported rates are dependent on the capacity of the producer involved (e.g., the processing power of the producer, number of measurements or KPIs being collected by the producer at the time, the complexity of the measurement type or KPI involved, and the like) and therefore, it cannot be standardized for all producers involved. The supported rates can only reflect the negotiated agreement between producer and the consumer involved. |
| reportingPeriod | M | Information Type: The period between two successive performance data reporting.<br>Applicable when the reportingMethod is performance data file reporting.<br>The performance data report(s) are produced when the reporting period arrives.<br>The reportingPeriod shall be one or multiple of granularityPeriod. The measurement or KPI value of each granularityPeriod will be made available to the performance data reporting related service producer, who will prepare the performance data file(s) for each reportingPeriod.<br>If the consumer has subscribed to the notifyFileReady and notifyFilePreparationError notifications from the performance data reporting related service producer, the consumer will receive the notifications about the result of the performance data file preparation from that producer with the interval as defined by reportPeriod; |

TABLE 1.3.4.1-1-continued

Input parameters

| Parameter Name | Qualifier | Comment |
| --- | --- | --- |
| startTime | O | Information Type: It specifies the begin time from which the measurement job will be active.<br>All values that indicate valid timestamp.<br>Default value is "start now". If startTime is in the past, the current time will be used and the job will start immediately.<br>When a measurement job becomes active, it does not mean that the measurement job immediately starts generation of the measurements or KPIs. The consumer can set the detailed time frame (e.g., dailySchedule or weeklySchedule) by schedule parameter for a measurement job to generate the measurements or KPIs. If there is no time frame scheduled, the measurement job immediately starts generation of the measurements or KPIs when it becomes active. |
| stopTime | O | Information Type: It specifies the end time after which the measurement job will be stopped.<br>The value indicates valid timestamp and shall be later than startTime and current time.<br>This attribute may carry the value "indefinitely".<br>Default value is to run indefinitely. |
| schedule | O | Information Type: It specifies the detailed time frames (within the startTime and stopTime) during which the measurement job is active and monitors the measurement type(s) or KPI(s).<br>Its value is only one of the following, dailyScheduling or weeklyScheduling. The legal values for them refer to ITU-T Recommendation X.721 [4].<br>The legal values for them are as follows.<br>dailyScheduling:<br>{{ intervalStart {hour 0, minute 0},<br> intervalEnd {hour 23, minute 59}}}<br>weeklyScheduling:<br>{{ daysOfWeek '1111111'B,<br>intervalsOfDay dailyScheduling}}<br>Default value is "daily". |
| streamTarget | M | Information Type: It specifies the target of performance data streams carrying the performance data stream unit(s).<br>Applicable when the reportingMethod is performance data streaming. |
| priority | O | Information Type: It specifies the priority of measurement job<br>Its value should be one of the following: Low, Medium, High.<br>Default value is "Medium" |
| reliability | O | Information Type: It specifies the reliability of measurement job<br>Its value is vendor specific. |

TABLE 1.3.4.1-2

Output parameters

| Parameter Name | Qualifier | Comment |
| --- | --- | --- |
| jobId | M | Unique identifier of the measurement job from all the ongoing and stopped Measurement jobs that have been created for the subject consumer.<br>Matching Information: It identifies the measurement job instance (and distinguishes it from all other ongoing and stopped measurement job instances that have been created for the subject consumer). |
| unsupportedList | M | To create a measurement job, best-effort is required. The parameter of 'unsupportedList' has to be returned if status = PartialSuccess.<br>The reason can be any of:<br>Measurement type or KPI name is unknown.<br>Measurement type or KPI name is invalid.<br>Measurement type or KPI name is not supported in the specific implementation.<br>Measurement type or KPI name is already monitored for the IOC instance with a different granularityPeriod.<br>The related IOC instance is unknown (e.g., it does not exist at the time of this operation invocation).<br>Insufficient capacity to monitor the related IOC instance(s).<br>(For KPI only) At least one related measurement job is not activated.<br>The object instance listed in iOCInstanceList does not satisfy the condition in clause 4.4 of [TS28550] in multiple tenant environment.<br>Matching Information: List of <iOC instance, measurement type or KPI name, reason> |
| status | M | An operation may fail because of a specified or unspecified reason.<br>Matching Information: ENUM (Success, Failure, PartialSuccess) |

1.3.4.2. NRCellRelation

The NRCellRelation IOC represents a neighbor cell relation from a source cell to a target cell, where the target cell is an NRCellCU or ExternalNRCellCU instance. The source cell can be an NRCellCU instance. This is the case for an Intra-NR neighbor cell relation. The source cell can be a EUtranGenericCell instance. This is the case for Inter-LTE-NR neighbor cell relation, from E-UTRAN to NR (see e.g., 3GPP TS 28.658). Neighbor cell relations are unidirectional. The NRCellRelation IOC includes attributes inherited from top IOC (e.g., defined in [TS28622]). As examples, the NRCellRelation IOC includes the following attributes: nRTCI, cellIndividualOffset, isRemoveAllowed, isHOAllowed, isESCoveredBy, isENDCAllowed, isMLBAllowed, and the following attributes related to role: nRFreqRelationRef and adjacentNRCellRef. Additionally or alternatively, the NRCellRelation IOC includes the following attribute constraints: isRemoveAllowed (condition: ANR function is supported in the source cell), isHOAllowed (condition: ANR function is supported in the source cell), isESCoveredBy (condition: ES function is supported), isENDCAllowed (condition: MR-DC with the EPC (see e.g., [TS37340] § 4.1.2) is supported), and isMLBAllowed (condition: MLB function is supported in the source cell).

The NRCellCU IOC represents the part of NR cell information that is responsible for the management of inter-cell mobility and neighbor relations via ANR. The NRCellCU IOC includes attributes inherited from ManagedFunction IOC (defined in TS 28.622[30]) and the following attributes: cellLocalId, pLMNInfoList, and nRFrequencyRef which is related to role (see e.g., [TS28541]). The abstract ExternalNRCellCU IOC represents the properties of an NRCellCU controlled by another MnS provider. The ExternalNRCellCU IOC contains necessary attributes for inter-system and intra-system HO, and also contains a subset of the attributes of related IOCs controlled by MnS provider. The ExternalNRCellCU IOC includes attributes inherited from ManagedFunction IOC (defined in TS 28.622 [30]) and the following attributes cellLocalId, nRPCI, pLMNInfoList, and nRFrequencyRef which is related to role (see e.g., [TS28541]).

1.3.4.3. DMROFunction

The DMROFunction IOC contains attributes to support the distributed SON (D-SON) function of Mobility Robustness Optimization (MRO) (see e.g., [TS28313] § 7.1.2). In some examples, in the case where multiple DMROFunction MOIs exist at different levels of the containment tree, the DMROFunction MOI at the lower level overrides the DMROFunction MOIs at higher level(s) of the same containment tree. The DMROFunction IOC includes attributes inherited from Top IOC (e.g., defined in [TS28622]). As examples, the DMROFunction IOC includes the following attributes: maximumDeviationHoTriggerLow, maximumDeviationHoTriggerHigh, minimumTimeBetweenHoTriggerChange, dmroControl, and tstoreUEcntxt,

1.3.4.4. DLBOFunction

The DLBOFunction IOC contains attributes to support the D-SON function of LBO (see e.g., [TS28313] § 7.1.5). In some examples, in the case where multiple DLBOFunction MOIs exist at different levels of the containment tree, the DLBOFunction MOI at the lower level overrides the DLBOFunction MOIs at higher level(s) of the same containment tree. The DLBOFunction IOC includes attributes inherited from top IOC (e.g., defined in [TS28622]). As examples, the DLBOFunction IOC includes the following attributes: dlboControl, maximumDeviationHoTriggerLow, maximumDeviationHoTriggerHigh, and minimumTimeBetweenHoTriggerChange.

1.3.4.5. DESManagementFunction

The DESManagementFunction IOC represents the management capabilities of D-SON ES functions (see e.g., clause 6.2.3.0 in [TS28310]). This is provided for ES purposes. In some examples, in the case where multiple DESManagementFunction MOIs exist at different levels of the containment tree, the DESManagementFunction MOI at the lower level overrides the DESManagementFunction MOIs at higher level(s) of the same containment tree. The DESManagementFunction IOC includes attributes inherited from the top IOC (e.g., defined in [TS28622]).

As examples, the DESManagementFunction IOC includes the following attributes: desSwitch, intraRatEsActivationOriginalCellLoadParameters, intraRatEsActivationCandidateCellsLoadParameters, intraRatEsDeactivationCandidateCellsLoadParameters, esNotAllowedTimePeriod, interRatEsActivationOriginalCellParameters, interRatEsActivationCandidateCellParameters, interRatEsDeactivationCandidateCellParameters, energySavingState, and isProbingCapable.

Additionally or alternatively, the DESManagementFunction IOC includes the following attribute constraints: intraRatEsActivationOriginalCellLoadParameters S (condition: "the cell acts as an original cell"), intraRatEsActivationCandidateCellsLoadParameters S (condition: "the cell acts as a candidate cell"), intraRatEsDeactivationCandidateCellsLoadParameters S (condition: "the cell acts as a candidate cell"), interRatEsActivationOriginalCellParameters CM S (condition: condition: "the cell acts as an original cell"), interRatEsActivationCandidateCellParameters CM S (condition: "the cell acts as a candidate cell"), and interRatEsDeactivationCandidateCellParameters CM S (condition: "the cell acts as a candidate cell").

1.3.4.6. Notification notifyFileReady

A MnS-P sends this notification to subscribed MnS-Cs when a new file becomes ready (available) on the MnS-P for upload by MnS-Cs. The "fileInfoList" parameter provides information (meta data) about the new file and optionally, in addition to that, information about all other files, which became ready for upload earlier and are still available for upload when the notification is sent.

The "objectClass" and "objectInstance" parameters of the notification header identify the object representing the function (process) making the file available for retrieval, such as the "PerfMetricJob" or the "TraceJob" defined in [TS28622]. When no dedicated object is standardized or instantiated, the "ManagedElement", where the file is processed, shall be used. For the case that the file is processed on a mangement node, the "ManagementNode", where the file is processed, is used instead.

As examples, the notifyFileReady IOC includes the following attributes/parameters: objectClass (information type: Entity.objectClass; see e.g., [TS28532] § 11.6.1.1.1), objectInstance (information type: Entity.objectInstance; see e.g., [TS28532] § 11.6.1.1.1), notificationId, notificationType (information type: "notifyFileReady"), eventTime (e.g., time when the file that triggered this notification is/was ready for upload), systemDN, fileInfoList (e.g., information (metadata) about the new file, that became ready for upload and triggered this notification, and information about files, which became ready for upload earlier and are still available for upload when the notification is sent), and additionalText (e.g., allows a free form text description to be reported as defined in ITU-T Rec. X. 733).

As examples, the fileInfoList parameter/attribute includes the following attributes/parameters: "fileLocation" (e.g., includes a location of the file, which may be a directory path, a URL, or some other reference or pointer), "fileCompression" (e.g., name of the algorithm used for compressing the file. An empty or absent "fileCompression" parameter indicates the file is not compressed. The MnS-P selects the compression algorithm. It is encouraged to use popular algorithms such as GZIP), "fileSize" (e.g., size of the file. Its value is a non-negative integer. The unit is byte), "fileDataType" (e.g., type of the management data stored in the file. Example values include: "performance", "trace", "analytics", "proprietary", wherein the value "performance" refers to measurements and/or KPIs), "fileFormat" (e.g., identifier of the information object schema (e.g., XML or ASN.1 schema), including its version, used to produce the file content), "fileReadyTime" (e.g., date and time when the file was closed (e.g., the last time) and made available on the MnS-P. The file content will not be changed anymore); "fileExpirationTime" (e.g., date and time after which the file may be deleted. this element may or may not be empty and may be later than "fileReadyTime"), "jobId" (e.g., job identifier of the "PerfMetricJob" (see e.g., [TS28622]) or "TraceJob" (see e.g., [TS28622]) that produced the file. In some implementations, this parameter is present when the file is related to a job and that job is represented by a "PerfMetricJob" or "TraceJob". Multiple jobs may share the same job identifier. This may for example be the case for jobs collecting measurements to compute a KPI or for jobs related to a specific task in some analytics application. In some examples, a specific job is identified by the objectClass/objectInstance parameters of the notification header).

1.3.4.7. reportStreamData Operation

The reportStreamData operation enables the MnS-P to send a unit of streaming data to the MnS-C. As examples, the reportStreamData operation includes the following input parameters: connectionId (information type: see e.g., [TS28532] § 11.5.1.1.3; this parameter identifies the streaming connection on which the reported data are being sent. The format may have dependency on the solution set), and streamingData (information type: unit of streaming data; This parameter contains the actual data (payload) being reported via stream. For streaming trace reporting each streamingData is encoded according to the format specified in the clause 5 of 3GPP TS 32.423. For streaming performance data reporting each streamingData is encoded according to the format specified in the Annex C of [TS28550]. For proprietary data streaming reporting each streamingData is encoded according to the format specified in the product documentation). As examples, the reportStreamData operation includes the following output parameters: status (matching information: ENUM (Success, Failure); an operation may fail because of a specified or unspecified reason).

1.3.4.8. PerfMetricJob

The PerfMetricJob IOC represents a performance metric production job. It can be name-contained by SubNetwork, ManagedElement, or ManagedFunction. As examples, the PerfMetricJob IOC includes the following attributes: administrativeState, operationalState, jobId, performanceMetrics, granularityPeriod, objectInstances, rootObjectInstances, reportingCtrl, and _linkToFiles. In some examples, the _linkToFiles attribute is supported when the MnS-P supports the file retrieval NRM fragment. The common notifications defined in clause 4.5 of [TS28622] and the following set of notifications are valid for this IOC: notifyFileReady and notifyFilePreparationError.

To activate the production of the specified performance metrics, an MnS-C needs to create a PerfMetricJob instance on the MnS-P. For ultimate deactivation of metric production, the MnS-C should delete the job to free up resources on the MnS-P. For temporary suspension of metric production, the MnS-C can manipulate the value of the administrative state attribute. The MnS-P may disable metric production as well, for example in overload situations. This situation is indicated by the MnS-P with setting the operational state attribute to disabled. When production is resumed the operational state is set back to enabled. The jobId attribute can be used to associate metrics from multiple PerfMetricJob instances. The jobId can be included when reporting performance metrics to allow a MnS-C to associate received metrics for the same purpose. For example, it is possible to configure the same jobId value for multiple PerfMetricJob instances required to produce the measurements for a specific KPI. The attribute per formanceMetrics defines the performance metrics to be produced and the attribute granularityPeriod defines the granularity period to be applied.

All object instances infra and including the instance name-containing the PerfMetricJob (base object instance) are scoped for performance metric production. Performance metrics are produced only on those object instances whose object class matches the object class associated to the performance metrics to be produced.

In some examples, the attributes objectInstances and rootObjectInstances allow to restrict the scope. When the attribute objectInstances is present, only the object instances identified by this attribute are scoped. When the attribute rootObjectInstances is present, then the subtrees whose root objects are identified by this attribute are scoped. Both attributes may be present at the same time meaning the total scope is equal to the sum of both scopes. Object instances may be scoped by both the objectInstances and rootObjectInstances attributes. This shall not be considered as an error by the MnS-P.

When the performance metric requires performance metric production on multiple managed objects, which is for example the case for KPIs, the MnS-C needs to ensure all required objects are scoped. Otherwise a PerfMetricJob creation request fails.

The attribute reportingCtrl specifies the method and associated control parameters for reporting the produced measurements to MnS-Cs. Three methods are available: file-based reporting with selection of the file location by the MnS-P, file-based reporting with selection of the file location by the MnS-C and stream-based reporting.

For file-based reporting, all performance metrics that are produced related to a "PerfMetricJob" instance for a reporting period shall be stored in a single reporting file. When the administrative state is set to "UNLOCKED" after the creation of a "PerfMetricJob" the first granularity period shall start. When the administrative state is set to "LOCKED" or the operational state to "DISABLED", the ongoing reporting period shall be aborted, for streaming the ongoing granularity period. When the administrative state is set back to "UNLOCKED" or the operational state to "ENABLED" a new reporting period shall start, in case of streaming a new granularity period.

Changes of some or all other configurable attributes takes effect only at the beginning of the next reporting period, for streaming at the beginning of the next granularity period. When the "PerfMetricJob" is deleted, the ongoing reporting period is aborted, for streaming the ongoing granularity period. A PerfMetricJob creation request is rejected if the requested performance metrics, the requested granularity period, the requested repoting method, and/or a requested combination thereof is not supported by the MnS-P. When creation and deletion of PerfMetricJob instances by MnS-Cs is/are not supported, PerfMetricJob instances may be created and deleted by the system and/or be pre-installed. When the file retrieval NRM fragment is supported by the MnS-P, the "_linkToFiles" attribute is supported, for details on the usage of this attribute see the definition of the file retrieval NRM fragment (see e.g., [TS28622]).

2. Cellular Network Aspects

FIG. 13 depicts an example network architecture 1300. The network 1300 may operate in a manner consistent with 3GPP technical specifications for LTE or 5G/NR systems. However, the example embodiments are not limited in this regard and the described examples may apply to other networks that benefit from the principles described herein, such as future 3GPP systems, or the like.

The network 1300 includes a UE 1302, which is any mobile or non-mobile computing device designed to communicate with a RAN 1304 via an over-the-air connection. The UE 1302 is communicatively coupled with the RAN 1304 by a Uu interface, which may be applicable to both LTE and NR systems. Examples of the UE 1302 include, but are not limited to, a smartphone, tablet computer, wearable device (e.g., smart watch, fitness tracker, smart glasses, smart clothing/fabrics, head-mounted displays, smart shows, and/or the like), desktop computer, workstation, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, machine-to-machine (M2M), device-to-device (D2D), machine-type communication (MTC) device, Internet of Things (IoT) device, smart appliance, flying drone or unmanned aerial vehicle (UAV), terrestrial drone or autonomous vehicle, robot, electronic signage, single-board computer (SBC) (e.g., Raspberry Pi, Arduino, Intel Edison, and the like), plug computers, and/or any type of computing device such as any of those discussed herein.

The network 1300 may include a set of UEs 1302 coupled directly with one another via a D2D, ProSe, PC5, and/or sidelink (SL) interface, and/or any other suitable interface such as any of those discussed herein. In 3GPP systems, SL communication involves communication between two or more UEs 1302 using 3GPP technology without traversing a network node. These UEs 1302 may be M2M/D2D/MTC/IoT devices and/or vehicular systems that communicate using an SL interface, which includes, for example, one or more SL logical channels (e.g., Sidelink Broadcast Control Channel (SBCCH), Sidelink Control Channel (SCCH), and Sidelink Traffic Channel (STCH)); one or more SL transport channels (e.g., Sidelink Shared Channel (SL-SCH) and Sidelink Broadcast Channel (SL-BCH)); and one or more SL physical channels (e.g., Physical Sidelink Shared Channel (PSSCH), Physical Sidelink Control Channel (PSCCH), Physical Sidelink Feedback Channel (PSFCH), Physical Sidelink Broadcast Channel (PSBCH), and/or the like). The UE 1302 may perform blind decoding attempts of SL channels/links according to the various examples herein.

The UE 1302 may communicate with an AP 1306 via an over-the-air (OTA) connection. The AP 1306 manages a WLAN connection, which may serve to offload some/all network traffic from the RAN 1304. The connection between the UE 1302 and the AP 1306 may be consistent with any IEEE 802.11 protocol. Additionally, the UE 1302, RAN 1304, and AP 1306 may utilize cellular-WLAN aggregation/integration (e.g., LWA/LWIP). Cellular-WLAN aggregation may involve the UE 1302 being configured by the RAN 1304 to utilize both cellular radio resources and WLAN resources.

The RAN 1304 includes one or more network access nodes (NANs) 1314, each of which terminate air-interface(s) for the UE 1302 by providing access stratum (AS) protocols including RRC, PDCP, RLC, MAC, and PHY protocols. In this manner, the NAN 1314 enables data/voice connectivity between CN 1340 and the UE 1302. The NANs 1314 may be a macrocell base station or a low power base station for providing femtocells, picocells or other like cells having smaller coverage areas, smaller user capacity, or higher bandwidth compared to macrocells; or some combination thereof. Each NAN 1314 manages one or more cells, cell groups, component carriers (CCs) in carrier aggregation (CA), and the like to provide the UE 1302 with an air interface for network access. The UE 1302 may be simultaneously connected with a set of cells provided by the same or different NANs 1314. For example, the UE 1302 and RAN 1304 may use CA to allow the UE 1302 to connect with a set of CCs, each corresponding to a PCell, SCell, PSCell, SpCell, and/or the like. In dual connectivity (DC) scenarios, a first NAN 1314 may be a master node that provides an MCG and a second NAN 1314 may be secondary node that provides an SCG. The first/second NANs 1314 may be any combination of eNB, gNB, ng-eNB, and the like.

The NG-RAN 1304 supports multi-radio DC (MR-DC) operation where a UE 1302 is configured to utilize radio resources provided by two distinct schedulers, located in at least two different NG-RAN nodes 1314 connected via a non-ideal backhaul, one NG-RAN node 1314 providing NR access and the other NG-RAN node 1314 providing either E-UTRA or NR access. One node acts as a master node (MN) and the other as a secondary node (SN), and the MN and SN are connected via a network interface and at least the MN is connected to the core network (e.g., CN 1340). In some implementations, the MN and/or the SN can be operated with shared spectrum channel access. Further details of MR-DC operation, including conditional PSCell addition (CPA) and conditional PSCell change (CPC), can be found in 3GPP TS 36.300 v17.5.0 (2023 Jul. 6) ("[TS36300]"), [TS38300], and 3GPP TS 37.340 v17.5.0 (2023 Jun. 30), the contents of each of which are hereby incorporated by reference in their entireties.

The UE 1302 can be configured to perform signal/cell measurement and reporting procedures to provide the network with information about the quality of one or more wireless channels and/or the communication media in general, and this information can be used to optimize various aspects of the communication system. The physical signals and/or reference signals (RS) that is/are measured include demodulation reference signals (DM-RS), phase-tracking reference signals (PT-RS), positioning reference signal (PRS), channel-state information reference signal (CSI-RS), synchronization signal block (SSB), primary synchronization signal (PSS), secondary synchronization signal (SSS), sounding reference signal (SRS), and/or the like. Additionally or alternatively, the UE 1302 can be configured to perform/collect signal/cell measurements of RS and/or physical channels, and provide measurement reports to one or more NANs 1314. The measurement reports include, for example, signal strength measurements, signal quality measurements, and/or the like. Each measurement report is tagged with a timestamp and/or a location of the measurement (e.g., the UEs 1302 location where the measurement was performed/collected). As examples, the measurement and reporting procedures performed by the UE 1302 can include those discussed in 3GPP TS 38.211 v17.5.0 (2023 Jun. 26), 3GPP TS 38.212 v17.5.0 (2023 Mar. 30), 3GPP TS 38.213 v17.6.0 (2023 Jun. 26), 3GPP TS 38.214 v17.6.0 (2023 Jun. 26), [TS38215], 3GPP TS 38.101-1 v18.2.0 (2023 Jun. 30), 3GPP TS 38.104 v18.2.0 (2023 Jun. 30), and/or 3GPP TS 38.133 v18.2.0 (2023 Jun. 30), [TS38331], the contents of each of which are hereby incorporated by reference in their entireties. Examples of the measurements included in the measurement reports include one or more of: bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, end-to-end (e2e) delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio ($E_b/N_0$), energy per chip to interference power density ratio ($E_c/I_0$), energy per chip to noise power density ratio ($E_c/N_0$), peak-to-average power ratio (PAPR), reference signal received power (RSRP), reference signal received quality (RSRQ), received signal strength indicator (RSSI), received channel power indicator (RCPI), received signal to noise indicator (RSNI), Received Signal Code Power (RSCP), average noise plus interference (ANPI), GNSS timing of cell frames, GNSS code measurements, GNSS carrier phase measurements and/or accumulated delta range (ADR), channel interference measurements, thermal noise power measurements, received interference power measurements, power histogram measurements, channel load measurements, station statistics, and/or additional or alternative measurements, such as any of those discussed in 3GPP TS 36.214 v17.0.0 (2022 Mar. 31), 3GPP TS 38.215 v17.3.0 (2023 Mar. 30) ("[TS38215]"), 3GPP TS 38.314 v17.3.0 (2023 Jun. 30), 3GPP TS 28.552 v18.3.0 (2023 Jun. 27) ("[TS28552]"), 3GPP TS 32.425 v17.1.0 (2021 Jun. 24) ("[TS32425]"), 3GPP TS 32.401 v17.0.0 (2022 Apr. 1), and *IEEE Standard for Information Technology—Telecommunications and Information Exchange between Systems—Local and Metropolitan Area Networks—Specific Requirements—Part* 11: *Wireless LAN Medium Access Control* (*MAC*) *and Physical Layer* (*PHY*) *Specifications*, IEEE Std 802.11-2020, pp. 1-4379 (26 Feb. 2021) ("[IEEE80211]"), the contents of each of which are hereby incorporated by reference in their entireties. Additionally or alternatively, any of the aforementioned measurements (or combination of measurements) may be collected by one or more NANs 1314 and provided to the edge compute node(s), NF(s), MnF(s), and/or any other entity/elements, such as any of those discussed herein.

In any of the examples discussed herein, any suitable data collection and/or measurement mechanism(s) may be used to collect the observation data such as, for example, data marking, sequence numbering, packet tracing, signal measurement, data sampling, and/or timestamping techniques. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a HW configuration/implementation or non-HW-specific, or may be based on various software parameters (e.g., OS type and version, and the like). Various configurations may be used to define any of the aforementioned data collection parameters. Such configurations may be defined by suitable specifications/standards, such as any of those discussed herein.

The RAN nodes 1314 may include a set of gNBs 1314*a*. Each gNB 1314*a* connects with 5G-enabled UEs 1302 using a 5G-NR air interface (Uu interface) with parameters and characteristics as discussed in [TS38300], among many other 3GPP standards. The RAN nodes 1314 may also include a set of ng-eNBs 1314*b* that connect with UEs 1302 via the 5G Uu and/or an LTE Uu interface. The gNBs 1314*a* and the ng-eNBs 1314*b* connect with the 5GC 1340 through respective NG interfaces, which include an N2 interface, an N3 interface, and/or other interfaces. The gNB 1314*a* and the ng-eNB 1314*b* are connected with each other over an Xn interface. Additionally, individual gNBs 1314*a* are connected to one another via respective Xn interfaces, and individual ng-eNBs 1314*b* are connected to one another via respective Xn interfaces. The NG interface may be split into two parts, an NG user plane (NG-U) interface, which carries traffic data between the nodes of the NG-RAN 1314 and a UPF 1348 (e.g., N3 interface), and an NG control plane (NG-C) interface, which is a signaling interface between the nodes of the NG-RAN 1314 and an AMF 1344 (e.g., N2 interface). The Xn interfaces may be separated into control/user plane interfaces, which allows the NANs 1314 to communicate information related to handovers (HOs), data/context transfers, mobility, load management, interference coordination, and the like.

The NG-RAN 1314 may provide a 5G-NR air interface (Uu interface) with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH. The 5G-NR air interface may utilize bandwidth parts (BWPs) for various purposes, for example, dynamic adaptation of the SCS.

One example implementation is a "CU/DU split" architecture where the NANs 1314 are embodied as a gNB-Central Unit (CU) that is communicatively coupled with one or more gNB-Distributed Units (DUs), where each DU may be communicatively coupled with one or more Radio Units (RUs) (see e.g., 3GPP TS 38.300 v17.5.0 (2023 Jun. 30) ("[TS38300]"), 3GPP TS 38.401 v17.5.0 (2023 Jun. 29) ("[TS38401]"), 3GPP TS 38.410 v 17.1.0 (2022 Jun. 23), and 3GPP TS 38.473 v17.5.0 (2023 Jun. 29), the contents of each of which are incorporated by reference in their entireties). Any other type of architectures, arrangements, and/or configurations can be used. For example, in some implementations, the RAN 1304, CN 1340, and/or edge computing nodes (e.g., server(s) 1338) can be disaggregard into various functions as discussed in U.S. application Ser. No. 17/704,658 filed on 25 Mar. 2022 ("['658]").

The RAN 1304 is communicatively coupled to CN 1340 that includes network elements and/or network functions (NFs) to provide various functions to support data and telecommunications services to customers/subscribers (e.g., UE 1302). The components of the CN 1340 may be implemented in one physical node or separate physical nodes. NFV may be utilized to virtualize any or all of the functions provided by the network elements of the CN 1340 onto physical compute/storage resources in servers, switches, and the like. A logical instantiation of the CN 1340 may be referred to as a network slice, and a logical instantiation of a portion of the CN 1340 may be referred to as a network sub-slice.

In the example of FIG. 13, the CN 1340 is a 5G core network (5GC) 1340 including an Authentication Server Function (AUSF) 1342, Access and Mobility Management Function (AMF) 1344, Session Management Function (SMF) 1346, User Plane Function (UPF) 1348, Network Slice Selection Function (NSSF) 1350, Network Exposure Function (NEF) 1352, Network Repository Function (NRF) 1354, Policy Control Function (PCF) 1356, Unified Data Management (UDM) 1358, Application Function (AF) 1360, Edge Application Server Discovery Function (EASDF) 1361, and Network Data Analytics Function (NWDAF) 1362 coupled with one another over various interfaces as shown. The NFs in the 5GC 1340 are briefly introduced as follows.

The NWDAF 1362 includes one or more of the following functionalities: support data collection from NFs and AFs 1360; support data collection from OAM 240; NWDAF service registration and metadata exposure to NFs and AFs 1360; support analytics information provisioning to NFs and AFs 1360; support machine learning (ML) model training and provisioning to NWDAF(s) 1362. Some or all of the NWDAF functionalities can be supported in a single instance of an NWDAF 1362. The NWDAF 1362 also includes an analytics reporting capability (e.g., an analytics logical function (AnLF)) comprising means that allow discovery of the type of analytics that can be consumed by an external party and/or the request for consumption of analytics information generated by the NWDAF 1362. The NWDAF 1362 may contain an AnLF and/or a model training logical function (MTLF). In some implementations, the NWDAF 1362 contains only an MTLF, only an AnLF, or both logical functions. The 5GS allows an NWDAF containing an AnLF (also referred to herein as "NWDAF-ANLF") to use trained ML model provisioning services from the same or different NWDAF containing an MTLF (also referred to herein as "NWDAF-MTLF"). The AnLF is a logical function in the NWDAF 1362 that performs inference, derives analytics information (e.g., derives statistics, inferences, and/or predictions based on analytics consumer requests) and exposes analytics services. Analytics information are either statistical information of past events, or predictive information. The MTLF is a logical function in the NWDAF 1362 that trains AI/ML models and exposes new training services (e.g., providing trained ML model) (see e.g., [TS23288] §§ 7.5, 7.6). In some implementations, the MnS-P, MnF, and/or MnF-PA 440 discussed previously may be an NWDAF-MTLF and the MnS-C (inside or outside an MnF) may be an NWDAF-AnLF, another NWDAF-MTLF, and/or another NF, such as any of those discussed herein. Additional aspects of NWDAF 1362 functionality are defined in 3GPP TS 23.288 v18.2.0 (2023 Jun. 21) ("[TS23288]").

The AUSF 1342 stores data for authentication of UE 1302 and handle authentication-related functionality. The AUSF 1342 may facilitate a common authentication framework for various access types.

The AMF 1344 allows other functions of the 5GC 1340 to communicate with the UE 1302 and the RAN 1304 and to subscribe to notifications about mobility events w.r.t the UE 1302. The AMF 1344 is also responsible for registration management (e.g., for registering UE 1302), connection management, reachability management, mobility management, lawful interception of AMF-related events, and access authentication and authorization. The AMF 1344 provides transport for SM messages between the UE 1302 and the SMF 1346, and acts as a transparent proxy for routing SM messages. AMF 1344 also provides transport for SMS messages between UE 1302 and an SMSF. AMF 1344 interacts with the AUSF 1342 and the UE 1302 to perform various security anchor and context management functions. Furthermore, AMF 1344 is a termination point of a RAN-CP interface, which includes the N2 reference point between the RAN 1304 and the AMF 1344. The AMF 1344 is also a termination point of NAS (N1) signaling, and performs NAS ciphering and integrity protection. The AMF 1344 also supports NAS signaling with the UE 1302 over an N3IWF interface. The N3IWF provides access to untrusted entities. N3IWF may be a termination point for the N2 interface between the (R)AN 1304 and the AMF 1344 for the control plane, and may be a termination point for the N3 reference point between the (R)AN 1304 and the 1348 for the user plane. As such, the AMF 1344 handles N2 signaling from the SMF 1346 and the AMF 1344 for PDU sessions and QoS, encapsulate/de-encapsulate packets for IPSec and N3 tunneling, marks N3 user-plane packets in the UL, and enforces QoS corresponding to N3 packet marking taking into account QoS requirements associated with such marking received over N2. N3IWF may also relay UL and DL control-plane NAS signaling between the UE 1302 and AMF 1344 via an N1 reference point between the UE 1302 and the AMF 1344, and relay UL and DL user-plane packets between the UE 1302 and UPF 1348. The N3IWF also provides mechanisms for IPsec tunnel establishment with the UE 1302. The AMF 1344 may exhibit an Namf service-based interface, and may be a termination point for an N14 reference point between two AMFs 1344 and an N17 reference point between the AMF 1344 and a 5G-EIR (not shown by FIG. 13). In addition to the functionality of the AMF 1344 described herein, the AMF 1344 may provide support for Network Slice restriction and Network Slice instance restriction based on NWDAF analytics.

The SMF 1346 is responsible for SM (e.g., session establishment, tunnel management between UPF 1348 and NAN 1314); UE IP address allocation and management (including optional authorization); selection and control of UP function; configuring traffic steering at UPF 1348 to route traffic to proper destination; termination of interfaces toward policy control functions; controlling part of policy enforcement, charging, and QoS; lawful intercept (for SM events and interface to LI system); termination of SM parts of NAS messages; DL data notification; initiating AN specific SM information, sent via AMF 1344 over N2 to NAN 1314; and determining SSC mode of a session. SM refers to management of a PDU session, and a PDU session or "session" refers to a PDU connectivity service that provides or enables the exchange of PDUs between the UE 1302 and the DN 1336. The SMF 1346 may also include the following functionalities to support edge computing enhancements (see e.g., [TS23548]): selection of EASDF 1361 and provision of its address to the UE as the DNS server for the PDU session; usage of EASDF 1361 services as defined in [TS23548]; and for supporting the application layer architecture defined in [TS23558], provision and updates of ECS address configuration information to the UE. Discovery and selection procedures for EASDFs 1361 is discussed in [TS23501] § 6.3.23.

The UPF 1348 acts as an anchor point for intra-RAT and inter-RAT mobility, an external PDU session point of interconnect to DN 1336, and a branching point to support multi-homed PDU session. PDU connectivity service and PDU session aspects are discussed in 3GPP TS 38.415 v17.0.0 (2022 Apr. 6) and 3GPP TS 38.413 v17.3.0 (2023 Jan. 6). The UPF 1348 also performs packet routing and forwarding, packet inspection, enforces user plane part of policy rules, lawfully intercept packets (UP collection), performs traffic usage reporting, perform QoS handling for a user plane (e.g., packet filtering, gating, UL/DL rate enforcement), performs UL traffic verification (e.g., SDF-to-QoS flow mapping), transport level packet marking in the UL and DL, and performs DL packet buffering and DL data notification triggering. UPF 1348 may include an UL classifier to support routing traffic flows to a data network.

The NSSF 1350 selects a set of network slice instances serving the UE 1302. The NSSF 1350 also determines allowed NSSAI and the mapping to the subscribed S-NS-SAIs, if needed. The NSSF 1350 also determines an AMF set to be used to serve the UE 1302, or a list of candidate AMFs 1344 based on a suitable configuration and possibly by querying the NRF 1354. The selection of a set of network slice instances for the UE 1302 may be triggered by the AMF 1344 with which the UE 1302 is registered by interacting with the NSSF 1350; this may lead to a change of AMF 1344. The NSSF 1350 interacts with the AMF 1344 via an N22 reference point; and may communicate with another NSSF in a visited network via an N31 reference point (not shown).

The NEF 1352 securely exposes services and capabilities provided by 3GPP NFs for third party, internal exposure/re-exposure, AFs 1360, edge computing networks/frameworks, and the like. In such examples, the NEF 1352 may authenticate, authorize, or throttle the AFs 1360. The NEF 1352 stores/retrieves information as structured data using the Nudr interface to a Unified Data Repository (UDR). The NEF 1352 also translates information exchanged with the AF 1360 and information exchanged with internal NFs. For example, the NEF 1352 may translate between an AF-Service-Identifier and an internal 5GC information, such as DNN, S-NSSAI, as described in clause 5.6.7 of [TS23501]. In particular, the NEF 1352 handles masking of network and user sensitive information to external AF's 1360 according to the network policy. The NEF 1352 also receives information from other NFs based on exposed capabilities of other NFs. This information may be stored at the NEF 1352 as structured data, or at a data storage NF using standardized interfaces. The stored information can then be re-exposed by the NEF 1352 to other NFs and AFs, or used for other purposes such as analytics. For example, NWDAF analytics may be securely exposed by the NEF 1352 for external party, as specified in [TS23288]. Furthermore, data provided by an external party may be collected by the NWDAF 1362 via the NEF 1352 for analytics generation purpose. The NEF 1352 handles and forwards requests and notifications between the NWDAF 1362 and AF(s) 1360, as specified in [TS23288].

The NRF 1354 supports service discovery functions, receives NF discovery requests from NF instances, and provides information of the discovered NF instances to the requesting NF instances. The NRF 1354 also maintains NF profiles of available NF instances and their supported services. The NF profile of NF instance maintained in the NRF 1354 includes the various information discussed in [TS23501], [TS23502], [TS23288], 3GPP TS 29.510 v18.3.0 (2023 Jun. 26), 3GPP TS 23.287 v18.0.0 (2023 Mar. 31), 3GPP TS 23.247 v18.2.0 (2023 Jun. 21), and/or the like.

The PCF 1356 provides policy rules to control plane functions to enforce them, and may also support unified policy framework to govern network behavior. The PCF 1356 may also implement a front end to access subscription information relevant for policy decisions in a UDR of the UDM 1358. In addition to communicating with functions over reference points as shown, the PCF 1356 exhibit an Npcf service-based interface.

The UDM 1358 handles subscription-related information to support the network entities' handling of communication sessions, and stores subscription data of UE 1302. For example, subscription data may be communicated via an N8 reference point between the UDM 1358 and the AMF 1344. The UDM 1358 may include two parts, an application front end and a UDR. The UDR may store subscription data and policy data for the UDM 1358 and the PCF 1356, and/or structured data for exposure and application data (including PFDs for application detection, application request information for multiple UEs 1302) for the NEF 1352. The Nudr service-based interface may be exhibited by the UDR to allow the UDM 1358, PCF 1356, and NEF 1352 to access a particular set of the stored data, as well as to read, update (e.g., add, modify), delete, and subscribe to notification of relevant data changes in the UDR. The UDM 1358 may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1358 may exhibit the Nudm service-based interface.

EASDF 1361 exhibits an Neasdf service-based interface, and is connected to the SMF 1346 via an N88 interface. One or multiple EASDF instances may be deployed within a PLMN, and interactions between 5GC NF(s) and the EASDF 1361 take place within a PLMN. The EASDF 1361 includes one or more of the following functionalities: registering to NRF 1354 for EASDF 1361 discovery and selection; handling the DNS messages according to the instruction from the SMF 1346; and/or terminating DNS security, if used. Handling the DNS messages according to the instruction from the SMF 1346 includes one or more of the following functionalities: receiving DNS message handling rules and/or BaselineDNSPattern from the SMF 1346; exchanging DNS messages from/with the UE 1302; forwarding DNS messages to C-DNS or L-DNS for DNS query; adding EDNS client subnet (ECS) option into DNS query for an FQDN; reporting to the SMF 1346 the information related to the received DNS messages; and/or buffering/discarding DNS messages from the UE 1302 or DNS Server. The EASDF has direct user plane connectivity (e.g., without any NAT) with the PSA UPF over N6 for the transmission of DNS signaling exchanged with the UE. The deployment of a NAT between EASDF 1361 and PSA UPF 1348 may or may not be supported. Additional aspects of the EASDF 1361 are discussed in [TS23548].

AF 1360 provides application influence on traffic routing, provide access to NEF 1352, and interact with the policy framework for policy control. The AF 1360 may influence UPF 1348 (re)selection and traffic routing. Based on operator deployment, when AF 1360 is considered to be a trusted entity, the network operator may permit AF 1360 to interact directly with relevant NFs. In some implementations, the AF 1360 is used for edge computing implementations. An NF that needs to collect data from an AF 1360 may subscribe/ unsubscribe to notifications regarding data collected from an AF 1360, either directly from the AF 1360 or via NEF 1352.

The 5GC 1340 may enable edge computing by selecting operator/3rd party services to be geographically close to a point that the UE 1302 is attached to the network. This may reduce latency and load on the network. In edge computing implementations, the 5GC 1340 may select a UPF 1348 close to the UE yx02 and execute traffic steering from the UPF 1348 to DN 1336 via the N6 interface. This may be based on the UE subscription data, UE location, and information provided by the AF 1360, which allows the AF 1360 to influence UPF (re)selection and traffic routing.

The data network (DN) 1336 is a network hosting data-centric services such as, for example, operator services, the internet, third-party services, and/or enterprise networks. The DN 1336 may represent various network operator services, Internet access, or third party services that may be provided by one or more servers 1338. As examples, the server(s) 1338 can be or include application (app) server(s), content server(s), web server(s), database server(s), edge compute node(s) or edge server(s), DNS server(s), cloud compute node(s) or cloud compute resource(s), and/or the like. The DN 1336 may be an operator external public, a private PDN, or an intra-operator packet data network, for example, for provision of IMS services. In some implementations, the DN 1336 may represent one or more local area DNs (LADNs), which are DNs 1336 (or DN names (DNNs)) that is/are accessible by a UE 1302 in one or more specific areas, which provides connectivity to a specific DNN, and whose availability is provided to the UE 1302. Outside of these specific areas, the UE 1302 is not able to access the LADN/DN 1336.

Additionally or alternatively, the DN 1336 may be an edge DN 1336, which is a (local) DN that supports the architecture for enabling edge applications. In these examples, the server(s) 1338 represent physical hardware systems/devices providing app server functionality and/or the app software resident in the cloud or at edge compute node(s) that performs server function(s). The server(s) 1338 provides an edge hosting environment (or an edge computing platform) that provides support for implementing or operating edge app execution and/or for providing one or more edge services. The 5GS 1300 can use one or more edge compute nodes to provide an interface and offload processing of wireless communication traffic. In these examples, the edge compute nodes may be included in, or co-located with one or more RANs 1304 or RAN nodes 1314. For example, the edge compute nodes can provide a connection between the RAN 1304 and UPF 1348 in the 5GC 1340. The edge compute nodes can use one or more NFV instances instantiated on virtualization infrastructure within the edge compute nodes to process wireless connections to and from the RAN 1314 and UPF 1348.

An edge computing network (or collection of edge compute nodes) provide a distributed computing environment for application and service hosting, and also provide storage and processing resources so that data and/or content can be processed in close proximity to subscribers (e.g., users of UEs 1302) for faster response times. The edge compute nodes also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. The edge compute nodes may include or be part of an edge system that employs one or more edge computing technologies (ECTs) (also referred to as an "edge computing framework" or the like). The edge compute nodes may also be referred to as "edge hosts" or "edge servers." The edge system includes a collection of edge servers and edge management systems (not shown) to run edge computing applications within an operator network or a subset of an operator network. The edge servers are physical computer systems that may include an edge platform and/or virtualization infrastructure, and provide compute, storage, and network resources to edge computing applications. Each of the edge servers are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 1302. The VI of the edge compute nodes provide virtualized environments and virtualized resources for the edge hosts, and the edge computing applications may run as VMs and/or application containers on top of the VI. Examples of the ECT includes the MEC framework (see e.g., ETSI GS MEC 003 v3.1.1 (2022 March)), Open RAN (O-RAN) (see e.g., O-RAN Working Group 1 (Use Cases and Overall Architecture): O-RAN Architecture Description, O-RAN ALLIANCE WG1, O-RAN Architecture Description v09.00, Release R003 (June 2023)), Multi-Access Management Services (MAMS) framework (see e.g., Kanugovi et al., Multi-Access Management Services (MAMS), INTERNET ENGINEERING TASK FORCE (IETF), Request for Comments (RFC) 8743 (March 2020)), and/or 3GPP System Architecture for enabling Edge Applications (see e.g., 3GPP TS 23.558 v18.3.0 (2023 Jun. 21) ("[TS23558]"), 3GPP TS 23.501 v18.2.1 (2023 Jun. 29) ("[TS23501]"), 3GPP TS 23.502 v18.2.0 (2023 Jun. 29) ("[TS23502]"), 3GPP TS 23.548 v18.2.0 (2023 Jun. 22) ("[TS23548]"), 3GPP TS 28.538 v18.3.0 (2023 Jun. 22), 3GPP TR 23.700-98 v18.1.0 (2023 Mar. 31), 3GPP TS 23.222 v18.2.0 (2023 Jun. 21), 3GPP TS 33.122 v18.0.0 (2023 Jun. 22), 3GPP TS 29.222 v18.2.0 (2023 Jun. 26), 3GPP TS 29.522 v18.2.0 (2023 Jun. 27), 3GPP TS 29.122 v18.2.0 (2023 Jun. 26), 3GPP TS 23.682 v18.0.0 (2023 Mar. 31), 3GPP TS 23.434 v18.5.0 (2023 Jun. 21), 3GPP TS 23.401 v18.2.0 (2023 Jun. 21), 3GPP TS 28.532 v17.5.2 (2023 Jul. 5), 3GPP TS 28.533 v17.3.0 (2023 Mar. 30) ("[TS28533]"), 3GPP TS 28.535 v17.7.0 (2023 Jun. 22) ("[TS28535]"), 3GPP TS 28.536 v17.5.0 (2023 Mar. 30) ("[TS28536]"), 3GPP TS 28.541 v18.4.1 (2023 Jun. 30), 3GPP TS 28.545 v17.0.0 (2021 Jun. 24), 3GPP TS 28.550 v18.1.0 (2023 Mar. 30) ("[TS28550]"), 3GPP TS 28.554 v18.2.0 (2023 Jun. 22) ("[TS28554]"), and 3GPP TS 28.622 v18.3.0 (2023 Jun. 22) ("[TS28622]") (collectively referred to herein as "[3GPPEdge]"), the contents of each of which are hereby incorporated by reference in their entireties). It should be understood that the aforementioned edge computing frameworks/ECTs and services deployment examples are only illustrative examples of ECTs, and that the present disclosure may be applicable to many other or additional edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure. Examples of such edge computing/networking technologies Further, the techniques disclosed herein may relate to other IoT edge network systems and configurations, and other intermediate processing entities and architectures may also be used for purposes of the present disclosure.

The interfaces of the 5GC 1340 include reference points and service-based interfaces. The reference points include: N1 (between the UE 1302 and the AMF 1344), N2 (between RAN 1314 and AMF 1344), N3 (between RAN 1314 and UPF 1348), N4 (between the SMF 1346 and UPF 1348), N5 (between PCF 1356 and AF 1360), N6 (between UPF 1348 and DN 1336), N7 (between SMF 1346 and PCF 1356), N8 (between UDM 1358 and AMF 1344), N9 (between two UPFs 1348), N10 (between the UDM 1358 and the SMF 1346), N11 (between the AMF 1344 and the SMF 1346), N12 (between AUSF 1342 and AMF 1344), N13 (between AUSF 1342 and UDM 1358), N14 (between two AMFs 1344; not shown), N15 (between PCF 1356 and AMF 1344 in case of a non-roaming scenario, or between the PCF 1356 in a visited network and AMF 1344 in case of a roaming scenario), N16 (between two SMFs 1346; not shown), and N22 (between AMF 1344 and NSSF 1350). Other reference point representations not shown in FIG. 13 can also be used. The service-based representation of FIG. 13 represents NFs within the control plane that enable other authorized NFs to access their services. The service-based interfaces (SBIs) include: Namf (SBI exhibited by AMF 1344), Nsmf (SBI exhibited by SMF 1346), Nnef (SBI exhibited by NEF 1352), Npcf (SBI exhibited by PCF 1356), Nudm (SBI exhibited by the UDM 1358), Naf (SBI exhibited by AF 1360), Nnrf (SBI exhibited by NRF 1354), Nnssf (SBI exhibited by NSSF 1350), Nausf (SBI exhibited by AUSF 1342). Other service-based interfaces (e.g., Nudr, N5g-eir, and Nudsf) not shown in FIG. 13 can also be used. The NEF 1352 can provide an interface to edge compute nodes, which can be used to process wireless connections with the RAN 1314.

Although not shown by FIG. 13, the system 1300 may also include NFs that are not shown such as, for example, UDR, Unstructured Data Storage Function (UDSF), Network Slice Admission Control Function (NSACF), Network Slice-specific and Stand-alone Non-Public Network (SNPN) Authentication and Authorization Function (NSSAAF), UE radio Capability Management Function (UCMF), 5G-Equipment Identity Register (5G-EIR), CHarging Function (CHF), Time Sensitive Networking (TSN) AF 1360, Time Sensitive Communication and Time Synchronization Function (TSCTSF), Data Collection Coordination Function (DCCF), Analytics Data Repository Function (ADRF), Messaging Framework Adaptor Function (MFAF), Binding Support Function (BSF), Non-Seamless WLAN Offload Function (NSWOF), Service Communication Proxy (SCP), Security Edge Protection Proxy (SEPP), Non-3GPP Inter-Working Function (N3IWF), Trusted Non-3GPP Gateway Function (TNGF), Wireline Access Gateway Function (W-AGF), and/or Trusted WLAN Interworking Function (TWIF) as discussed in [TS23501].

Figure 14:
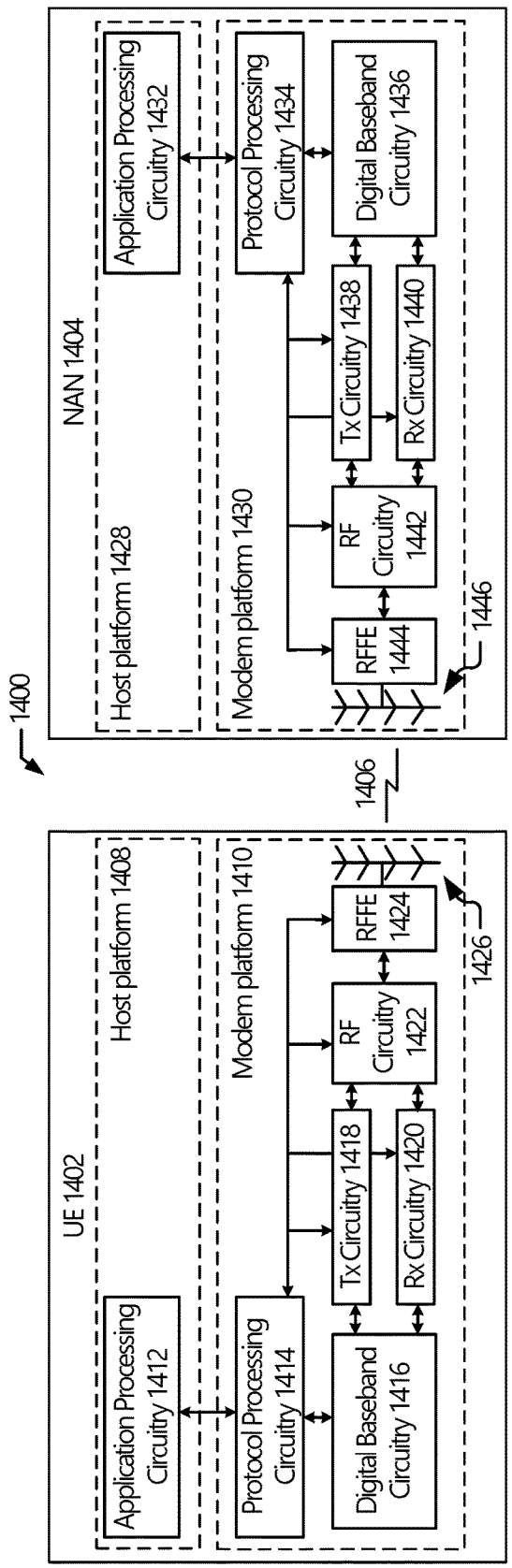
FIG. 14 depicts an example wireless network.

FIG. 14 illustrates a wireless network 1400 that includes a UE 1402 communicatively coupled with a NAN 1404 via a connection 1406. The UE 1402 and NAN 1404 may be the same or similar as the UE 1302 and NAN 1304, respectively. The connection 1406 is an air interface to enable communicative coupling, which is consistent with cellular communications protocols, such as LTE, a 5G/NR operating at mmWave or sub-6 GHz frequencies, and/or according to any other RAT discussed herein.

The UE 1402 includes a host platform 1408 coupled with a modem platform 1410. The host platform 1408 includes application processing circuitry 1412, which is coupled with protocol processing circuitry 1414 of the modem platform 1410. The application processing circuitry 1412 runs various applications for the UE 1402 that source/sink application data. The application processing circuitry 1412 implements one or more layer operations to transmit/receive application data to/from a data network. These layer operations include transport (e.g., UDP, TCP, QUIC, and/or the like), network (e.g., IP, and/or the like), and/or operations of other layers. The protocol processing circuitry 1414 implements one or more of layer operations to facilitate transmission or reception of data over the connection 1406. The layer operations implemented by the protocol processing circuitry 1414 includes, for example, MAC, RLC, PDCP, RRC and NAS operations.

The modem platform 1410 includes digital baseband circuitry 1416 that implements one or more layer operations that are "below" layer operations performed by the protocol processing circuitry 1414 in a network protocol stack. These operations includes, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which includes one or more of space-time, space-frequency or spatial coding, reference signal generation/detection, preamble sequence generation and/or decoding, synchronization sequence generation/detection, control channel signal blind decoding, and other related functions.

The modem platform 1410 includes transmit (Tx) circuitry 1418, receive (Rx) circuitry 1420, radiofrequency (RF) circuitry 1422, and an RF front end (RFFE) 1424, which includes or connects to one or more antenna panels 1426. The Tx circuitry 1418 includes a digital-to-analog converter, mixer, intermediate frequency (IF) components, and/or the like; the Rx circuitry 1420 includes an analog-to-digital converter, mixer, IF components, and/or the like; the RF circuitry 1422 includes a low-noise amplifier, a power amplifier, power tracking components, and/or the like; the RFFE 1424 includes filters (e.g., surface/bulk acoustic wave filters), switches, antenna tuners, beamforming components (e.g., phase-array antenna components), and/or the like; and the antenna panels 1426 (also referred to as "Tx/Rx components") include one or more antenna elements, such as planar inverted-F antennas (PIFAs), monopole antennas, dipole antennas, loop antennas, patch antennas, Yagi antennas, parabolic dish antennas, omni-directional antennas, and/or the like. The selection and arrangement of the components of the Tx circuitry 1418, Rx circuitry 1420, RF circuitry 1422, RFFE 1424, and antenna panels 1426 may be specific to details of a specific implementation such as, for example, whether communication is TDM or FDM, in mmWave or sub-6 gHz frequencies, and/or the like. The Tx/Rx components may be arranged in multiple parallel Tx/Rx chains, may be disposed in the same or different chips/modules, and/or the like. The protocol processing circuitry 1414 includes one or more instances of control circuitry (not shown) to provide control functions for the Tx/Rx components.

A UE reception is established by and via the antenna panels 1426, RFFE 1424, RF circuitry 1422, Rx circuitry 1420, digital baseband circuitry 1416, and protocol processing circuitry 1414. The antenna panels 1426 may receive a transmission from the NAN 1404 by receive-beamforming signals received by a set of antennas/antenna elements of the antenna panels 1426. A UE transmission is established by and via the protocol processing circuitry 1414, digital baseband circuitry 1416, Tx circuitry 1418, RF circuitry 1422, RFFE 1424, and antenna panels 1426. The Tx components of the UE 1404 may apply a spatial filter to the data to be transmitted to form a Tx beam emitted by the antenna elements of the antenna panels 1426.

Similar to the UE 1402, the NAN 1404 includes a host platform 1428 coupled with a modem platform 1430. The host platform 1428 includes application processing circuitry 1432 coupled with protocol processing circuitry 1434 of the modem platform 1430. The modem platform may further include digital baseband circuitry 1436, Tx circuitry 1438, Rx circuitry 1440, RF circuitry 1442, RFFE circuitry 1444, and antenna panels 1446. The components of the NAN 1404 may be similar to and substantially interchangeable with like-named components of the UE 1402. In addition to performing data transmission/reception as described previously, the components of the NAN 1408 may perform various logical functions that include, for example, RNC functions such as radio bearer management, uplink and downlink dynamic radio resource management, data packet scheduling, and/or various other functions, such as any of those discussed herein.

Figure 15:
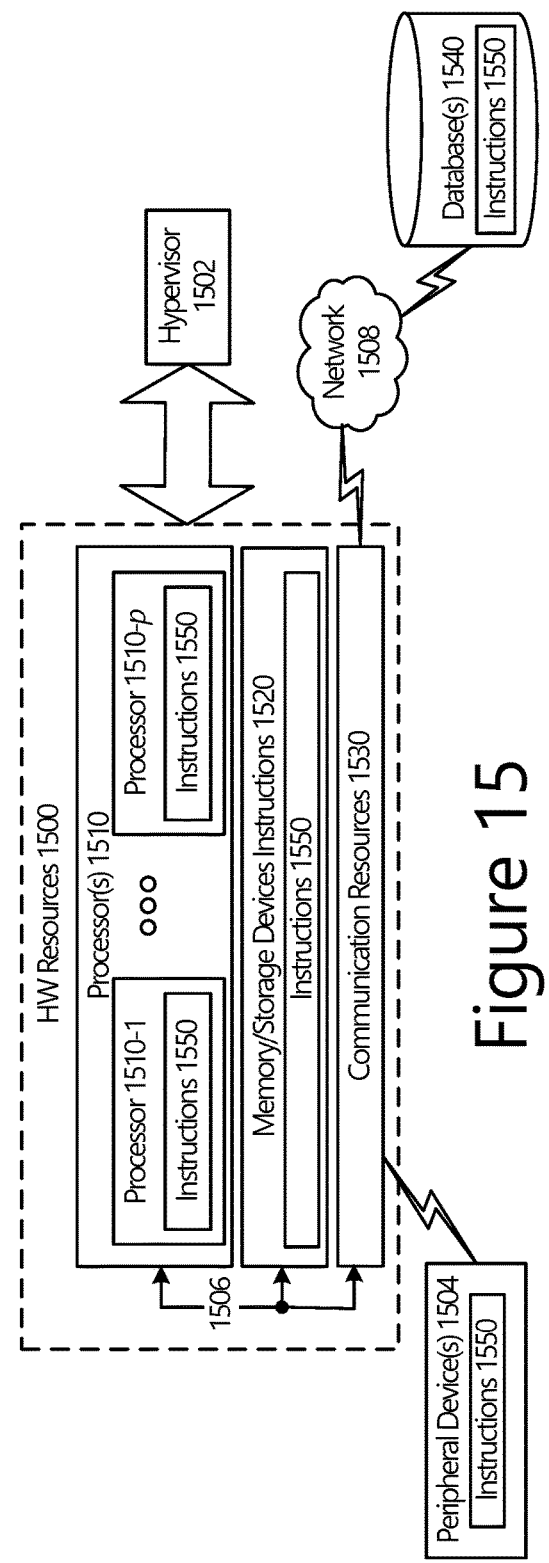
FIG. 15 depicts example hardware resources.

FIG. 15 illustrates hardware resources 1500 capable of reading instructions from a machine-readable or computer-readable medium (e.g., a non-transitory machine-readable storage medium) and perform any one or more of the methodologies discussed herein. The hardware resources 1500 may correspond to any of the entities/elements discussed herein, such as the MnS-P; MnS-C; MnF and/or MnF-PA 440; UE 1302, 1402; NANs 1314, 1404; framework 1600; MLF 1702, 1704; and/or any of the NFs discussed w.r.t FIGS. 1-14 and/or 16-19. The hardware resources 1500 include one or more processors (or processor cores) 1510, one or more memory/storage devices 1520, and one or more communication resources 1530, each of which may be communicatively coupled via a interconnect (IX) 1506 or other interface circuitry, which implement any suitable bus and/or IX technologies. Where node virtualization (e.g., NFV) is utilized, a hypervisor 1502 may be executed to provide an execution environment for one or more network slices/sub-slices to utilize the hardware resources 1500. The hardware resources 1500 may be implemented in or by an individual compute node, which may be housed in an enclosure of various form factors. Additionally or alternatively, the hardware resources 1500 may be implemented by multiple compute nodes that may be deployed in one or more data centers and/or distributed across one or more geographic regions.

The processors 1510 include, for example, a processor 1510-1 to 1510-$p$ (where p is a number). The processors 1510 may be or include, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), a microprocessor or controller, a multi-core processor, a multithreaded processor, an ultra-low voltage processor, an embedded processor, an xPU, a data processing unit (DPU), an Infrastructure Processing Unit (IPU), a network processing unit (NPU), another processor (including any of those discussed herein), and/or any suitable combination thereof.

The memory/storage devices 1520 include, for example, main memory, disk storage, or any suitable combination thereof. The memory/storage devices 1520 may include, but are not limited to, any type of volatile, non-volatile, semi-volatile memory, and/or any combination thereof. As examples, the memory/storage devices 1520 can be or include random access memory (RAM), static RAM (SRAM), dynamic RAM (DRAM), synchronous DRAM (SDRAM), magnetoresistive RAM (MRAM), conductive bridge Random Access Memory (CB-RAM), spin transfer torque (STT)-MRAM, phase change RAM (PRAM), core memory, dual inline memory modules (DIMMs), microDIMMs, MiniDIMMs, block addressable memory device(s) (e.g., those based on NAND or NOR technologies (e.g., single-level cell (SLC), Multi-Level Cell (MLC), Quad-Level Cell (QLC), Tri-Level Cell (TLC), or some other NAND), read-only memory (ROM), programmable ROM (PROM), erasable PROM (EPROM), electrically EPROM (EEPROM), flash memory, non-volatile RAM (NVRAM), solid-state storage, magnetic disk storage mediums, optical storage mediums, memory devices that use chalcogenide glass, multi-threshold level NAND flash memory, NOR flash memory, single or multi-level Phase Change Memory (PCM) and/or phase change memory with a switch (PCMS), NVM devices that use chalcogenide phase change material (e.g., chalcogenide glass), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, and/or a combination of any of the aforementioned memory devices, and/or other memory.

The communication resources 1530 include, for example, interconnection controllers and/or network interface controllers, components, or other suitable devices to communicate with one or more peripheral devices 1504, one or more databases 1540, and/or other network elements via a network 1508. The network 1508 may represent any suitable network (e.g., DN 1336, the Internet, an enterprise network, WAN, LAN, WLAN, VPN, and/or the like), an edge computing network, a cloud computing service, and/or the like. For example, the communication resources 1530 can include wired communication components (e.g., for coupling via USB, Ethernet, and/or the like), cellular communication components, NFC components, Bluetooth® (or Bluetooth® Low Energy) components, WiFi® components, and other communication components.

Instructions 1550 comprise software, program code, application(s), applet(s), an app(s), firmware, microcode, machine code, and/or other executable code for causing at least any of the processors 1510 to perform any one or more of the methodologies and/or techniques discussed herein. The instructions 1550 may reside, completely or partially, within at least one of the processors 1510 (e.g., within the processor's cache memory), the memory/storage devices 1520, or any suitable combination thereof. Any portion of the instructions 1550 may be transferred to the hardware resources 1500 from any combination of the peripheral devices 1504 and/or the databases 1540. Accordingly, the memory of processors 1510, the memory/storage devices 1520, the peripheral devices 1504, and the databases 1540 are examples of computer-readable and machine-readable media.

In some implementations, the peripheral devices 1504 may represent one or more sensors (also referred to as "sensor circuitry"). The sensor circuitry includes devices, modules, or subsystems whose purpose is to detect events or changes in its environment and send the information (sensor data) about the detected events to some other a device, module, subsystem, and/or the like. Individual sensors may be exteroceptive sensors (e.g., sensors that capture and/or measure environmental phenomena and/external states), proprioceptive sensors (e.g., sensors that capture and/or measure internal states of a compute node or platform and/or individual components of a compute node or platform), and/or exproprioceptive sensors (e.g., sensors that capture, measure, or correlate internal states and external states). Examples of such sensors include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node or platform); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

Additionally or alternatively, the peripheral devices 1504 may represent one or more actuators, which allow a compute node, platform, machine, device, mechanism, system, or other object to change its state, position, and/or orientation, or move or control a compute node (e.g., node 1500), platform, machine, device, mechanism, system, or other object. The actuators comprise electrical and/or mechanical devices for moving or controlling a mechanism or system, and converts energy (e.g., electric current or moving air and/or liquid) into some kind of motion. As examples, the actuators can be or include any number and combination of the following: soft actuators (e.g., actuators that changes its shape in response to a stimuli such as, for example, mechanical, thermal, magnetic, and/or electrical stimuli), hydraulic actuators, pneumatic actuators, mechanical actuators, electromechanical actuators (EMAs), microelectromechanical actuators, electrohydraulic actuators, linear actuators, linear motors, rotary motors, DC motors, stepper motors, servomechanisms, electromechanical switches, electromechanical relays (EMRs), power switches, valve actuators, piezoelectric actuators and/or biomorphs, thermal biomorphs, solid state actuators, solid state relays (SSRs), shape-memory alloy-based actuators, electroactive polymer-based actuators, relay driver integrated circuits (ICs), solenoids, impactive actuators/mechanisms (e.g., jaws, claws, tweezers, clamps, hooks, mechanical fingers, humaniform dexterous robotic hands, and/or other gripper mechanisms that physically grasp by direct impact upon an object), propulsion actuators/mechanisms, projectile actuators/mechanisms, and/or audible sound generators, visual warning devices, and/or other like electromechanical components. The compute node 1500 may be configured to operate one or more actuators based on one or more captured events, instructions, control signals, and/or configurations received from a service provider, client device, and/or other components of a compute node or platform. Additionally or alternatively, the actuators are used to change the operational state, position, and/or orientation of the sensors.

3. Artificial Intelligence and Machine Learning Aspects

Figure 16:
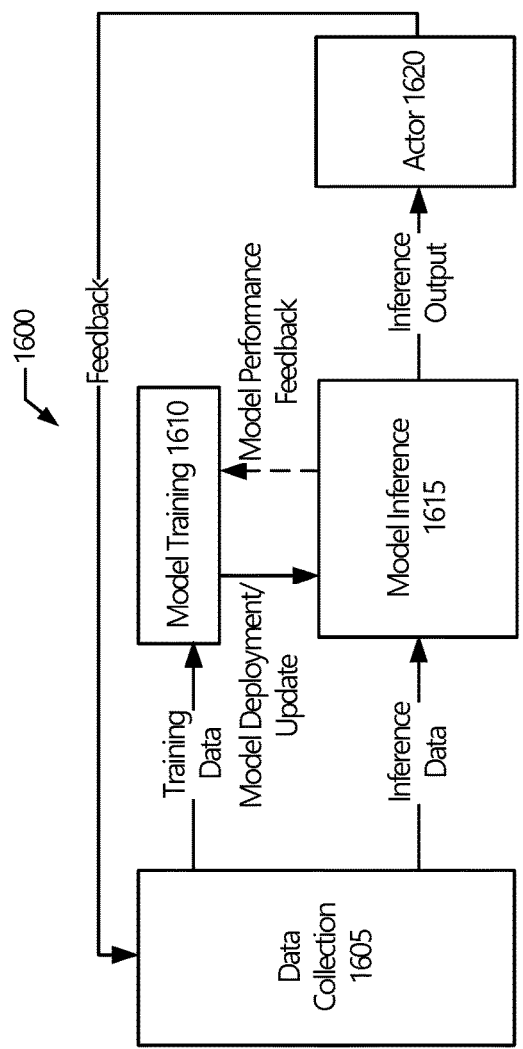
FIG. 16 depicts an example functional framework for RAN Intelligence.

FIG. 16 depicts an example functional framework 1600 for RAN intelligence. The functional framework 1600 includes a data collection function 1605, which is a function that provides input data to the model training function 1610 and model inference function 1615. AI/ML algorithm-specific data preparation (e.g., data pre-processing and cleaning, formatting, and transformation) may or may not be carried out in the data collection function 1605. Examples of input data may include measurements from UEs 1302, RAN nodes 1314, and/or additional or alternative network entities; feedback from actor 1620; and/or output(s) from AI/ML model(s). The input data fed to the model training function 1610 is training data, and the input data fed to the model inference function 1615 is inference data.

The model training function 1610 is a function that performs the AI/ML model training, validation, and testing. The model training function 1610 may generate model performance metrics as part of the model testing procedure and/or as part of the model validation procedure. Examples of the model performance metrics are discussed infra. The model training function 1610 may also be responsible for data preparation (e.g., data pre-processing and cleaning, formatting, and transformation) based on training data delivered by the data collection function 1605, if required.

The model training function 1610 performs model deployment/updates, wherein the model training function 1610 initially deploys a trained, validated, and tested AI/ML model to the model inference function 1615, and/or delivers updated model(s) to the model inference function 1615. Examples of the model deployments and updates are discussed infra.

The model inference function 1615 is a function that provides AI/ML model inference output (e.g., statistical inferences, predictions, decisions, probabilities and/or probability distributions, actions, configurations, policies, data analytics, outcomes, optimizations, and/or the like). The model inference function 1615 may provide model performance feedback to the model training function 1610 when applicable. The model performance feedback may include various performance metrics (e.g., any of those discussed herein) related to producing inferences. The model performance feedback may be used for monitoring the performance of the AI/ML model, when available. The model inference function 1615 may also be responsible for data preparation (e.g., data pre-processing and cleaning, formatting, and transformation) based on inference data delivered by the data collection function 1605, if required.

The model inference function 1615 produces an inference output, which is the inferences generated or otherwise produced when the model inference function 1615 operates the AI/ML model using the inference data. The model inference function 1615 provides the inference output to the actor 1620. Details of inference output are use case specific and may be based on the specific type of AI/ML model being used (see e.g., FIGS. 18-19).

The actor 1620 is a function that receives the inference output from the model inference function 1615, and triggers or otherwise performs corresponding actions based on the inference output. The actor 1620 may trigger actions directed to other entities and/or to itself. In some examples, the actor 1620 is an NES function, a mobility optimization function, and/or a load balancing function. Additionally or alternatively, the inference output is related to NES, mobility optimization, and/or load balancing, and the actor 1620 is one or more RAN nodes 1314 that perform various NES operations, mobility optimization operations, and/or load balancing operations based on the inferences.

The actor 1620 may also provide feedback to the data collection function 1605 for storage. The feedback includes information related to the actions performed by the actor 1620. The feedback may include any information that may be needed to derive training data (and/or testing data and/or validation data), inference data, and/or data to monitor the performance of the AI/ML model and its impact to the network through updating of KPIs, performance counters, and the like.

Figure 17:
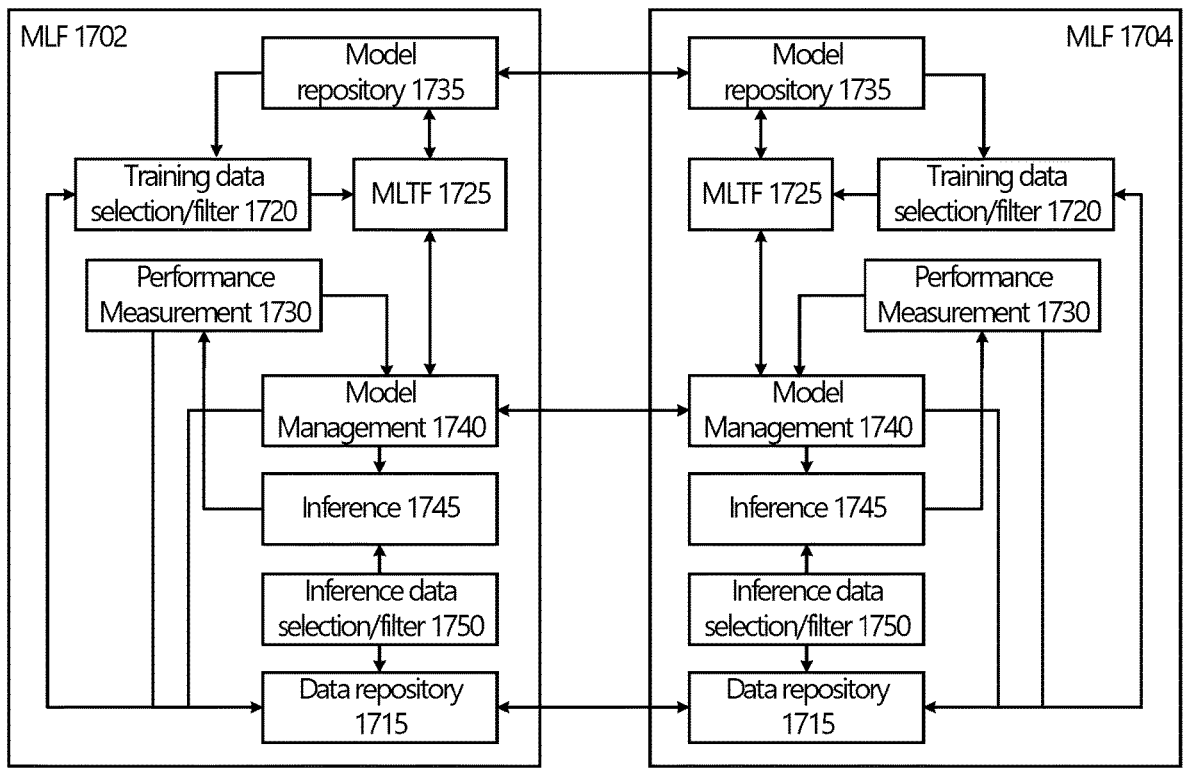
FIG. 17 depicts an example AI/ML-assisted communication architecture.

FIG. 17 depicts an example AI/ML-assisted communication network, which includes communication between an ML function (MLF) 1702 and an MLF 1704. More specifically, as described in further detail below, AI/ML models may be used or leveraged to facilitate wired and/or over-the-air communication between the MLF 1702 and the MLF 1704. In this example, the MLF 1702 and the MLF 1704 operate in a matter consistent with 3GPP technical specifications and/or technical reports for 5G and/or 6G systems. In some examples, the communication mechanisms between the MLF 1702 and the MLF 1704 include any suitable access technologies and/or RATs, such as any of those discussed herein. Additionally, the communication mechanisms in FIG. 17 may be part of, or operate concurrently with networks 1300, 1400, 1508, and/or some other network described herein, and/or concurrently with deployments 100, 110, 120, 130, 200, 300, 400, 1000, and/or some other deployment described herein.

The MLFs 1702, 1704 may correspond to any of the entities/elements discussed herein. In one example, the MLF 1702 corresponds to an MnF, MnF-PA 440, and/or MnS-P and the MLF 1704 corresponds to a consumer 310, an MnS-C, or vice versa. Additionally or alternatively, the MLF 1702 corresponds to a set of the MLFs of FIGS. 2-3 and/or 16-17 and the MLF 1704 corresponds to a different set of the MLFs of FIGS. 2-3 and/or 16-17. In this example, the sets of MLFs may be mutually exclusive, or some or all of the MLFs in each of the sets of MLFs may overlap or be shared. In another example, the MLF 1702 and/or the MLF 1704 is/are implemented by respective UEs (e.g., UE 1302, UE 1402). Additionally or alternatively, the MLF 1702 and/or the MLF 1704 is/are implemented by a same UE or different UEs. In another example, the MLF 1702 and/or the MLF 1704 is/are implemented by respective RANs (e.g., RAN 1304) or respective NANs (e.g., AP 1306, NAN 1314, NAN 1404).

As shown by FIG. 17, the MLF 1702 and the MLF 1704 include various AI/ML-related components, functions, elements, or entities, which may be implemented as hardware, software, firmware, and/or some combination thereof. In some examples, one or more of the AI/ML-related elements are implemented as part of the same hardware (e.g., IC, chip, or multi-processor chip), software (e.g., program, process, engine, and/or the like), or firmware as at least one other component, function, element, or entity. The AI/ML-related elements of MLF 1702 may be the same or similar to the AI/ML-related elements of MLF 1704. For the sake of brevity, description of the various elements is provided from the point of view of the MLF 1702, however it will be understood that such description applies to like named/numbered elements of MLF 1704, unless explicitly stated otherwise.

The data repository 1715 is responsible for data collection and storage. As examples, the data repository 1715 may collect and store RAN configuration parameters, NF configuration parameters, measurement data, RLM data, key performance indicators (KPIs), SLAs, model performance metrics, knowledge base data, ground truth data, ML model parameters, hyperparameters, and/or other data for model training, update, and inference. The collected data is stored into the repository 1715, and the stored data can be discovered and extracted by other elements from the data repository 1715. For example, the inference data selection/filter 1750 may retrieve data from the data repository 1715 and provide that data to the inference engine 1745 for generating/determining inferences. In various examples, the MLF 1702 is configured to discover and request data from the data repository 1715 in the MLF 1704, and/or vice versa. In these examples, the data repository 1715 of the MLF 1702 may be communicatively coupled with the data repository 1715 of the MLF 1704 such that the respective data repositories 1715 may share collected data with one another. Additionally or alternatively, the MLF 1702 and/or MLF 1704 is/are configured to discover and request data from one or more external sources and/or data storage systems/devices.

The training data selection/filter 1720 is configured to generate training, validation, and testing datasets for ML training (MLT) (or ML model training). One or more of these datasets may be extracted or otherwise obtained from the data repository 1715. Data may be selected/filtered based on the specific AI/ML model to be trained. Data may optionally be transformed, augmented, and/or pre-processed (e.g., normalized) before being loaded into datasets. The training data selection/filter 1720 may label data in datasets for supervised learning, or the data may remain unlabeled for unsupervised learning. The produced datasets may then be fed into the MLT function (MLTF) 1725.

The MLTF 1725 is responsible for training and updating (e.g., tuning and/or re-training) AI/ML models. A selected model (or set of models) may be trained using the fed-in datasets (including training, validation, testing) from the training data selection/filtering 1720. The MLTF 1725 produces trained and tested AI/ML models that are ready for deployment. The produced trained and tested models can be stored in a model repository 1735. In some examples, the MLTF 1725 corresponds to the model training function 210*a* and/or model training function 1610.

The model repository 1735 is responsible for AI/ML models' (both trained and un-trained) storage and exposure. Various model data can be stored in the model repository 1735. The model data can include, for example, trained/updated model(s), model parameters, hyperparameters, and/or model metadata, such as model performance metrics, hardware platform/configuration data, model execution parameters/conditions, and/or the like. In some examples, the model data can also include inferences made when operating the ML model. Examples of AI/ML models and other ML model aspects are discussed infra w.r.t FIGS. 18 and 19. The model data may be discovered and requested by other MLF components (e.g., the training data selection/filter 1720 and/or the MLTF 1725). In some examples, the MLF 1702 can discover and request model data from the model repository 1735 of the MLF 1704. Additionally or alternatively, the MLF 1704 can discover and/or request model data from the model repository 1735 of the MLF 1702. In some examples, the MLF 1704 may configure models, model parameters, hyperparameters, model execution parameters/conditions, and/or other ML model aspects in the model repository 1735 of the MLF 1702.

The model management function 1740 is responsible for management of the AI/ML model produced by the MLTF 1725. Such management functions may include deployment of a trained model, monitoring ML entity performance, reporting ML entity validation and/or performance data, and/or the like. In model deployment, the model management 1740 may allocate and schedule hardware and/or software resources for inference, based on received trained and tested models. For purposes of the present disclosure, the term "inference" refers to the process of using trained AI/ML model(s) to generate statistical inferences, predictions, decisions, probabilities and/or probability distributions, actions, configurations, policies, data analytics, outcomes, optimizations, and/or the like based on new, unseen data (e.g., "input inference data"). In some examples, the inference process can include feeding input inference data into the ML model (e.g., inference engine 1745), forward passing the input inference data through the ML model's architecture/topology wherein the ML model performs computations on the data using its learned parameters (e.g., weights and biases), and predictions output. In some examples, the inference process can include data transformation before the forward pass, wherein the input inference data is preprocessed or transformed to match the format required by the ML model. In performance monitoring, based on model performance KPIs and/or metrics, the model management 1740 may decide to terminate the running model, start model re-training and/or tuning, select another model, and/or the like. In examples, the model management 1740 of the MLF 1704 may be able to configure model management policies in the MLF 1702, and vice versa.

The inference data selection/filter 1750 is responsible for generating datasets for model inference at the inference 1745, as described infra. For example, inference data may be extracted from the data repository 1715. The inference data selection/filter 1750 may select and/or filter the data based on the deployed AI/ML model. Data may be transformed, augmented, and/or pre-processed in a same or similar manner as the transformation, augmentation, and/or pre-processing of the training data selection/filtering as described w.r.t training data selection filter 1720. The produced inference dataset may be fed into the inference engine 1745.

The inference engine 1745 is responsible for executing inference as described herein. The inference engine 1745 may consume the inference dataset provided by the inference data selection/filter 1750, and generate one or more inferences. The inferences may be or include, for example, statistical inferences, predictions, decisions, probabilities and/or probability distributions, actions, configurations, policies, data analytics, outcomes, optimizations, and/or the like. The inference(s)/outcome(s) may be provided to the performance measurement function 1730.

The performance measurement function 1730 is configured to measure model performance metrics (e.g., accuracy, momentum, precision, quantile, recall/sensitivity, model bias, run-time latency, resource consumption, and/or other suitable metrics/measures, such as any of those discussed herein) of deployed and executing models based on the inference(s) for monitoring purposes. Model performance data may be stored in the data repository 1715 and/or reported according to the validation reporting mechanisms discussed herein.

The performance metrics that may be measured and/or predicted by the performance measurement function 1730 may be based on the particular AI/ML task and the other inputs/parameters of the ML entity. The performance metrics may include model-based metrics and platform-based metrics. The model-based metrics are metrics related to the performance of the model itself and/or without considering the underlying hardware platform. The platform-based metrics are metrics related to the performance of the underlying hardware platform when operating the ML model.

The model-based metrics may be based on the particular type of AI/ML model and/or the AI/ML domain. For example, regression-related metrics may be predicted for regression-based ML models. Examples of regression-related metrics include error value, mean error, mean absolute error (MAE), mean reciprocal rank (MRR), mean squared error (MSE), root MSE (RMSE), correlation coefficient (R), coefficient of determination ($R^2$), Golbraikh and Tropsha criterion, and/or other like regression-related metrics such as those discussed in Naser et al., *Insights into Performance Fitness and Error Metrics for Machine Learning*, arXiv: 2006.00887v1 (17 May 2020) ("[Naser]"), which is hereby incorporated by reference in its entirety.

In another example, correlation-related metrics may be predicted for correlation-related metrics Examples of correlation-related metrics include accuracy, precision (also referred to as positive predictive value (PPV)), mean average precision (mAP), negative predictive value (NPV), recall (also referred to as true positive rate (TPR) or sensitivity), specificity (also referred to as true negative rate (TNR) or selectivity), false positive rate, false negative rate, F score (e.g., $F_1$ score, $F_2$ score, $F_\beta$ score, etc.), Matthews Correlation Coefficient (MCC), markedness, receiver operating characteristic (ROC), area under the ROC curve (AUC), distance score, and/or other like correlation-related metrics such as those discussed in [Naser].

Additional or alternative model-based metrics may also be predicted such as, for example, cumulative gain (CG), discounted CG (DCG), normalized DCG (NDCG), signal-to-noise ratio (SNR), peak SNR (PSNR), structural similarity (SSIM), Intersection over Union (IoU), perplexity, bilingual evaluation understudy (BLEU) score, inception score, Wasserstein metric, Fréchet inception distance (FID), string metric, edit distance, Levenshtein distance, Damerau-Levenshtein distance, number of evaluation instances (e.g., iterations, epochs, or episodes), learning rate (e.g., the speed at which the algorithm reaches (converges to) optimal weights), learning rate decay (or weight decay), number and/or type of computations, number and/or type of multiply and accumulates (MACs), number and/or type of multiply adds (MAdds) operations and/or other like performance metrics related to the performance of the ML model.

Examples of the platform-based metrics include latency, response time, throughput (e.g., rate of processing work of a processor or platform/system), availability and/or reliability, power consumption (e.g., performance per Watt, and/or the like), transistor count, execution time (e.g., amount of time to obtain an inference, and/or the like), memory footprint, memory utilization, processor utilization, processor time, number of computations, instructions per second (IPS), floating point operations per second (FLOPS), and/or other like performance metrics related to the performance of the ML model and/or the underlying hardware platform to be used to operate the ML model.

Additionally or alternatively, proxy metrics (e.g., a metric or attribute used as a stand-in or substitute for another metric or attribute) can be used for predicting the ML model performance. For any of the aforementioned performance metrics, the total, mean, and/or some other distribution of such metrics may be predicted and/or measured using any suitable data collection and/or measurement mechanism(s).

Figure 18:
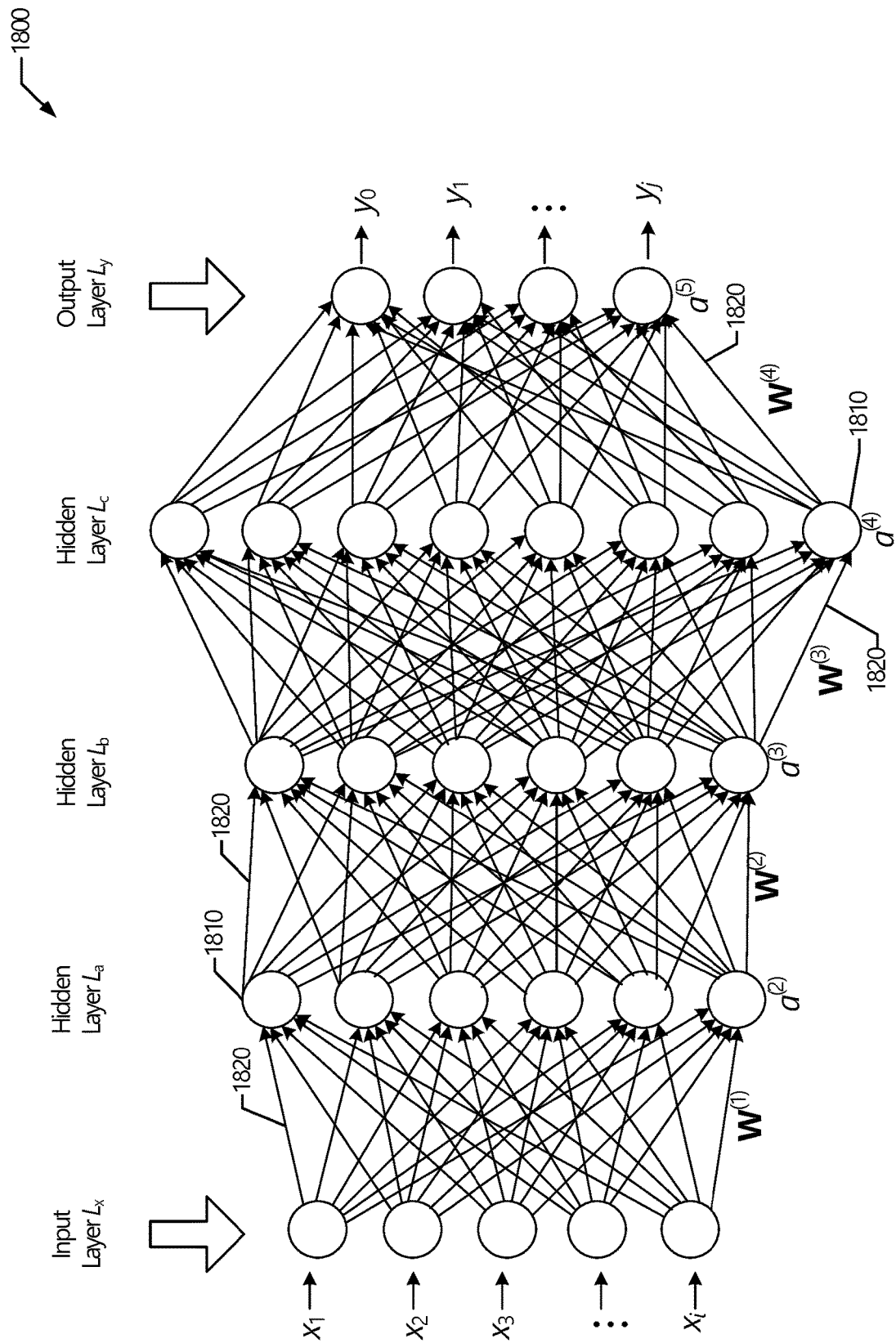
FIG. 18 depicts an example neural network (NN)

FIG. 18 illustrates an example neural networks (NN) 1800, which may be suitable for use by one or more of the computing systems (or subsystems) of the various implementations discussed herein, implemented in part by a HW accelerator, and/or some other system, device, component, or function, such as any of those discussed herein. The NN 1800 uses data or otherwise functions in a way that mimics the working of a biological brain. The NN 1800 may be deep neural network (DNN) used as an artificial brain of a compute node or network of compute nodes to handle very large and complicated observation spaces. Additionally or alternatively, the NN 1800 can be some other type of topology (or combination of topologies), such as a deep NN, feed forward NN (FFN), deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), echo state network (ESN), and the like), spiking NN (SNN), deep stacking network (DSN), Markov chain, perception NN, generative adversarial network (GAN), transformers, stochastic NNs (e.g., Bayesian Network (BN), Bayesian belief network (BBN), a Bayesian NN (BNN), Deep BNN (DBNN), Dynamic BN (DBN), probabilistic graphical model (PGM), Boltzmann machine, restricted Boltzmann machine (RBM), Hopfield network or Hopfield NN, convolutional deep belief network (CDBN), and the like), Linear Dynamical System (LDS), Switching LDS (SLDS), Optical NNs (ONNs), an NN for reinforcement learning (RL) and/or deep RL (DRL), attention and/or self-attention mechanisms, and/or the like. NNs are usually used for supervised learning, but can be used for unsupervised learning and/or RL.

The NN 1800 may encompass a variety of ML techniques where a collection of connected artificial neurons 1810 that (loosely) model neurons in a biological brain that transmit signals to other neurons/nodes 1810. The neurons 1810 may also be referred to as nodes 1810, processing elements (PEs) 1810, or the like. The connections 1820 (or edges 1820) between the nodes 1810 are (loosely) modeled on synapses of a biological brain and convey the signals between nodes 1810. Note that not all neurons 1810 and edges 1820 are labeled in FIG. 18 for the sake of clarity.

Each neuron 1810 has one or more inputs and produces an output, which can be sent to one or more other neurons 1810 (the inputs and outputs may be referred to as "signals"). Inputs to the neurons 1810 of the input layer $L_x$ can be feature values of a sample of external data (e.g., input variables $x_i$). The input variables $x_i$ can be set as a vector containing relevant data (e.g., observations, ML features, and the like). The inputs to hidden units 1810 of the hidden layers $L_a$, $L_b$, and $L_c$ may be based on the outputs of other neurons 1810. The outputs of the final output neurons 1810 of the output layer $L_y$ (e.g., output variables $y_j$) include predictions, inferences, and/or accomplish a desired/configured task. The output variables $y_j$ may be in the form of determinations, inferences, predictions, and/or assessments. Additionally or alternatively, the output variables $y_j$ can be set as a vector containing the relevant data (e.g., determinations, inferences, predictions, assessments, and/or the like).

In the context of ML, an "ML feature" (or simply "feature") is an individual measureable property or characteristic of a phenomenon being observed. Features are usually represented using numbers/numerals (e.g., integers), strings, variables, ordinals, real-values, categories, and/or the like. Additionally or alternatively, ML features are individual variables, which may be independent variables, based on observable phenomenon that can be quantified and recorded. ML models use one or more features to make predictions or inferences. In some implementations, new features can be derived from old features.

Neurons 1810 may have a threshold such that a signal is sent only if the aggregate signal crosses that threshold. A node 1810 may include an activation function, which defines the output of that node 1810 given an input or set of inputs. Additionally or alternatively, a node 1810 may include a propagation function that computes the input to a neuron 1810 from the outputs of its predecessor neurons 1810 and their connections 1820 as a weighted sum. A bias term can also be added to the result of the propagation function.

The NN 1800 also includes connections 1820, some of which provide the output of at least one neuron 1810 as an input to at least another neuron 1810. Each connection 1820 may be assigned a weight that represents its relative importance. The weights may also be adjusted as learning proceeds. The weight increases or decreases the strength of the signal at a connection 1820. The neurons 1810 can be aggregated or grouped into one or more layers L where different layers L may perform different transformations on their inputs. In FIG. 18, the NN 1800 comprises an input layer $L_x$, one or more hidden layers $L_a$, $L_b$, and $L_c$, and an output layer $L_y$ (where a, b, c, x, and y may be numbers), where each layer L comprises one or more neurons 1810. Signals travel from the first layer (e.g., the input layer $L_1$), to the last layer (e.g., the output layer $L_y$), possibly after traversing the hidden layers $L_a$, $L_b$, and $L_c$ multiple times. In FIG. 18, the input layer $L_a$ receives data of input variables $x_i$ (where i=1, . . . , p, where p is a number). Hidden layers $L_a$, $L_b$, and $L_c$ processes the inputs $x_i$, and eventually, output layer $L_y$ provides output variables $y_j$ (where j=1, . . . , p', where p' is a number that is the same or different than p). In the example of FIG. 18, for simplicity of illustration, there are only three hidden layers $L_a$, $L_b$, and $L_c$ in the NN 1800, however, the NN 1800 may include many more (or fewer) hidden layers $L_a$, $L_b$, and $L_c$ than are shown.

Figure 19:
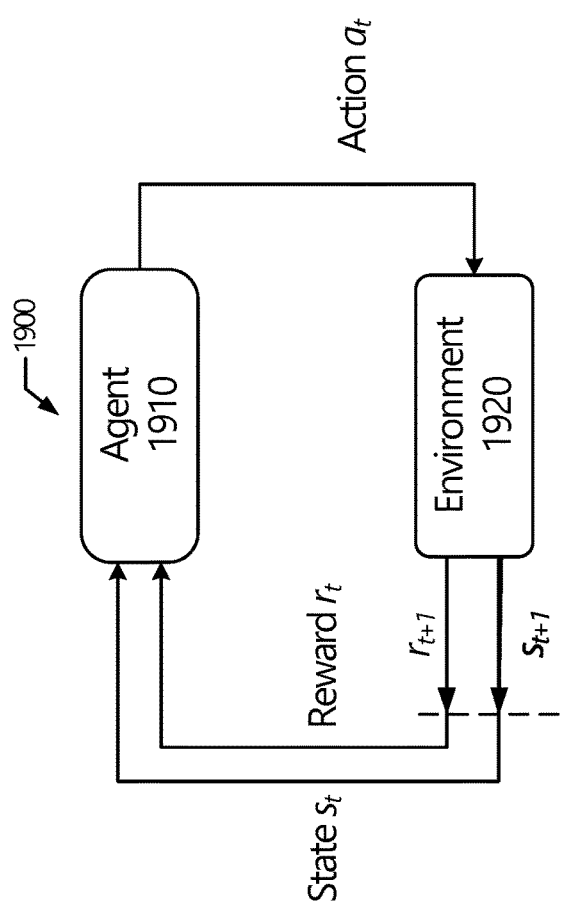
FIG. 19 depicts an example reinforcement learning architecture.

FIG. 19 shows an RL architecture 1900 comprising an agent 1910 and an environment 1920. The agent 1910 (e.g., software agent, AI agent, AI/ML decision entity, inference engine, actors 1620, consumers XXX, and/or the like) is the learner and decision maker, and the environment 1920 comprises everything outside the agent 1910 that the agent 1910 interacts with. The environment 1920 is typically stated in the form of a Markov decision process (MDP), which may be described using dynamic programming techniques. An MDP is a discrete-time stochastic control process that provides a mathematical framework for modeling decision making in situations where outcomes are partly random and partly under the control of a decision maker.

RL is a goal-oriented learning based on interaction with environment. RL is an ML paradigm concerned with how software agents (or AI agents) ought to take actions in an environment in order to maximize a numerical reward signal. In general, RL involves an agent taking actions in an environment that is/are interpreted into a reward and a representation of a state, which is then fed back into the agent. In RL, an agent aims to optimize a long-term objective by interacting with the environment based on a trial and error process. In many RL algorithms, the agent receives a reward in the next time step (or epoch) to evaluate its previous action. Examples of RL algorithms include Markov decision process (MDP) and Markov chains, associative RL, inverse RL, safe RL, Q-learning, multi-armed bandit learning, and deep RL.

The agent 1910 and environment 1920 continually interact with one another, wherein the agent 1910 selects actions A to be performed and the environment 1920 responds to these Actions and presents new situations (or states S) to the agent 1910. The action A comprises all possible actions, tasks, moves, and/or the like, that the agent 1910 can take for a particular context. The state S is a current situation such as a complete description of a system, a unique configuration of information in a program or machine, a snapshot of a measure of various conditions in a system, and/or the like. In some implementations, the agent 1910 selects an action A to take based on a policy π. The policy it is a strategy that the agent 1910 employs to determine next action A based on the current state S. The environment 1920 also gives rise to rewards R, which are numerical values that the agent 1910 seeks to maximize over time through its choice of actions.

The environment 1920 starts by sending a state St to the agent 1910. In some implementations, the environment 1920 also sends an initial a reward Rt to the agent 1910 with the state St. The agent 1910, based on its knowledge, takes an action At in response to that state St, (and reward Rt, if any). The action At is fed back to the environment 1920, and the environment 1920 sends a state-reward pair including a next state St+1 and reward Rt+1 to the agent 1910 based on the action At. The agent 1910 will update its knowledge with the reward Rt+1 returned by the environment 1920 to evaluate its previous action(s). The process repeats until the environment 1920 sends a terminal state S, which ends the process or episode. Additionally or alternatively, the agent 1910 may take a particular action A to optimize a value V. The value V an expected long-term return with discount, as opposed to the short-term reward R. Vπ(S) is defined as the expected long-term return of the current state S under policy π.

Q-learning is a model-free RL algorithm that learns the value of an action in a particular state. Q-learning does not require a model of an environment 1920, and can handle problems with stochastic transitions and rewards without requiring adaptations. The "Q" in Q-learning refers to the function that the algorithm computes, which is the expected reward(s) for an action A taken in a given state S. In Q-learning, a Q-value is computed using the state St and the action At at time t using the function Q(St, At). Q(St, At) is the long-term return of a current state S taking action A under policy π. For any finite MDP (FMDP), Q-learning finds an optimal policy π in the sense of maximizing the expected value of the total reward over any and all successive steps, starting from the current state S. Additionally, examples of value-based deep RL include Deep Q-Network (DQN), Double DQN, and Dueling DQN. DQN is formed by substituting the Q-function of the Q-learning by an artificial neural network (ANN) such as a convolutional neural network (CNN).

4. Example Implementations

Figure 20:
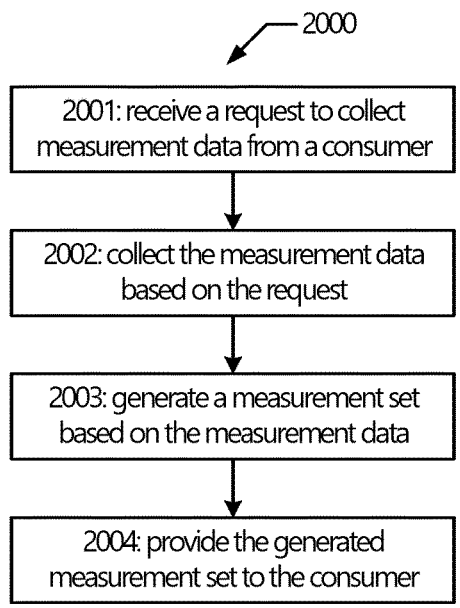
FIGS. 20 and 21 depict example processes for practicing the various embodiments discussed herein.

FIG. 20 shows an example process 2000 that can be performed by an MnF-PA 440. Process 2000 begins at operation 2001 where the MnF-PA receives a request to collect measurement data from a consumer, wherein the request includes an indication of an IOC instance list, a measurement category list, and/or a reporting method. At operation 2002, the MnF-PA collects the measurement data based on the request. At operation 2003, the MnF-PA generates a measurement set based on the measurement data.

Figure 21:
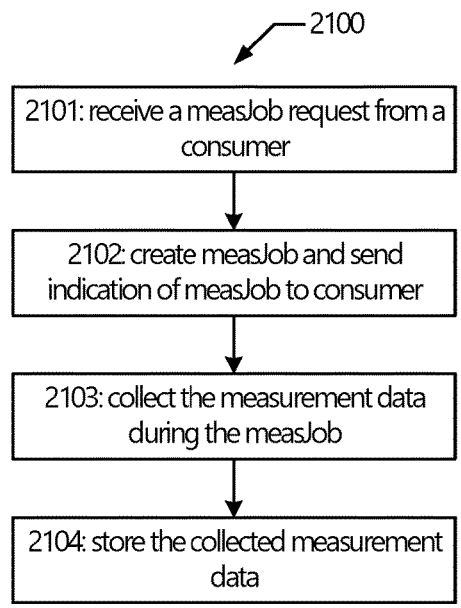

At operation 2004, the MnF-PA provides the measurement set to the consumer (e.g., as a performance data report or via performance data streaming). FIG. 21 shows an example process 2100 that can be performed by an MnF-PA. Process 2100 begins at operation 2101 where the MnF-PA receives, from a performance assurance consumer, a measurement job (measJob) request to create a measurement job for collection of measurement data. At operation 2102, the MnF-PA creates the measJob to collect the measurement data based on the request and sends an output parameter to the performance assurance consumer with a measJob identifier (JobId) to indicate that the measJob has been successfully created. At operation 2103, the MnF-PA collects measurement data from a set of nodes during the measJob. At operation 2105, the MnF-PA stores the collected measurement data in the memory circuitry as a measurement set. The examples operations of processes 2000-2100 can be arranged in different orders, one or more of the depicted operations may be combined and/or divided/split into multiple operations, depicted operations may be omitted, and/or additional or alternative operations may be included in any of the depicted processes.

Additional examples of the presently described methods, devices, systems, and networks discussed herein include the following, non-limiting implementations. Each of the following non-limiting examples may stand on its own or may be combined in any permutation or combination with any one or more of the other examples provided below or throughout the present disclosure.

Example 1 includes a method of operating a Management Function (MnF) of performance assurance (MnF-PA), the method comprising: receiving, from a consumer (e.g., MnS consumer (MnS-C)), a request to create a measurement job to collect measurement data; creating the measurement job to collect measurement data; and sending, to the MnF-PA and/or the consumer in response of successful measurement job creation, the output parameter with jobId to indicate that the measurement job has been created.

Example 2 includes the method of example 1 and/or some other example(s) herein, wherein the consumer requests to create a measurement job by invoking a createMeasurementJob operation with one or more of the following attributes: domain name (DN) of the object instance where the measurement(s) are connected; performance measurements; and/or reporting method (e.g., file or streaming based reporting).

Example 3 includes the method of examples 1-2 and/or some other example(s) herein, wherein the consumer requests to create a measurement job by invoking the createMOI operation to create the PerfMetricJob IOC that contains the following attributes: domain name of the object instance where the measurement(s) are connected; performance measurements; and/or reporting method (e.g., file or streaming based reporting).

Example 4 includes the method of examples 1-3 and/or some other example(s) herein, wherein in response of the output parameter, indicting the measurement job being created, if the reporting method is file-based reporting, the consumer requests the MnF-PA with subscribe operation to subscribe to receive notifications when the measurement data is ready for collection.

Example 5 includes the method of examples 1-3 and/or some other example(s) herein, wherein in response of the output parameter, indicting the measurement job being created, if the reporting method is streaming-based reporting, the consumer requests the MnF-PA with the establish- StreamingConnection operation to establish a streaming connection for sending the streaming data.

Example 6 includes the method of examples 1-5 and/or some other example(s) herein, wherein the method includes: receiving the measurement data from serving gNB CU NF, wherein serving gNB CU NF receives the measurement data from neighboring gNB CU NF via the Xn interface; and generating the measurements for the object instance of NRCellRelation MOI(s) referring to the neighboring gNB CU NF.

Example 7 includes the method of examples 1-6 and/or some other example(s) herein, wherein the method includes: receiving the measurement data from the actor of network energy saving in gNB CU NF; receiving the measurement data from the actor of mobility optimization in gNB CU NF; receiving the measurement data from the actor of load balancing in gNB CU NF; and generating the measurements for the object instance of DMROFunction, DLBOFunction, and DESManagementFunction MOI(s) referring to the actors of network energy saving, mobility optimization, and load balancing.

Example 8 includes the method of examples 1-7 and/or some other example(s) herein, wherein the method includes: receiving the UE measurement reports from the gNB CU NF, wherein serving gNB CU NF receives RRC message MeasurementReport to report the UE measurements; and generating the measurements for the object instance of NRCellCU MOI(s) referring to the gNB CU cell with sub-counters identified by C-RNTI for each UE measurements.

Example 9 includes the method of examples 6-8 and/or some other example(s) herein, wherein the method includes: upon the measurements being generated, if the reporting method is file-based reporting, sending a notifyFileReady notification to the consumer to indicate the performance data file is ready.

Example 10 includes the method of examples 6-8 and/or some other example(s) herein, the method includes: upon the measurements being generated, if the reporting method is stream-based reporting, invoking the reportStreamData operation to send the streaming measurement data to the consumer.

Example Z01 includes an apparatus comprising means for performing one or more elements of a method described in or related to any of examples 1-10, or any other method or process described herein. Example Z02 includes one or more non-transitory computer-readable media comprising instructions to cause an electronic device, upon execution of the instructions by one or more processors of the electronic device, to perform one or more elements of a method described in or related to any of examples 1-10, or any other method or process described herein. Example Z03 includes an apparatus comprising logic, modules, or circuitry to perform one or more elements of a method described in or related to any of examples 1-10, or any other method or process described herein. Example Z04 includes a method, technique, or process as described in or related to any of examples 1-10, or portions or parts thereof. Example Z05 includes an apparatus comprising: one or more processors and one or more computer-readable media comprising instructions that, when executed by the one or more processors, cause the one or more processors to perform the method, techniques, or process as described in or related to any of examples 1-10, or portions thereof. Example Z06 includes a signal as described in or related to any of examples 1-10, or portions or parts thereof. Example Z07 includes a datagram, packet, frame, segment, protocol data unit (PDU), or message as described in or related to any of examples 1-10, or portions or parts thereof, or otherwise described in the present disclosure. Example Z08 includes a signal encoded with data as described in or related to any of examples 1-10, or portions or parts thereof, or otherwise described in the present disclosure. Example Z09 includes a signal encoded with a datagram, packet, frame, segment, protocol data unit (PDU), or message as described in or related to any of examples 1-10, or portions or parts thereof, or otherwise described in the present disclosure. Example Z10 includes an electromagnetic signal carrying computer-readable instructions, wherein execution of the computer-readable instructions by one or more processors is to cause the one or more processors to perform the method, techniques, or process as described in or related to any of examples 1-10, or portions thereof. Example Z11 includes a computer program comprising instructions, wherein execution of the program by a processing element is to cause the processing element to carry out the method, techniques, or process as described in or related to any of examples 1-10, or portions thereof. Example Z12 includes a signal in a wireless network as shown and described herein. Example Z13 includes a method of communicating in a wireless network as shown and described herein. Example Z14 includes a system for providing wireless communication as shown and described herein. Example Z15 includes a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

5. Terminology

For the purposes of the present document, the following terms and definitions are applicable to the examples and embodiments discussed herein. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The phrase "X(s)" means one or more X or a set of X. The description may use the phrases "in an embodiment," "In some embodiments," "in one implementation," "In some implementations," "in some examples", and the like, each of which may refer to one or more of the same or different embodiments, implementations, and/or examples. Furthermore, the terms "comprising," "including," "having," and the like, as used with respect to the present disclosure, are synonymous.

The term "circuitry" at least in some examples refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), single-board computer (SBC), system on chip (SoC), system in package (SiP), multi-chip package (MCP), digital signal processor (DSP), and the like, that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. The term "processor circuitry" at least in some examples refers to, is part of, or includes circuitry capable of sequentially and automatically carrying out a sequence of arithmetic or logical operations, or recording, storing, and/or transferring digital data. The term "processor circuitry" at least in some examples refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry." The term "memory" and/or "memory circuitry" at least in some examples refers to one or more hardware devices for storing data, including random access memory (RAM), static RAM (SRAM), dynamic RAM (DRAM), synchronous DRAM (SDRAM), magnetoresistive RAM (MRAM), conductive bridge Random Access Memory (CB-RAM), spin transfer torque (STT)-MRAM, phase change RAM (PRAM), core memory, read-only memory (ROM), programmable ROM (PROM), erasable PROM (EPROM), electrically EPROM (EEPROM), flash memory, non-volatile RAM (NVRAM), magnetic disk storage mediums, optical storage mediums, flash memory devices or other machine readable mediums for storing data. The term "computer-readable medium" includes, but is not limited to, memory, portable or fixed storage devices, optical storage devices, and various other mediums capable of storing, containing or carrying instructions or data. The term "interface circuitry" at least in some examples refers to, is part of, or includes circuitry that enables the exchange of information between two or more components or devices. The term "interface circuitry" at least in some examples refers to one or more hardware interfaces, for example, buses, I/O interfaces, peripheral component interfaces, network interface cards, and/or the like.

The term "device" at least in some examples refers to a physical entity embedded inside, or attached to, another physical entity in its vicinity, with capabilities to convey digital information from or to that physical entity. The term "controller" at least in some examples refers to an element or entity that has the capability to affect a physical entity, such as by changing its state or causing the physical entity to move. The term "scheduler" at least in some examples refers to an entity or element that assigns resources (e.g., processor time, network links, memory space, and/or the like) to perform tasks. The terms "network scheduler", "packet scheduler", "queueing discipline" or "qdisc", and/or "queueing algorithm" at least in some examples refers to a node, element, or entity that manages network packets in transmit and/or receive queues of one or more protocol stacks of network access circuitry (e.g., a network interface controller, baseband processor, and the like).

The term "compute node" or "compute device" at least in some examples refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like. For purposes of the present disclosure, the term "node" at least in some examples refers to and/or is interchangeable with the terms "device", "component", "sub-system", and/or the like.

The term "user equipment" or "UE" at least in some examples refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, and the like. Furthermore, the term "user equipment" or "UE" includes any type of wireless/wired device or any computing device including a wireless communications interface. Examples of UEs, client devices, and the like, include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality (MR) devices, and/or other like systems or devices.

The term "network access node" or "NAN" at least in some examples refers to a network element in a radio access network (RAN) responsible for the transmission and reception of radio signals in one or more cells or coverage areas to or from a UE or station. A "network access node" or "NAN" can have an integrated antenna or may be connected to an antenna array by feeder cables. Additionally or alternatively, a "network access node" or "NAN" includes specialized digital signal processing, network function hardware, and/or compute hardware to operate as a compute node. In some examples, a "network access node" or "NAN" may be split into multiple functions (e.g., RAN functions) or functional blocks operating in software for flexibility, cost, and performance. In some examples, a "network access node" or "NAN" may be a base station (e.g., an evolved Node B (eNB) or a next generation Node B (gNB)), an access point and/or wireless network access point, router, switch, hub, radio unit or remote radio head, Transmission Reception Point (TRP), a gateway device (e.g., Residential Gateway, Wireline 5G Access Network, Wireline 5G Cable Access Network, Wireline BBF Access Network, and the like), network appliance, and/or some other network access hardware. The term "network controller" at least in some examples refers to a functional block that centralizes some or all of the control and management functionality of a network domain and may provide an abstract view of the network domain to other functional blocks via an interface. The term "access point" or "AP" at least in some examples refers to an entity that contains one station (STA) and provides access to the distribution services, via the wireless medium (WM) for associated STAs. An AP comprises a STA and a distribution system access function (DSAF).

The term "cell" at least in some examples refers to a radio network object that can be uniquely identified by a UE from an identifier (e.g., cell ID) that is broadcasted over a geographical area from a network access node (NAN). Additionally or alternatively, the term "cell" at least in some examples refers to a geographic area covered by a NAN. The term "handover" at least in some examples refers to the transfer of a user's connection from one radio channel to another (can be the same or different cell). Additionally or alternatively, the term "handover" at least in some examples refers to the process in which a radio access network changes the radio transmitters, radio access mode, and/or radio system used to provide the bearer services, while maintaining a defined bearer service QoS The term "serving cell" at least in some examples refers to a primary cell (PCell) for a UE in a connected mode or state (e.g., RRC_CONNECTED) and not configured with carrier aggregation (CA) and/or dual connectivity (DC). Additionally or alternatively, the term "serving cell" at least in some examples refers to a set of cells comprising zero or more special cells and one or more secondary cells for a UE in a connected mode or state (e.g., RRC_CONNECTED) and configured with CA. The term "primary cell" or "PCell" at least in some examples refers to a Master Cell Group (MCG) cell, operating on a primary frequency, in which a UE either performs an initial connection establishment procedure or initiates a connection re-establishment procedure. The term "Secondary Cell" or "SCell" at least in some examples refers to a cell providing additional radio resources on top of a special cell (SpCell) for a UE configured with CA. The term "special cell" or "SpCell" at least in some examples refers to a PCell for non-DC operation or refers to a PCell of an MCG or a PSCell of an SCG for DC operation. The term "Master Cell Group" or "MCG" at least in some examples refers to a group of serving cells associated with a "Master Node" comprising a SpCell (PCell) and optionally one or more SCells. The term "Secondary Cell Group" or "SCG" at least in some examples refers to a subset of serving cells comprising a Primary SCell (PSCell) and zero or more SCells for a UE configured with DC. The term "Primary SCG Cell" refers to the SCG cell in which a UE performs random access when performing a reconfiguration with sync procedure for DC operation. The term "Master Node" or "MN" at least in some examples refers to a NAN that provides control plane connection to a core network. The term "Secondary Node" or "SN" at least in some examples refers to a NAN providing resources to the UE in addition to the resources provided by an MN and/or a NAN with no control plane connection to a core network.

The term "E-UTEAN NodeB", "eNodeB", or "eNB" at least in some examples refers to a RAN node providing E-UTRA user plane (PDCP/RLC/MAC/PHY) and control plane (RRC) protocol terminations towards a UE, and connected via an S1 interface to the Evolved Packet Core (EPC). Two or more eNBs are interconnected with each other (and/or with one or more en-gNBs) by means of an X2 interface. The term "next generation eNB" or "ng-eNB" at least in some examples refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface. The term "Next Generation NodeB", "gNodeB", or "gNB" at least in some examples refers to a RAN node providing NR user plane and control plane protocol terminations towards a UE, and connected via the NG interface to the 5GC. Two or more gNBs are interconnected with each other (and/or with one or more ng-eNBs) by means of an Xn interface. The term "E-UTRA-NR gNB" or "en-gNB" at least in some examples refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v17.0.0 (2022 Apr. 15) ("[TS37340]")). Two or more en-gNBs are interconnected with each other (and/or with one or more eNBs) by means of an X2 interface. The term "Next Generation RAN node" or "NG-RAN node" at least in some examples refers to either a gNB or an ng-eNB. The term "IAB-node" at least in some examples refers to a RAN node that supports new radio (NR) access links to user equipment (UEs) and NR backhaul links to parent nodes and child nodes. The term "IAB-donor" at least in some examples refers to a RAN node (e.g., a gNB) that provides network access to UEs via a network of backhaul and access links. The term "Transmission Reception Point" or "TRP" at least in some examples refers to an antenna array with one or more antenna elements available to a network located at a specific geographical location for a specific area.

The term "Central Unit" or "CU" at least in some examples refers to a logical node hosting radio resource control (RRC), Service Data Adaptation Protocol (SDAP), and/or Packet Data Convergence Protocol (PDCP) protocols/layers of an NG-RAN node, or RRC and PDCP protocols of the en-gNB that controls the operation of one or more DUs; a CU terminates an F1 interface connected with a DU and may be connected with multiple DUs. The term "Distributed Unit" or "DU" at least in some examples refers to a logical node hosting Backhaul Adaptation Protocol (BAP), F1 application protocol (FLAP), radio link control (RLC), medium access control (MAC), and physical (PHY) layers of the NG-RAN node or en-gNB, and its operation is partly controlled by a CU; one DU supports one or multiple cells, and one cell is supported by only one DU; and a DU terminates the F1 interface connected with a CU. The term "Radio Unit" or "RU" at least in some examples refers to a logical node hosting PHY layer or Low-PHY layer and radiofrequency (RF) processing based on a lower layer functional split. The term "split architecture" at least in some examples refers to an architecture in which an CU, DU, and/or RU are physically separated from one another. Additionally or alternatively, the term "split architecture" at least in some examples refers to a RAN architecture such as those discussed in [TS38401], [TS38410], and/or [TS38473], the contents of each of which are hereby incorporated by reference in their entireties. The term "integrated architecture at least in some examples refers to an architecture in which an RU and DU are implemented on one platform, and/or an architecture in which a DU and a CU are implemented on one platform.

The term "cloud computing" or "cloud" at least in some examples refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "network function" or "NF" at least in some examples refers to a functional block within a network infrastructure that has one or more external interfaces and a defined functional behavior. The term "Application Function" or "AF" at least in some examples refers to an element or entity that interacts with a 3GPP core network in order to provide services. Additionally or alternatively, the term "Application Function" or "AF" at least in some examples refers to an edge compute node or ECT framework from the perspective of a 5G core network. The term "virtualized network function" or "VNF" at least in some examples refers to an implementation of an NF that can be deployed on a Network Function Virtualization Infrastructure (NFVI). The term "Network Functions Virtualization Infrastructure Manager" or "NFVI" at least in some examples refers to a totality of all hardware and software components that build up the environment in which VNFs are deployed.

The term "service consumer" at least in some examples refers to an entity that consumes one or more services. The term "service producer" at least in some examples refers to an entity that offers, serves, or otherwise provides one or more services. The term "service provider" at least in some examples refers to an organization or entity that provides one or more services to at least one service consumer. For purposes of the present disclosure, the terms "service provider" and "service producer" may be used interchangeably even though these terms may refer to difference concepts.

The term "virtualization container", "execution container", or "container" at least in some examples refers to a partition of a compute node that provides an isolated virtualized computation environment. The term "OS container" at least in some examples refers to a virtualization container utilizing a shared Operating System (OS) kernel of its host, where the host providing the shared OS kernel can be a physical compute node or another virtualization container. Additionally or alternatively, the term "container" at least in some examples refers to a standard unit of software (or a package) including code and its relevant dependencies, and/or an abstraction at the application layer that packages code and dependencies together. Additionally or alternatively, the term "container" or "container image" at least in some examples refers to a lightweight, standalone, executable software package that includes everything needed to run an application such as, for example, code, runtime environment, system tools, system libraries, and settings. The term "virtual machine" or "VM" at least in some examples refers to a virtualized computation environment that behaves in a same or similar manner as a physical computer and/or a server. The term "hypervisor" at least in some examples refers to a software element that partitions the underlying physical resources of a compute node, creates VMs, manages resources for VMs, and isolates individual VMs from each other.

The term "protocol" at least in some examples refers to a predefined procedure or method of performing one or more operations. Additionally or alternatively, the term "protocol" at least in some examples refers to a common means for unrelated objects to communicate with each other (sometimes also called interfaces). The term "communication protocol" at least in some examples refers to a set of standardized rules or instructions implemented by a communication device and/or system to communicate with other devices and/or systems, including instructions for packetizing/depacketizing data, modulating/demodulating signals, implementation of protocols stacks, and/or the like. The term "protocol stack" at least in some examples refers to an implementation of a protocol suite or protocol family. In various implementations, a protocol stack includes a set of protocol layers, where the lowest protocol deals with low-level interaction with hardware and/or communications interfaces and each higher layer adds additional capabilities. Additionally or alternatively, the term "protocol" at least in some examples refers to a formal set of procedures that are adopted to ensure communication between two or more functions within the within the same layer of a hierarchy of functions.

The term "application layer" at least in some examples refers to an abstraction layer that specifies shared communications protocols and interfaces used by hosts in a communications network. Additionally or alternatively, the term "application layer" at least in some examples refers to an abstraction layer that interacts with software applications that implement a communicating component, and includes identifying communication partners, determining resource availability, and synchronizing communication. Examples of application layer protocols include HTTP, HTTPs, File Transfer Protocol (FTP), Dynamic Host Configuration Protocol (DHCP), Internet Message Access Protocol (IMAP), Lightweight Directory Access Protocol (LDAP), MQTT (MQ Telemetry Transport), Remote Authentication Dial-In User Service (RADIUS), Diameter protocol, Extensible Authentication Protocol (EAP), RDMA over Converged Ethernet version 2 (RoCEv2), Real-time Transport Protocol (RTP), RTP Control Protocol (RTCP), Real Time Streaming Protocol (RTSP), SBMV Protocol, Skinny Client Control Protocol (SCCP), Session Initiation Protocol (SIP), Session Description Protocol (SDP), Simple Mail Transfer Protocol (SMTP), Simple Network Management Protocol (SNMP), Simple Service Discovery Protocol (SSDP), Small Computer System Interface (SCSI), Internet SCSI (iSCSI), iSCSI Extensions for RDMA (iSER), Transport Layer Security (TLS), voice over IP (VoIP), Virtual Private Network (VPN), Extensible Messaging and Presence Protocol (XMPP), and/or the like.

The term "session layer" at least in some examples refers to an abstraction layer that controls dialogues and/or connections between entities or elements, and may include establishing, managing and terminating the connections between the entities or elements. The term "transport layer" at least in some examples refers to a protocol layer that provides end-to-end (e2e) communication services such as, for example, connection-oriented communication, reliability, flow control, and multiplexing. Examples of transport layer protocols include datagram congestion control protocol (DCCP), fibre channel protocol (FBC), Generic Routing Encapsulation (GRE), GPRS Tunneling (GTP), Micro Transport Protocol (µTP), Multipath TCP (MPTCP), MultiPath QUIC (MPQUIC), Multipath UDP (MPUDP), Quick UDP Internet Connections (QUIC), Remote Direct Memory Access (RDMA), Resource Reservation Protocol (RSVP), Stream Control Transmission Protocol (SCTP), transmission control protocol (TCP), user datagram protocol (UDP), and/or the like.

The term "network layer" at least in some examples refers to a protocol layer that includes means for transferring network packets from a source to a destination via one or more networks. Additionally or alternatively, the term "network layer" at least in some examples refers to a protocol layer that is responsible for packet forwarding and/or routing through intermediary nodes. Additionally or alternatively, the term "network layer" or "internet layer" at least in some examples refers to a protocol layer that includes interworking methods, protocols, and specifications that are used to transport network packets across a network. As examples, the network layer protocols include internet protocol (IP), IP security (IPsec), Internet Control Message Protocol (ICMP), Internet Group Management Protocol (IGMP), Open Shortest Path First protocol (OSPF), Routing Information Protocol (RIP), RDMA over Converged Ethernet version 2 (RoCEv2), Subnetwork Access Protocol (SNAP), and/or some other internet or network protocol layer.

The term "link layer" or "data link layer" at least in some examples refers to a protocol layer that transfers data between nodes on a network segment across a physical layer. Examples of link layer protocols include logical link control (LLC), medium access control (MAC), Ethernet, RDMA over Converged Ethernet version 1 (RoCEv1), and/or the like.

The term "radio resource control", "RRC layer", or "RRC" at least in some examples refers to a protocol layer or sublayer that performs system information handling; paging; establishment, maintenance, and release of RRC connections; security functions; establishment, configuration, maintenance and release of Signalling Radio Bearers (SRBs) and Data Radio Bearers (DRBs); mobility functions/services; QoS management; and some sidelink specific services and functions over the Uu interface (see e.g., 3GPP TS 36.331 v17.5.0 (2023-07-04) and/or 3GPP TS 38.331 v17.5.0 (2023 Jul. 1) ("[TS38331]")).

The term "Service Data Adaptation Protocol", "SDAP layer", or "SDAP" at least in some examples refers to a protocol layer or sublayer that performs mapping between QoS flows and a data radio bearers (DRBs) and marking QoS flow IDs (QFI) in both DL and UL packets (see e.g., 3GPP TS 37.324 v17.0.0 (2022 Apr. 13). The term "Packet Data Convergence Protocol", "PDCP layer", or "PDCP" at least in some examples refers to a protocol layer or sublayer that performs transfer user plane or control plane data; maintains PDCP sequence numbers (SNs); header compression and decompression using the Robust Header Compression (ROHC) and/or Ethernet Header Compression (EHC) protocols; ciphering and deciphering; integrity protection and integrity verification; provides timer based SDU discard; routing for split bearers; duplication and duplicate discarding; reordering and in-order delivery; and/or out-of-order delivery (see e.g., 3GPP TS 36.323 v17.2.0 (2023 Jan. 13) and/or 3GPP TS 38.323 v17.5.0 (2023 Jun. 30)).

The term "radio link control layer", "RLC layer", or "RLC" at least in some examples refers to a protocol layer or sublayer that performs transfer of upper layer PDUs; sequence numbering independent of the one in PDCP; error Correction through ARQ; segmentation and/or re-segmentation of RLC SDUs; reassembly of SDUs; duplicate detection; RLC SDU discarding; RLC re-establishment; and/or protocol error detection (see e.g., 3GPP TS 36.322 v17.0.0 (2022 Apr. 15) and 3GPP TS 38.322 v17.3.0 (2023 Jun. 30)).

The term "medium access control protocol", "MAC protocol", or "MAC" at least in some examples refers to a protocol that governs access to the transmission medium in a network, to enable the exchange of data between stations in a network. Additionally or alternatively, the term "medium access control layer", "MAC layer", or "MAC" at least in some examples refers to a protocol layer or sublayer that performs functions to provide frame-based, connection-less-mode (e.g., datagram style) data transfer between stations or devices. Additionally or alternatively, the term "medium access control layer", "MAC layer", or "MAC" at least in some examples refers to a protocol layer or sublayer that performs mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of CA); priority handling between UEs by means of dynamic scheduling; priority handling between logical channels of one UE by means of logical channel prioritization; priority handling between overlapping resources of one UE; and/or padding (see e.g., 3GPP TS 36.321 v17.5.0 (2023 Jun. 30), and 3GPP TS 38.321 v17.5.0 (2023 Jun. 30)).

The term "physical layer", "PHY layer", or "PHY" at least in some examples refers to a protocol layer or sublayer that includes capabilities to transmit and receive modulated signals for communicating in a communications network (see e.g., 3GPP TS 36.201 v17.0.0 (2022 Mar. 31), and 3GPP TS 38.201 v17.0.0 (2022 Jan. 5)).

The term "access technology" at least in some examples refers to the technology used for the underlying physical connection to a communication network. The term "radio access technology" or "RAT" at least in some examples refers to the technology used for the underlying physical connection to a radio based communication network. The term "radio technology" at least in some examples refers to technology for wireless transmission and/or reception of electromagnetic radiation for information transfer. The term "RAT type" at least in some examples may identify a transmission technology and/or communication protocol used in an access network. Examples of access technologies include wired access technologies, RATs, fiber optics networks, digital subscriber line (DSL), coax-cable access technologies, hybrid fiber-coaxial (HFC) technologies, and/or the like.

The term "channel" at least in some examples refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some examples refers to a connection between two devices through a RAT for the purpose of transmitting and receiving information.

The term "service" at least in some examples refers to the provision of a discrete function within a system and/or environment. Additionally or alternatively, the term "service" at least in some examples refers to a functionality or a set of functionalities that can be reused. The term "microservice" at least in some examples refers to one or more processes that communicate over a network to fulfil a goal using technology-agnostic protocols (e.g., HTTP or the like). Additionally or alternatively, the term "microservice" at least in some examples refers to services that are relatively small in size, messaging-enabled, bounded by contexts, autonomously developed, independently deployable, decentralized, and/or built and released with automated processes. Additionally or alternatively, the term "microservice" at least in some examples refers to a self-contained piece of functionality with clear interfaces, and may implement a layered architecture through its own internal components. Additionally or alternatively, the term "microservice architecture" at least in some examples refers to a variant of the service-oriented architecture (SOA) structural style wherein applications are arranged as a collection of loosely-coupled services (e.g., fine-grained services) and may use lightweight protocols. The term "network service" at least in some examples refers to a composition NF(s) and/or service(s) defined by its functional and behavioral specification.

The term "quality" at least in some examples refers to a property, character, attribute, or feature of something as being affirmative or negative, and/or a degree of excellence of something. Additionally or alternatively, the term "quality" at least in some examples, in the context of data processing, refers to a state of qualitative and/or quantitative aspects of data, processes, and/or some other aspects of data processing systems. The term "Quality of Service" or "QoS" at least in some examples refers to a description or measurement of the overall performance of a service and/or a characterization of combined aspects of performance factors applicable to one or more services such as, for example, service operability performance, service accessibility performance; service retain ability performance; service reliability performance, service integrity performance, and other factors specific to each service. Additionally or alternatively, the term "Quality of Service" or "QoS" at least in some examples refers to mechanisms that provide traffic-forwarding treatment based on flow-specific traffic classification. Additionally or alternatively, the term "Quality of Service" or "QoS" at least in some examples is based on the definitions provided by ITU-T Recommendation E.800 (September 2008), the contents of which is hereby incorporated by reference in its entirety. The term "reliability" at least in some examples refers to the ability of a computer-related component (e.g., software, hardware, and/or network element) to consistently perform a desired function and/or operate according to a specification. Reliability in the context of network communications (e.g., "network reliability") at least in some examples refers to the ability of a network to carry out communication. The term "network reliability" at least in some examples refers to a probability or measure of delivering a specified amount of data from a source to a destination (or sink).

The term "application" or "app" at least in some examples refers to a computer program designed to carry out a specific task other than one relating to the operation of the computer itself. Additionally or alternatively, term "application" or "app" at least in some examples refers to a complete and deployable package, environment to achieve a certain function in an operational environment. The term "process" at least in some examples refers to an instance of a computer program that is being executed by one or more threads. In some implementations, a process may be made up of multiple threads of execution that execute instructions concurrently. The term "algorithm" at least in some examples refers to an unambiguous specification of how to solve a problem or a class of problems by performing calculations, input/output operations, data processing, automated reasoning tasks, and/or the like. The term "analytics" at least in some examples refers to the discovery, interpretation, and communication of meaningful patterns in data. The term "application programming interface" or "API" at least in some examples refers to a set of subroutine definitions, communication protocols, and tools for building software. Additionally or alternatively, the term "application programming interface" or "API" at least in some examples refers to a set of clearly defined methods of communication among various components. In some examples, an API may be defined or otherwise used for a web-based system, operating system, database system, computer hardware, software library, and/or the like.

The terms "instantiate," "instantiation," and the like at least in some examples refers to the creation of an instance. In some examples, an "instance" also at least in some examples refers to a concrete occurrence of an object, which may occur, for example, during execution of program code. The term "reference point" at least in some examples refers to a conceptual point at the conjunction of two non-overlapping functional groups, elements, or entities. The term "reference" at least in some examples refers to data useable to locate other data and may be implemented a variety of ways (e.g., a pointer, an index, a handle, a key, an identifier, a hyperlink, and/or the like).

The term "use case" at least in some examples refers to a description of a system from a user's perspective. Use cases sometimes treat a system as a black box, and the interactions with the system, including system responses, are perceived as from outside the system. In some examples, use cases avoid technical jargon, preferring instead the language of the end user or domain expert. The term "user" at least in some examples refers to an abstract representation of any entity issuing commands, requests, and/or data to a compute node or system, and/or otherwise consumes or uses services. Additionally or alternative, the term "user" at least in some examples refers to an entity, not part of a 3GPP system, which uses 3GPP system services (e.g., a person using a 3GPP system mobile station as a portable telephone). The term "user profile" at least in some examples refers to a set of information used to provide a user with a consistent, personalized service environment, irrespective of the user's location or the terminal used (within the limitations of the terminal and the serving network).

The term "datagram" at least in some examples at least in some examples refers to a basic transfer unit associated with a packet-switched network; a datagram may be structured to have header and payload sections. The term "datagram" at least in some examples may be synonymous with any of the following terms, even though they may refer to different aspects: "data unit", a "protocol data unit" or "PDU", a "service data unit" or "SDU", "frame", "packet", a "network packet", "segment", "block", "cell", "chunk", "Type Length Value" or "TLV", and/or the like. Examples of datagrams, network packets, and the like, include internet protocol (IP) packet, Internet Control Message Protocol (ICMP) packet, UDP packet, TCP packet, SCTP packet, ICMP packet, Ethernet frame, RRC messages/packets, SDAP PDU, SDAP SDU, PDCP PDU, PDCP SDU, MAC PDU, MAC SDU, BAP PDU. BAP SDU, RLC PDU, RLC SDU, WiFi frames as discussed in a IEEE protocol/standard (e.g., [IEEE80211] or the like), Type Length Value (TLV), and/or other like data structures. The term "packet" at least in some examples refers to an information unit identified by a label at layer 3 of the OSI reference model. In some examples, a "packet" may also be referred to as a "network protocol data unit" or "NPDU". The term "protocol data unit" at least in some examples refers to a unit of data specified in an (N)-protocol layer and consisting of (N)-protocol control information and possibly (N)-user data.

The term "information element" or "IE" at least in some examples refers to a structural element containing one or more fields. Additionally or alternatively, the term "information element" or "IE" at least in some examples refers to a field or set of fields defined in a standard or specification that is used to convey data and/or protocol information. The term "field" at least in some examples refers to individual contents of an information element, or a data element that contains content. The term "data frame", "data field", or "DF" at least in some examples refers to a data type that contains more than one data element in a predefined order. The term "data element" or "DE" at least in some examples refers to a data type that contains one single data. Additionally or alternatively, the term "data element" at least in some examples refers to an atomic state of a particular object with at least one specific property at a certain point in time, and may include one or more of a data element name or identifier, a data element definition, one or more representation terms, enumerated values or codes (e.g., metadata), and/or a list of synonyms to data elements in other metadata registries. Additionally or alternatively, a "data element" at least in some examples refers to a data type that contains one single data.

The terms "configuration", "policy", "ruleset", and/or "operational parameters", at least in some examples refer to a machine-readable information object that contains instructions, conditions, parameters, and/or criteria that are relevant to a device, system, or other element/entity. The term "data set" or "dataset" at least in some examples refers to a collection of data; a "data set" or "dataset" may be formed or arranged in any type of data structure. In some examples, one or more characteristics can define or influence the structure and/or properties of a dataset such as the number and types of attributes and/or variables, and various statistical measures (e.g., standard deviation, kurtosis, and/or the like). The term "data structure" at least in some examples refers to a data organization, management, and/or storage format. Additionally or alternatively, the term "data structure" at least in some examples refers to a collection of data values, the relationships among those data values, and/or the functions, operations, tasks, and the like, that can be applied to the data. Examples of data structures include primitives (e.g., Boolean, character, floating-point numbers, fixed-point numbers, integers, reference or pointers, enumerated type, and/or the like), composites (e.g., arrays, records, strings, union, tagged union, and/or the like), abstract data types (e.g., data container, list, tuple, associative array, map, dictionary, set (or dataset), multiset or bag, stack, queue, graph (e.g., tree, heap, and the like), and/or the like), routing table, symbol table, quad-edge, blockchain, purely-functional data structures (e.g., stack, queue, (multi)set, random access list, hash consing, zipper data structure, and/or the like).

The term "association" at least in some examples refers to a model of relationships between Managed Objects. Associations can be implemented in several ways, such as: (1) name bindings, (2) reference attributes, and (3) association objects.

The term "Information Object Class" or "IOC" at least in some examples refers to a representation of the management aspect of a network resource. Additionally or alternatively, the term "Information Object Class" or "IOC" at least in some examples refers to a description of the information that can be passed/used in management interfaces. Their representations are technology agnostic software objects. IOC has attributes that represents the various properties of the class of objects. Furthermore, IOC can support operations providing network management services invocable on demand for that class of objects. An IOC may support notifications that report event occurrences relevant for that class of objects. It is modelled using the stereotype "Class" in the UML meta-model.

The term "Managed Object" or "MO" at least in some examples refers to an instance of a Managed Object Class (MOC) representing the management aspects of a network resource. Its representation is a technology specific software object. In some examples, an MO is called an "MO instance" or "MOI". Additionally or alternatively, the term "Managed Object" or "MO" at least in some examples refers to a class of technology specific software objects. In some examples, an MOC is the same as an IOC except that the former is defined in technology specific terms and the latter is defined in technology agnostic terms. MOCs are used/defined in SS level specifications. In some examples, IOCs are used/defined in IS level specifications.

The term "Management Information Base" or "MIB" at least in some examples refers to an instance of an NRM and has some values on the defined attributes and associations specific for that instance. In some examples, an MIB includes a name space (describing the MO containment hierarchy in the MIB through Distinguished Names), a number of MOs with their attributes, and a number of associations between the MOs.

The term "name space" at least in some examples refers to a collection of names. In some examples, a name space is restricted to a hierarchical containment structure, including its simplest form—the one-level, flat name space. In some examples, all MOs in an MIB are included in the corresponding name space and the MIB/name space shall only support a strict hierarchical containment structure (with one root object). An MO that contains another is said to be the superior (parent); the contained MO is referred to as the subordinate (child). The parent of all MOs in a single name space is called a Local Root. The ultimate parent of all MOs of all managed systems is called the Global Root.

The term "network resource" at least in some examples refers to a discrete entity represented by an IOC for the purpose of network and service management. In some examples, a network resource may represent intelligence, information, hardware and/or software of a telecommunication network. The term "Network Resource Model" or "NRM" at least in some examples refers to a collection of IOCs, inclusive of their associations, attributes and operations, representing a set of network resources under management.

The term "self-organizing network" or "SON" at least in some examples refers to a type of network architecture or system that is designed to automate the planning, configuration, optimization, and/or healing processes of a wireless network with little or no direct human intervention (see e.g., 3GPP TS 32.500 v17.0.0 (2022 Apr. 4) ("[TS32500]"), 3GPP TS 28.313 v18.2.0 (2023 Jun. 22) ("[TS28310]"), and 3GPP TS 28.313 v17.8.0 (2023 Mar. 30) ("[TS28313]"), the contents of each of which are hereby incorporated by reference in their entireties.

The term "performance indicator" at least in some examples refers to performance data aggregated over a group of NFs that is derived from performance measurements collected at the NFs that belong to the group. In some examples, performance indicators are derived, collected or aggregated according to an aggregation method identified in a performance indicator definition.

The term "artificial intelligence" or "AI" at least in some examples refers to any intelligence demonstrated by machines, in contrast to the natural intelligence displayed by humans and other animals. Additionally or alternatively, the term "artificial intelligence" or "AI" at least in some examples refers to the study of "intelligent agents" and/or any device that perceives its environment and takes actions that maximize its chance of successfully achieving a goal.

The terms "artificial neural network", "neural network", or "NN" refer to an ML technique comprising a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), deep FNN (DFF), convolutional NN (CNN), deep CNN (DCN), deconvolutional NN (DNN), autoencoder, encoder-decoder networks, a perception NN, recurrent NN (RNN) (e.g., including Long Short Term Memory (LSTM) algorithm, gated recurrent unit (GRU), echo state network (ESN), and the like), spiking NN (SNN), deep stacking network (DSN), Markov chain, perception NN, generative adversarial network (GAN), transformers, stochastic NNs (e.g., Bayesian Network (BN), Bayesian belief network (BBN), Bayesian NN (BNN), Deep BNN (DBNN), Dynamic BN (DBN), and the like), probabilistic graphical model (PGM), unsupervised learning NNs (e.g., Boltzmann machine, restricted Boltzmann machine (RBM), deep belief network, convolutional deep belief network (CDBN), sigmoid belief network, Hopfield NN, Helmholtz machine, variational autoencoder (VAE), self-organizing map (SOM) NN, adaptive resonance theory (ART) NN, and/or the like), Linear Dynamical System (LDS), Switching LDS (SLDS), Optical NNs (ONNs), an NN for reinforcement learning (RL) and/or deep RL (DRL), and/or the like.

The term "attention" in the context of machine learning and/or neural networks, at least in some examples refers to a technique that mimics cognitive attention, which enhances important parts of a dataset where the important parts of the dataset may be determined using training data by gradient descent. The term "attention model" or "attention mechanism" at least in some examples refers to input processing techniques for neural networks that allow the neural network to focus on specific aspects of a complex input, one at a time until the entire dataset is categorized. The term "self-attention" at least in some examples refers to an attention mechanism relating different positions of a single sequence in order to compute a representation of the sequence. Additionally or alternatively, the term "self-attention" at least in some examples refers to an attention mechanism applied to a single context instead of across multiple contexts wherein queries, keys, and values are extracted from the same context.

The term "backpropagation" at least in some examples refers to a method used in NNs to calculate a gradient that is needed in the calculation of weights to be used in the NN; "backpropagation" is shorthand for "the backward propagation of errors." Additionally or alternatively, the term "backpropagation" at least in some examples refers to a method of calculating the gradient of neural network parameters. Additionally or alternatively, the term "backpropagation" or "back pass" at least in some examples refers to a method of traversing an NN in reverse order, from the output to the input layer. The term "forward propagation" or "forward pass" at least in some examples refers to the calculation and storage of intermediate variables (including outputs) for an NN in order from the input layer to the output layer.

The term "classification" in the context of machine learning at least in some examples refers to an ML technique for determining the classes to which various data points belong. Here, the term "class" or "classes" at least in some examples refers to categories, and are sometimes called "targets" or "labels." Classification is used when the outputs are restricted to a limited set of quantifiable properties. Classification algorithms may describe an individual (data) instance whose category is to be predicted using a feature vector. As an example, when the instance includes a collection (corpus) of text, each feature in a feature vector may be the frequency that specific words appear in the corpus of text. In ML classification, labels are assigned to instances, and models are trained to correctly predict the pre-assigned labels of from the training examples. ML algorithms for classification may be referred to as a "classifier." Examples of classifiers include linear classifiers, k-nearest neighbor (kNN), decision trees, random forests, support vector machines (SVMs), Bayesian classifiers, convolutional neural networks (CNNs), among many others (note that some of these algorithms can be used for other ML tasks as well).

The term "ensemble averaging" at least in some examples refers to the process of creating multiple models and combining them to produce a desired output, as opposed to creating just one model. The term "ensemble learning" or "ensemble method" at least in some examples refers to using multiple learning algorithms to obtain better predictive performance than could be obtained from any of the constituent learning algorithms alone.

The term "feature" at least in some examples refers to an individual measureable property, quantifiable property, or characteristic of a phenomenon being observed. Additionally or alternatively, the term "feature" at least in some examples refers to an input variable used in making predictions. At least in some examples, features may be represented using numbers/numerals (e.g., integers), strings, variables, ordinals, real-values, categories, and/or the like. The term "feature extraction" at least in some examples refers to a process of dimensionality reduction by which an initial set of raw data is reduced to more manageable groups for processing. Additionally or alternatively, the term "feature extraction" at least in some examples refers to retrieving intermediate feature representations calculated by an unsupervised model or a pretrained model for use in another model as an input. The term "feature map" at least in some examples refers to a function that takes feature vectors (or feature tensors) in one space and transforms them into feature vectors (or feature tensors) in another space. Additionally or alternatively, the term "feature map" at least in some examples refers to a function that maps a data vector (or tensor) to feature space. Additionally or alternatively, the term "feature map" at least in some examples refers to a function that applies the output of one filter applied to a previous layer. In some embodiments, the term "feature map" may also be referred to as an "activation map". The term "feature vector" at least in some examples refers to a set of features and/or a list of feature values representing an example passed into a model. Additionally or alternatively, the term "feature vector" at least in some examples, in the context of ML, refers to a vector that includes a tuple of one or more features.

The term "hyperparameter" at least in some examples refers to characteristics, properties, and/or parameters for an ML process that cannot be learnt during a training process. Hyperparameter are usually set before training takes place, and may be used in processes to help estimate model parameters. Examples of hyperparameters include model size (e.g., in terms of memory space, bytes, number of layers, and the like); training data shuffling (e.g., whether to do so and by how much); number of evaluation instances, iterations, epochs (e.g., a number of iterations or passes over the training data), or episodes; number of passes over training data; regularization; learning rate (e.g., the speed at which the algorithm reaches (converges to) optimal weights); learning rate decay (or weight decay); momentum; number of hidden layers; size of individual hidden layers; weight initialization scheme; dropout and gradient clipping thresholds; the C value and sigma value for SVMs; the k in k-nearest neighbors; number of branches in a decision tree; number of clusters in a clustering algorithm; vector size; word vector size for NLP and NLU; and/or the like.

The term "inference engine" at least in some examples refers to a component of a computing system that applies logical rules to a knowledge base to deduce new information. The term "intelligent agent" at least in some examples refers to an a software agent or other autonomous entity which acts, directing its activity towards achieving goals upon an environment using observation through sensors and consequent actuators.

The terms "instance-based learning" or "memory-based learning" at least in some examples refers to a family of learning algorithms that, instead of performing explicit generalization, compares new problem instances with instances seen in training, which have been stored in memory. Examples of instance-based algorithms include k-nearest neighbor, and the like), decision tree Algorithms (e.g., Classification And Regression Tree (CART), Iterative Dichotomiser 3 (ID3), C4.5, chi-square automatic interaction detection (CHAID), and the like), Fuz7 Decision Tree (FDT), and the like), Support Vector Machines (SVM), Bayesian Algorithms (e.g., Bayesian network (BN), a dynamic BN (DBN), Naive Bayes, and the like), and ensemble algorithms (e.g., Extreme Gradient Boosting, voting ensemble, bootstrap aggregating ("bagging"), Random Forest and the like.

The term "machine learning" or "ML" at least in some examples refers to the use of computer systems to optimize a performance criterion using example (training) data and/or past experience. ML involves using algorithms to perform specific task(s) without using explicit instructions to perform the specific task(s), and/or relying on patterns, predictions, and/or inferences. ML uses statistics to build ML model(s) (also referred to as "models") in order to make predictions or decisions based on sample data (e.g., training data).

The term "machine learning model" or "ML model" at least in some examples refers to an application, program, process, algorithm, and/or function that is capable of making predictions, inferences, or decisions based on an input data set and/or is capable of detecting patterns based on an input data set. Additionally or alternatively, the term "machine learning model" or "ML model" at least in some examples refers to a mathematical algorithm that can be "trained" by data (or otherwise learn from data) and/or human expert input as examples to replicate a decision an expert would make when provided that same information. In some examples, a "machine learning model" or "ML model" is trained on a training data to detect patterns and/or make predictions, inferences, and/or decisions. In some examples, a "machine learning model" or "ML model" is based on a mathematical and/or statistical model. For purposes of the present disclosure, the terms "ML model", "AI model", "AI/ML model", and the like may be used interchangeably. The term "mathematical model" at least in some examples refer to a system of postulates, data, and inferences presented as a mathematical description of an entity or state of affairs including governing equations, assumptions, and constraints. The term "statistical model" at least in some examples refers to a mathematical model that embodies a set of statistical assumptions concerning the generation of sample data and/or similar data from a population; in some examples, a "statistical model" represents a data-generating process.

The term "machine learning algorithm" or "ML algorithm" at least in some examples refers to an application, program, process, algorithm, and/or function that builds or estimates an ML model based on sample data or training data. Additionally or alternatively, the term "machine learning algorithm" or "ML algorithm" at least in some examples refers to a program, process, algorithm, and/or function that learns from experience w.r.t some task(s) and some performance measure(s)/metric(s), and an ML model is an object or data structure created after an ML algorithm is trained with training data. For purposes of the present disclosure, the terms "ML algorithm", "AI algorithm", "AI/ML algorithm", and the like may be used interchangeably. Additionally, although the term "ML algorithm" may refer to different concepts than the term "ML model," these terms may be used interchangeably for the purposes of the present disclosure.

The term "machine learning application" or "ML application" at least in some examples refers to an application, program, process, algorithm, and/or function that contains some AI/ML model(s) and application-level descriptions. Additionally or alternatively, the term "machine learning application" or "ML application" at least in some examples refers to a complete and deployable application and/or package that includes at least one ML model and/or other data capable of achieving a certain function and/or performing a set of actions or tasks in an operational environment. For purposes of the present disclosure, the terms "ML application", "AI application", "AI/ML application", and the like may be used interchangeably.

The term "machine learning entity" or "ML entity" at least in some examples refers to an entity that is either an ML model or contains an ML model and ML model-related metadata that can be managed as a single composite entity. In some examples, metadata may include, for example, the applicable runtime context for the ML model. The term "AI decision entity", "machine learning decision entity", or "ML decision entity" at least in some examples refers to an entity that applies a non-AI and/or non-ML based logic for making decisions that can be managed as a single composite entity.

The term "machine learning training", "ML training", or "MLT" at least in some examples refers to capabilities and associated end-to-end (e2e) processes to enable an ML training function to perform ML model training (e.g., as defined herein). In some examples, ML training capabilities include interaction with other parties/entities to collect and/or format the data required for ML model training. The term "machine learning model training" or "ML model training" at least in some examples refers to capabilities of an ML training function to take data, run the data through an ML model, derive associated loss, optimization, and/or objective/goal, and adjust the parameterization of the ML model based on the computed loss, optimization, and/or objective/ goal. The term "machine learning training function", "ML training function", or "MLT function" at least in some examples refers to a function with MLT capabilities. The term "AI/ML inference function" or "ML inference function" at least in some examples refers to a function (or set of functions) that employs an ML model and/or AI decision entity to conduct inference. Additionally or alternatively, the term "AI/ML inference function" or "ML inference function" at least in some examples refers to an inference framework used to run a compiled model in the inference host. In some examples, an "AI/ML inference function" or "ML inference function" may also be referred to an "model inference engine", "ML inference engine", or "inference engine".

The term "matrix" at least in some examples refers to a rectangular array of numbers, symbols, or expressions, arranged in rows and columns, which may be used to represent an object or a property of such an object. The term "vector" at least in some examples refers to a one-dimensional array data structure. Additionally or alternatively, the term "vector" at least in some examples refers to a tuple of one or more values called scalars. The term "tensor" at least in some examples refers to an object or other data structure represented by an array of components that describe functions relevant to coordinates of a space. Additionally or alternatively, the term "tensor" at least in some examples refers to a generalization of vectors and matrices and/or may be understood to be a multidimensional array. Additionally or alternatively, the term "tensor" at least in some examples refers to an array of numbers arranged on a regular grid with a variable number of axes.

The terms "model parameter" and/or "parameter" in the context of ML, at least in some examples refer to values, characteristics, and/or properties that are learnt during training. Additionally or alternatively, "model parameter" and/or "parameter" in the context of ML, at least in some examples refer to a configuration variable that is internal to the model and whose value can be estimated from the given data. Model parameters are usually required by a model when making predictions, and their values define the skill of the model on a particular problem. Examples of such model parameters/parameters include weights (e.g., in an ANN); constraints; support vectors in a support vector machine (SVM); coefficients in a linear regression and/or logistic regression; word frequency, sentence length, noun or verb distribution per sentence, the number of specific character n-grams per word, lexical diversity, and the like, for natural language processing (NLP) and/or natural language understanding (NLU); and/or the like.

The term "momentum" at least in some examples refers to an aggregate of gradients in gradient descent. Additionally or alternatively, the term "momentum" at least in some examples refers to a variant of the stochastic gradient descent algorithm where a current gradient is replaced with m (momentum), which is an aggregate of gradients.

The term "objective function" at least in some examples refers to a function to be maximized or minimized for a specific optimization problem. In some cases, an objective function is defined by its decision variables and an objective. The objective is the value, target, or goal to be optimized, such as maximizing profit or minimizing usage of a particular resource. The specific objective function chosen depends on the specific problem to be solved and the objectives to be optimized. Constraints may also be defined to restrict the values the decision variables can assume thereby influencing the objective value (output) that can be achieved. During an optimization process, an objective function's decision variables are often changed or manipulated within the bounds of the constraints to improve the objective function's values. In general, the difficulty in solving an objective function increases as the number of decision variables included in that objective function increases. The term "decision variable" refers to a variable that represents a decision to be made.

The term "optimization" at least in some examples refers to an act, process, or methodology of making something (e.g., a design, system, or decision) as fully perfect, functional, or effective as possible. Optimization usually includes mathematical procedures such as finding the maximum or minimum of a function. The term "optimal" at least in some examples refers to a most desirable or satisfactory end, outcome, or output. The term "optimum" at least in some examples refers to an amount or degree of something that is most favorable to some end. The term "optima" at least in some examples refers to a condition, degree, amount, or compromise that produces a best possible result. Additionally or alternatively, the term "optima" at least in some examples refers to a most favorable or advantageous outcome or result.

The term "precision" at least in some examples refers to the closeness of the two or more measurements to each other. The term "precision" may also be referred to as "positive predictive value". The term "accuracy" at least in some examples refers to the closeness of one or more measurements to a specific value. The term "quantile" at least in some examples refers to a cut point(s) dividing a range of a probability distribution into continuous intervals with equal probabilities, or dividing the observations in a sample in the same way. The term "quantile function" at least in some examples refers to a function that is associated with a probability distribution of a random variable, and the specifies the value of the random variable such that the probability of the variable being less than or equal to that value equals the given probability. The term "quantile function" may also be referred to as a percentile function, percent-point function, or inverse cumulative distribution function. The term "recall" at least in some examples refers to the fraction of relevant instances that were retrieved, or the number of true positive predictions or inferences divided by the number of true positives plus false negative predictions or inferences. The term "recall" may also be referred to as "sensitivity".

The terms "regression algorithm" and/or "regression analysis" in the context of ML at least in some examples refers to a set of statistical processes for estimating the relationships between a dependent variable (often referred to as the "outcome variable") and one or more independent variables (often referred to as "predictors", "covariates", or "features"). Examples of regression algorithms/models include logistic regression, linear regression, gradient descent (GD), stochastic GD (SGD), and the like.

The term "reinforcement learning" or "RL" at least in some examples refers to a goal-oriented learning technique based on interaction with an environment. In RL, an agent aims to optimize a long-term objective by interacting with the environment based on a trial and error process. Examples of RL algorithms include Markov decision process, Markov chain, Q-learning, multi-armed bandit learning, temporal difference learning, and deep RL. The term "multi-armed bandit problem", "K-armed bandit problem", "N-armed bandit problem", or "contextual bandit" at least in some examples refers to a problem in which a fixed limited set of resources must be allocated between competing (alternative) choices in a way that maximizes their expected gain, when each choice's properties are only partially known at the time of allocation, and may become better understood as time passes or by allocating resources to the choice. The term "contextual multi-armed bandit problem" or "contextual bandit" at least in some examples refers to a version of multi-armed bandit where, in each iteration, an agent has to choose between arms; before making the choice, the agent sees a d-dimensional feature vector (context vector) associated with a current iteration, the learner uses these context vectors along with the rewards of the arms played in the past to make the choice of the arm to play in the current iteration, and over time the learner's aim is to collect enough information about how the context vectors and rewards relate to each other, so that it can predict the next best arm to play by looking at the feature vectors. The term "reward function", in the context of RL, at least in some examples refers to a function that outputs a reward value based on one or more reward variables; the reward value provides feedback for an RL policy so that an RL agent can learn a desirable behavior. The term "reward shaping", in the context of RL, at least in some examples refers to a adjusting or altering a reward function to output a positive reward for desirable behavior and a negative reward for undesirable behavior.

The term "supervised learning" at least in some examples refers to an ML technique that aims to learn a function or generate an ML model that produces an output given a labeled data set. Supervised learning algorithms build models from a set of data that contains both the inputs and the desired outputs. For example, supervised learning involves learning a function or model that maps an input to an output based on example input-output pairs or some other form of labeled training data including a set of training examples. Each input-output pair includes an input object (e.g., a vector) and a desired output object or value (referred to as a "supervisory signal"). Supervised learning can be grouped into classification algorithms, regression algorithms, and instance-based algorithms.

The term "tuning" or "tune" at least in some examples refers to a process of adjusting model parameters or hyperparameters of an ML model in order to improve its performance. Additionally or alternatively, the term "tuning" or "tune" at least in some examples refers to a optimizing an ML model's model parameters and/or hyperparameters.

The term "unsupervised learning" at least in some examples refers to an ML technique that aims to learn a function to describe a hidden structure from unlabeled data and/or builds/generates models from a set of data that contains only inputs and no desired output labels. Examples of unsupervised learning approaches/methods include K-means clustering, hierarchical clustering, mixture models, density-based spatial clustering of applications with noise (DBSCAN), ordering points to identify the clustering structure (OPTICS), anomaly detection methods (e.g., local outlier factor, isolation forest, and/or the like), expectation-maximization algorithm (EM), method of moments, topic modeling, and blind signal separation techniques (e.g., principal component analysis (PCA), independent component analysis, non-negative matrix factorization, singular value decomposition). In some examples, unsupervised training methods include backpropagation, Hopfield learning rule, Boltzmann learning rule, contrastive divergence, wake sleep, variational inference, maximum likelihood, maximum a posteriori, Gibbs sampling, backpropagating reconstruction errors, and hidden state reparameterizations. The term "semi-supervised learning at least in some examples refers to ML algorithms that develop ML models from incomplete training data, where a portion of the sample input does not include labels.

Aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus to be employed as a management function of performance assurance (MnF-PA), the apparatus comprising:
   processor circuitry connected to memory circuitry, wherein the processor circuitry is to:
      receive, from a performance assurance consumer, a measurement job request to create a measurement job for collection of measurement data;
      create the measurement job to collect the measurement data based on the request;
      send an output parameter to the performance assurance consumer with a measurement job identifier to indicate that the measurement job has been successfully created;
      collect measurement data from a set of nodes during the measurement job; and
      store the collected measurement data in the memory circuitry as a measurement set.

2. The apparatus of claim 1, wherein the measurement job request is based on invocation of:
   a create measurement job operation by the performance assurance consumer; or
   a create managed object instance (MOI) operation to create a performance metric production job information object class.

3. The apparatus of claim 2, wherein the measurement job request includes a domain name of an entity from which the measurement data is to be collected; one or more types of measurement data to be collected from the entity; and a reporting method to be used to report the measurement set.

4. The apparatus of claim 3, wherein, when the reporting method is a file-based reporting method, the processor circuitry is to:
   receive, from the performance assurance consumer, a subscription request via a subscribe operation to subscribe to receive notifications when the measurement data is ready for delivery to the performance assurance consumer; and
   send, to the performance assurance consumer, a notify file ready notification to the consumer to indicate that a performance data file is ready, wherein the performance data file includes the measurement set.

5. The apparatus of claim 3, wherein, when the reporting method is a streaming-based reporting method, the processor circuitry is to:
   receive, from the performance assurance consumer, a streaming request via an establish streaming connection operation to establish a streaming connection for sending the measurement data to the performance assurance consumer; and invoke a report stream data operation to stream the measurement data of the measurement set to the performance assurance consumer.

6. The apparatus of claim 1, wherein the processor circuitry is to:
receive the measurement data from a serving next generation node B (gNB) centralized unit (CU), wherein serving gNB-CU obtains at least some of the measurement data from a set of neighboring gNB-CUs via an Xn interface; and
generate the measurement set for an object instance of neighbor cell relation MOIs referring to respective neighboring gNB-CUs in the set of neighboring gNB-CUs.

7. The apparatus of claim 1, wherein the processor circuitry is to:
receive the measurement data from a network energy saving (NES) function implemented by a gNB-CU; and
generate the measurement set for an object instance of a distributed energy saving management function MOI referring to NES actors.

8. The apparatus of claim 1, wherein the processor circuitry is to:
receive the measurement data from a mobility optimization function implemented by a gNB-CU; and
generate the measurement set for an object instance of a distributed mobility robustness optimization (MRO) function MOI referring to MRO actors.

9. The apparatus of claim 1, wherein the processor circuitry is to:
receive the measurement data from a load balancing function implemented by a gNB-CU; and
generate the measurement set for an object instance of distributed load balancing optimization (LBO) function MOI referring to LBO actors.

10. The apparatus of claim 1, wherein the processor circuitry is to:
receive, as the measurement data, user equipment (UE) measurement reports from a serving gNB-CU, wherein the UE measurement reports are provided to the serving gNB-CU in respective radio resource control (RRC) measurement reports from corresponding UEs; and
generate the measurement set for an object instance of at least one NRCellCU MOI referring to a gNB CU cell with sub-counters identified by C-RNTI for each UE measurements.

11. The apparatus of claim 1, wherein the MnF-PA is a management service (MnS) producer and the performance assurance consumer is an MnS consumer.

12. The apparatus of claim 1, wherein the MnF-PA is a network function (NF), an application function (AF), a radio access network (RAN) function, an edge compute node, an application server, or a cloud computing service, and the consumer is a network energy saving (NES) function, mobility robustness optimization (MRO) function, or a load balancing optimization (LBO) implemented by another NF, another MF, another AF, another RAN function, the edge compute node, another edge compute node, the application server, another application server, the cloud computing service, or another cloud computing service.

13. A non-transitory computer-readable medium (NTCRM) comprising instructions for operating a management function of performance assurance (MnF-PA), wherein execution of the instructions by one or more processors is to cause the MnF-PA to:

receive, from a performance assurance consumer, a measurement job request to create a measurement job for collection of measurement data;
create the measurement job to collect the measurement data based on the request;
send an output parameter to the performance assurance consumer with a measurement job identifier to indicate that the measurement job has been successfully created;
collect measurement data from a set of nodes during the measurement job; and
store the collected measurement data in memory circuitry as a measurement set.

14. The NTCRM of claim 13, wherein the measurement job request is based on invocation of:
a create measurement job operation by the performance assurance consumer; or
a create managed object instance (MOI) operation to create a performance metric production job information object class.

15. The NTCRM of claim 14, wherein the measurement job request includes a domain name of an entity from which the measurement data is to be collected; one or more types of measurement data to be collected from the entity; and a reporting method to be used to report the measurement set.

16. The NTCRM of claim 15, wherein, when the reporting method is a file-based reporting method, execution of the instructions is to cause the MnF-PA to:
receive, from the performance assurance consumer, a subscription request via a subscribe operation to subscribe to receive notifications when the measurement data is ready for delivery to the performance assurance consumer; and
send, to the performance assurance consumer, a notify file ready notification to the consumer to indicate that a performance data file is ready, wherein the performance data file includes the measurement set.

17. The NTCRM of claim 15, wherein, when the reporting method is a streaming-based reporting method, execution of the instructions is to cause the MnF-PA to:
receive, from the performance assurance consumer, a streaming request via an establish streaming connection operation to establish a streaming connection for sending the measurement data to the performance assurance consumer; and
invoke a report stream data operation to stream the measurement data of the measurement set to the performance assurance consumer.

18. The NTCRM of claim 13, wherein execution of the instructions is to cause the MnF-PA to:
receive the measurement data from a serving next generation node B (gNB) centralized unit (CU), wherein serving gNB-CU obtains at least some of the measurement data from a set of neighboring gNB-CUs via an Xn interface; and
generate the measurement set for an object instance of neighbor cell relation MOIs referring to respective neighboring gNB-CUs in the set of neighboring gNB-CUs.

19. The NTCRM of claim 13, wherein execution of the instructions is to cause the MnF-PA to:
receive the measurement data from one or more of a network energy saving (NES) function, a mobility optimization function, and a load balancing function, each of which are implemented by a gNB-CU; and
generate the measurement set for respective object instances of a distributed energy saving management function MOI referring to NES actors, an object instance of a distributed mobility robustness optimization (MRO) function MOI referring to MRO actors, and a distributed load balancing optimization (LBO) function MOI referring to LBO actors.

20. The NTCRM of claim 13, wherein execution of the instructions is to cause the MnF-PA to:
    receive, as the measurement data, user equipment (UE) measurement reports from a serving gNB-CU, wherein the UE measurement reports are provided to the serving gNB-CU in respective radio resource control (RRC) measurement reports from corresponding UEs; and
    generate the measurement set for an object instance of at least one NRCellCU MOI referring to a gNB CU cell with sub-counters identified by C-RNTI for each UE measurements.

* * * * *